(12) United States Patent
Dohta et al.

(10) Patent No.: US 8,651,952 B2
(45) Date of Patent: Feb. 18, 2014

(54) GAME APPARATUS AND COMPUTER-READABLE STORAGE MEDIUM HAVING GAME PROGRAM STORED THEREIN

(75) Inventors: Takuhiro Dohta, Kyoto (JP); Takayuki Shimamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1041 days.

(21) Appl. No.: 12/332,863

(22) Filed: Dec. 11, 2008

(65) Prior Publication Data

US 2010/0099494 A1    Apr. 22, 2010

(30) Foreign Application Priority Data

Oct. 17, 2008    (JP) ................................ 2008-268461

(51) Int. Cl.
*A63F 9/24*    (2006.01)
(52) U.S. Cl.
USPC ................................ 463/36; 463/38; 463/43
(58) Field of Classification Search
USPC .................................................... 463/36, 43
See application file for complete search history.

(56) References Cited

U.S. PATENT DOCUMENTS 6,641,482 B2 * 11/2003 Masuyama et al. ............ 463/44
2007/0213128 A1 * 9/2007 Ohta ............................... 463/36
2008/0129739 A1 * 6/2008 Moravanszky et al. ........ 345/474
2008/0303697 A1 * 12/2008 Yamamoto ....................... 341/20
2010/0007528 A1 * 1/2010 Urata et al. ..................... 341/20

FOREIGN PATENT DOCUMENTS

| EP | 1 762 287 | 3/2007 |
|---|---|---|
| EP | 1 900 406 | 3/2008 |
| EP | 1 927 383 | 6/2008 |
| EP | 1 961 466 | 8/2008 |
| JP | 2006-68027 | 3/2006 |

OTHER PUBLICATIONS

Dickheiser, Mike; Game Programming Gems 6; Published by Charles River Media an imprint of Thomas Learning Inc. in year 2002; pp. 175-205.*
European Search Report issued for European Patent Application No. 08021538.7, dated Nov. 13, 2012.

* cited by examiner

*Primary Examiner* — Alexander Sofocleous
*Assistant Examiner* — John P Dulka
(74) *Attorney, Agent, or Firm* — Nixon & Vanderhye, P.C.

(57) ABSTRACT

Operation data acquisition means acquires operation data at least including motion data, which is data representing a motion of a predetermined input device, from the input device. Amount-of-change calculation means calculates an amount of change of the input device in a predetermined period of time, based on the motion data. Position orientation calculation means calculates a position and an orientation of a player object in a virtual game space. Degree-of-contact calculation means calculates a degree of contact, which represents a degree of the player object and a field object contacting each other in the virtual game space. Orientation change means changes the orientation of the player object, based on the amount of change and the degree of contact.

28 Claims, 33 Drawing Sheets

| WATER-IMMERSED VOLUME | DEGREE OF CONTACT D |
|---|---|
| 72~ | 1 |
| 64~71.9 | 0.9 |
| 56~63.9 | 0.8 |
| ⋮ | ⋮ |
| 8~15.9 | 0.2 |
| 0.1~0.79 | 0.1 |
| 0 | 0 |

COLLISION DETECTION BALL

SURFACE OF WATER (POLYGON MESH)

F I G. 1
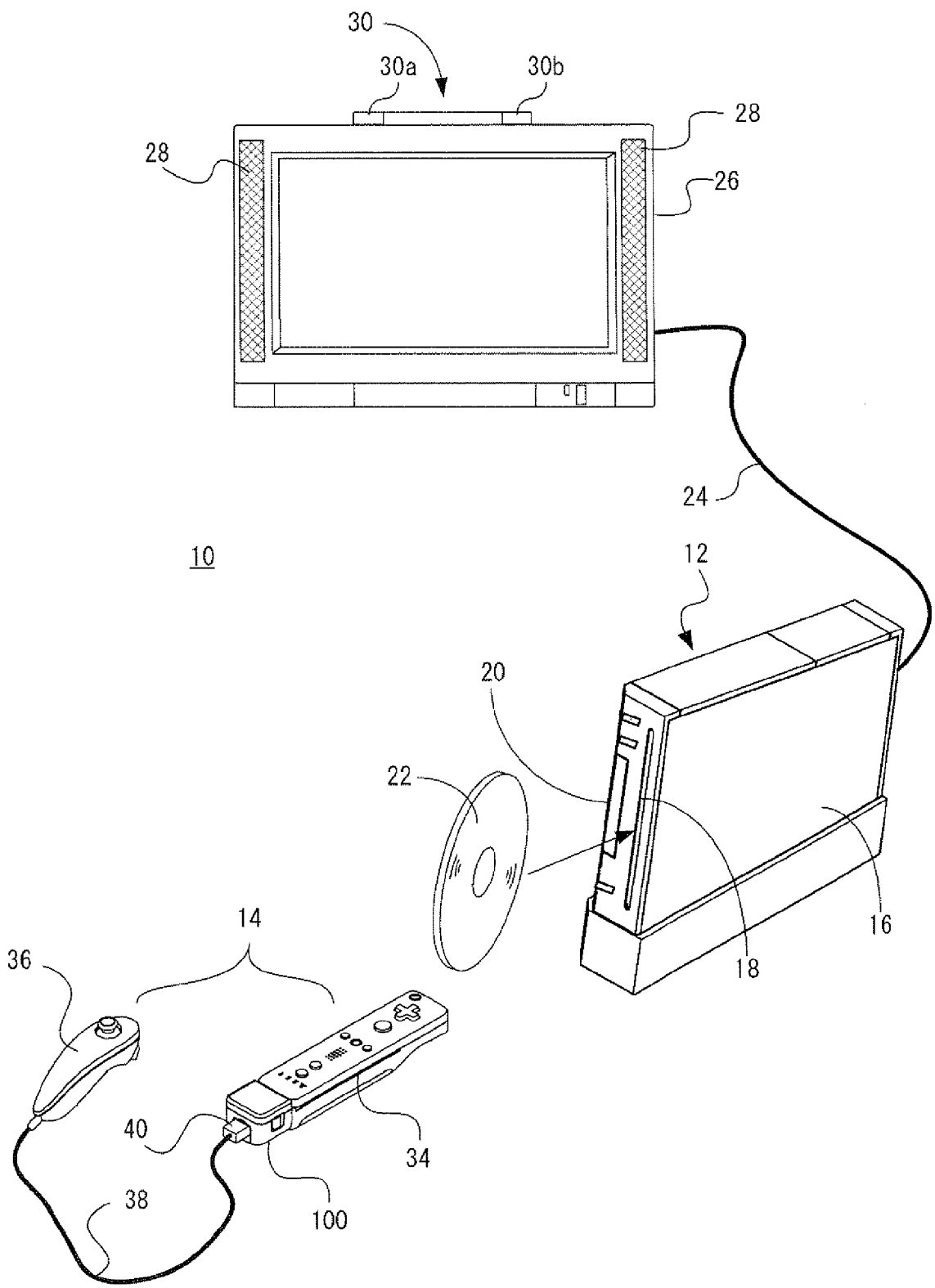

F I G. 4
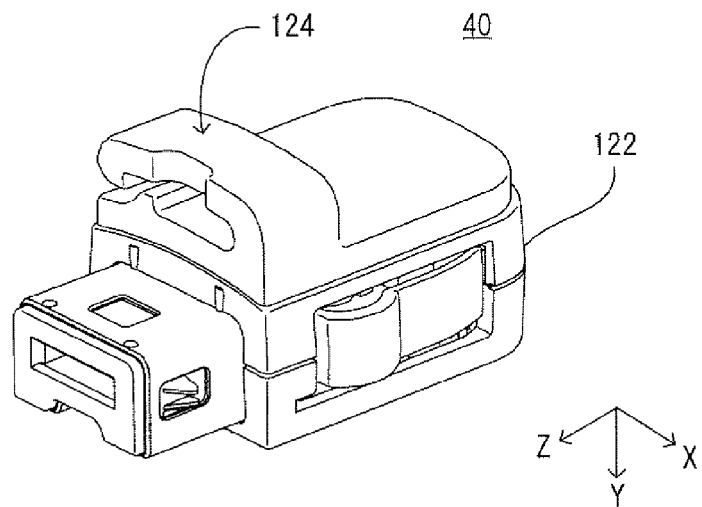
F I G. 5
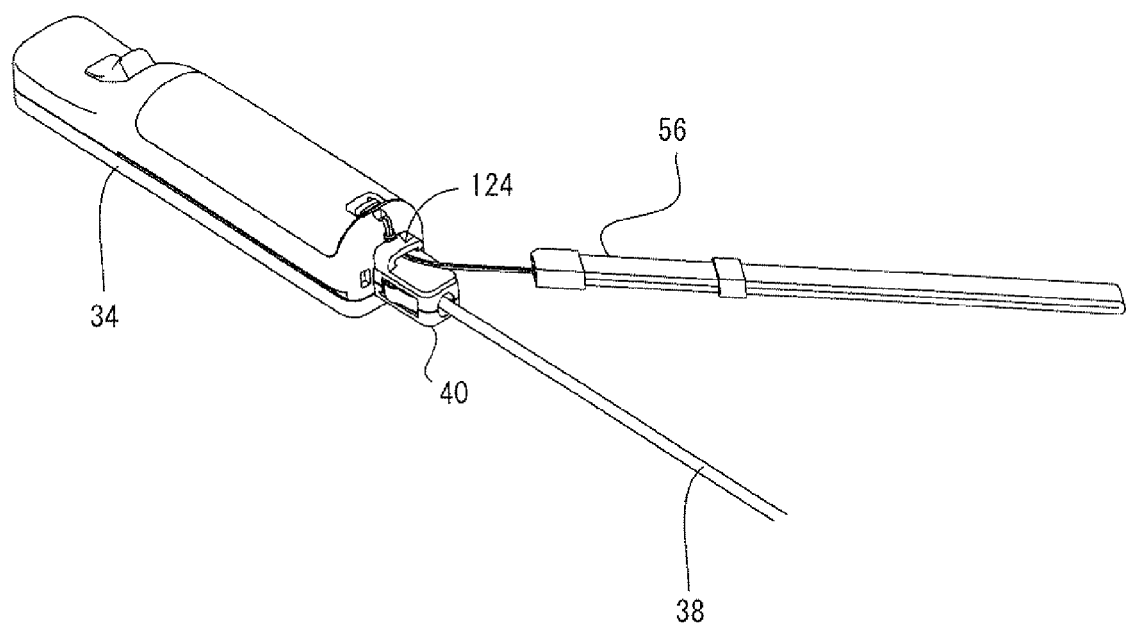

F I G. 1 0
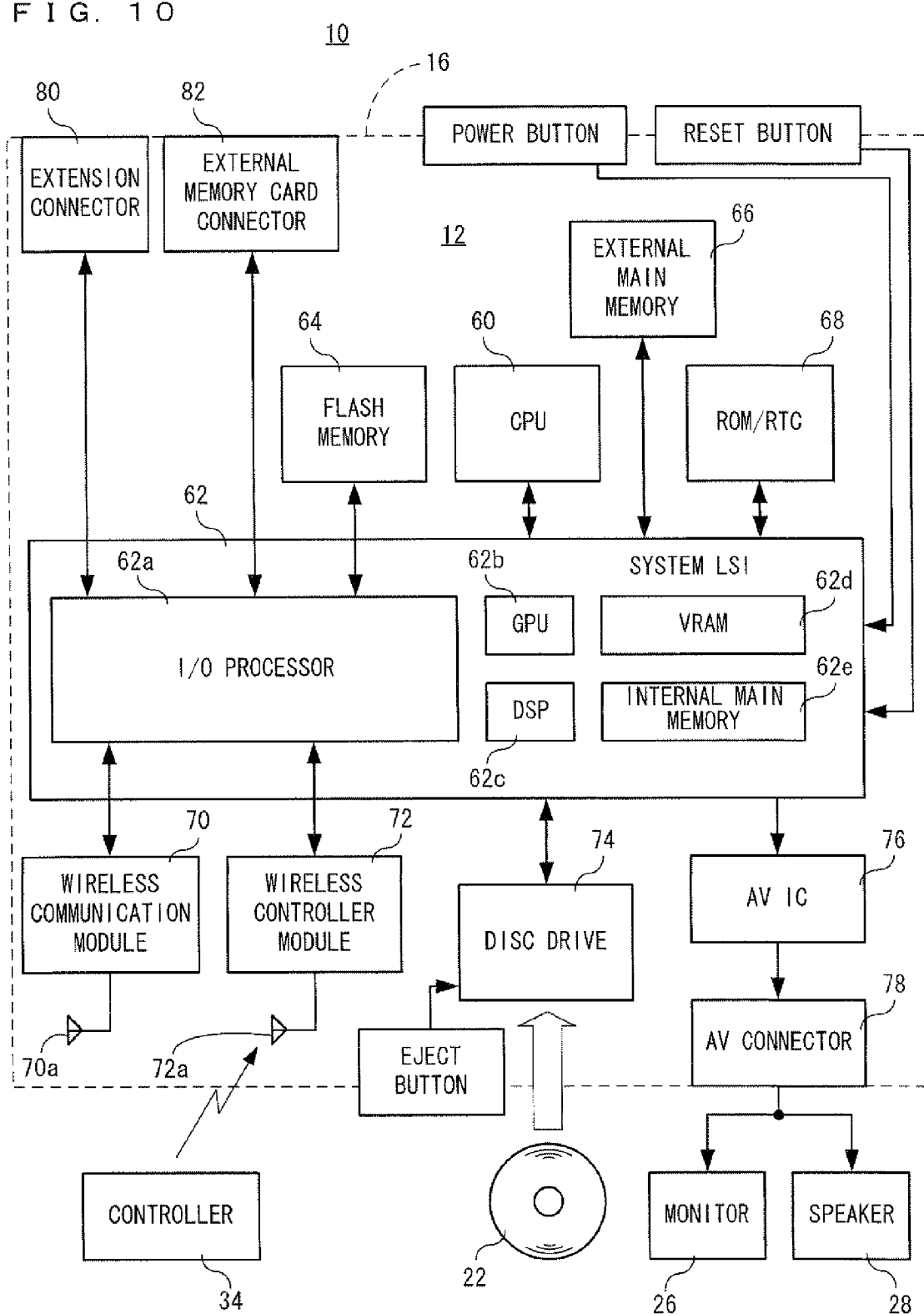

(GYRO DATA FORMAT)

| YAW ANGULAR VELOCITY DATA |
|---|
| ROLL ANGULAR VELOCITY DATA |
| PITCH ANGULAR VELOCITY DATA |
| YAW ANGULAR VELOCITY MODE INFORMATION |
| ROLL ANGULAR VELOCITY MODE INFORMATION |
| PITCH ANGULAR VELOCITY MODE INFORMATION |
| 2ND CONTROLLER CONNECTION INFORMATION |
| GYRO/2ND CONTROLLER IDENTIFICATION INFORMATION |

(B)

(2ND CONTROLLER DATA FORMAT)

| X-STICK OPERATION DATA |
|---|
| Y-STICK OPERATION DATA |
| X-ACCELERATION DATA |
| Y-ACCELERATION DATA |
| Z-ACCELERATION DATA |
| BUTTON OPERATION DATA |
| 2ND CONTROLLER CONNECTION INFORMATION |
| GYRO/2ND CONTROLLER IDENTIFICATION INFORMATION |

F I G. 1 7
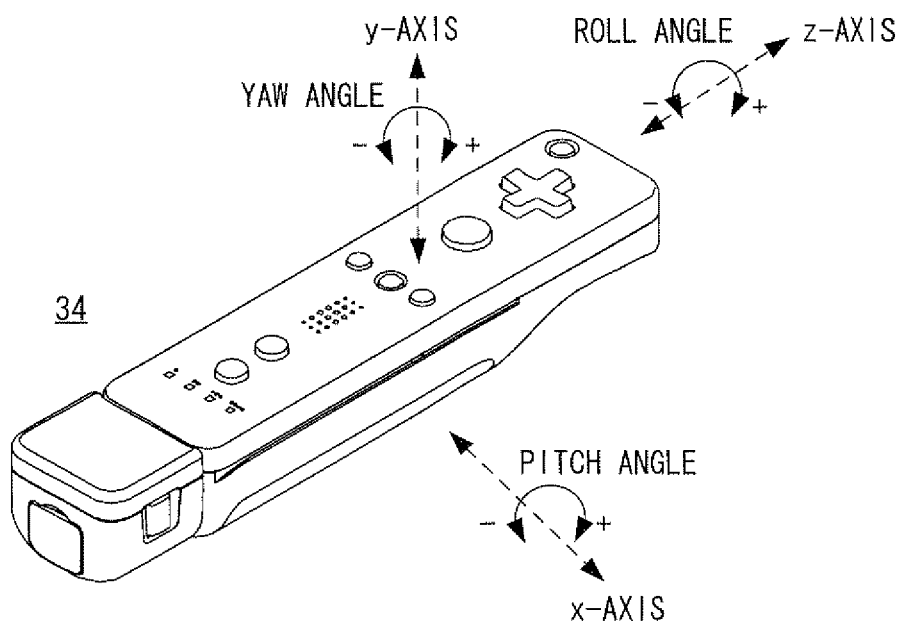

F I G. 1 9

| MODE<br>CONTROLLED OBJECT | STANDBY | BYPASS | GYRO | GYRO & 2ND CONTROLLER |
|---|---|---|---|---|
| GYRO FUNCTION | No Active | No Active | Active | Active |
| GYRO POWER | OFF | OFF | ON | ON |
| BUS SWITCH | Connect | Connect | Disconnect | Disconnect |
| EXTENSION CONNECTOR | No Active | Active | No Active | Active |
| Attach1 | Low | High | High | High |
| I2C ADDRESS | PARTICULAR | PARTICULAR | – | – |

FIG. 24
(A)
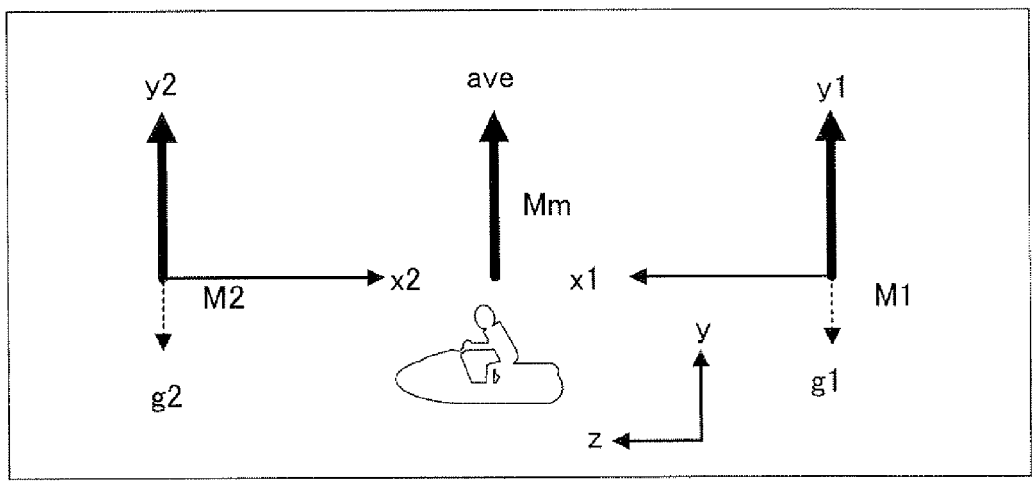
(B)
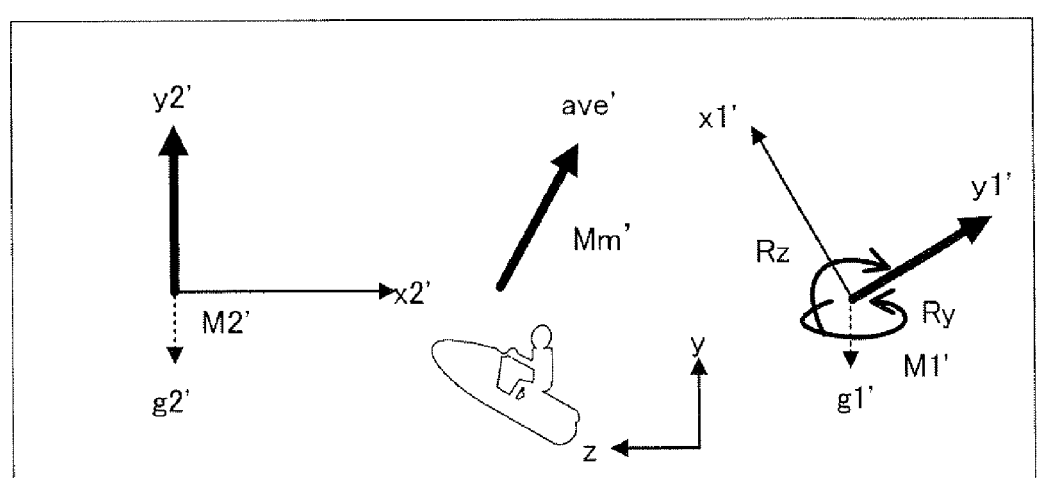
(C)
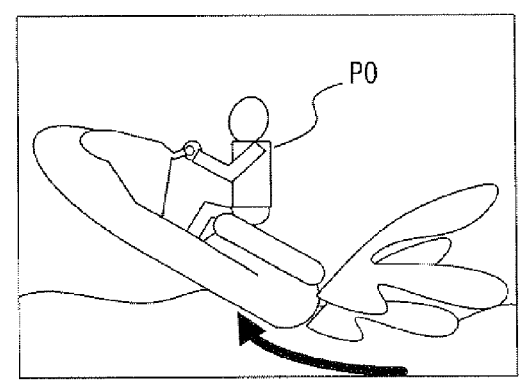

F I G. 3 1
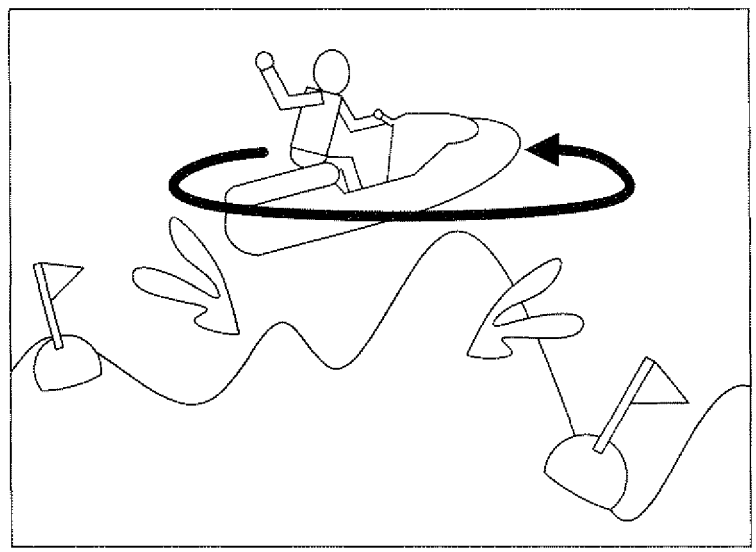
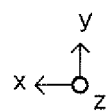

| WATER-IMMERSED VOLUME | DEGREE OF CONTACT D |
|---|---|
| 72~ | 1 |
| 64~71.9 | 0.9 |
| 56~63.9 | 0.8 |
| ⋮ | ⋮ |
| 8~15.9 | 0.2 |
| 0.1~0.79 | 0.1 |
| 0 | 0 |

NORMAL DIRECTION
HYPOTHETICAL THICKNESS
SURFACE OF GROUND

SNOWBOARD OBJECT
COLLISION DETECTION BALL

GAME APPARATUS AND COMPUTER-READABLE STORAGE MEDIUM HAVING GAME PROGRAM STORED THEREIN

CROSS REFERENCE TO RELATED APPLICATION

The disclosure of Japanese Patent Application No. 2008-268461, filed on Oct. 17, 2008, is incorporated herein by reference.

BACKGROUND OF THE INVENTION

1. Field of the Invention

The present invention relates to a game apparatus for causing a player object and a field object that are present in a virtual game space to be displayed in a display device and to a computer-readable storage medium having stored therein a game program, and particularly relates to a game apparatus for controlling the orientation of a player object in a virtual game space, based on the motion applied to an input device itself, and to a computer-readable storage medium having stored therein a game program.

2. Description of the Background Art

Conventionally, a game apparatus using the angular velocity detected by a gyro sensor is known (Japanese Laid-Open Patent Publication No. 2006-68027, for example). This game apparatus includes a housing capable of being held by a player, a display screen provided in the housing, and a gyro sensor for detecting the angular velocity around the axis vertical to the display screen. When the player rotates the game apparatus itself around the axis vertical to the display screen, the rotation angle of the housing is calculated based on the detected angular velocity, whereby a game image is rotated in accordance with the calculated rotation angle.

In the game apparatus described above, the gyro sensor constantly outputs some values even when not rotating, and therefore, to calculate the actual angular velocity value when rotating, an angular velocity value outputted from the gyro sensor when not rotating is set as an initial value of a neutral position value and stored. Since the neutral position value thus set may deviate due to the characteristics of the gyro sensor, a correction process of the value is also performed. For example, when it is determined that a plurality of angular velocity values acquired in a predetermined time are constant, it is determined whether or not there is a difference between this constant value and the neutral position value. When it is determined that there is a difference, the neutral position value is corrected so as to perform a process of providing the player with a comfortable sense of playing.

However, the game apparatus described above has the following problems. Generally, a game using a gyro sensor is likely to be affected by the accumulation of errors of the angular velocity detected by the gyro sensor. In response, the game apparatus described above requires adjustments such as the neutral position and the correction process, but these adjustments are complicated for game processing. Further, in the game apparatus described above, since the correction process is performed, for example, using the plurality of angular velocity values acquired in the predetermined time, the error caused by a drastic change in angular velocity cannot be absorbed.

SUMMARY OF THE INVENTION

Therefore, an object of the present invention is to provide a game apparatus capable of, when using a motion sensor such as a gyro sensor, performing an operation unlikely to be affected by the errors in the detection of the sensor, and also to provide a computer-readable storage medium having stored therein a game program.

The present invention has the following features to attain the above-mentioned object. Note that in this section, reference numerals, supplemental descriptions, and the like in parentheses merely indicate correspondence with the below-described embodiment so as to assist understanding of the present invention, and do not limit the present invention in any way.

A first aspect is a game apparatus for causing a player object and a field object that are present in a virtual game space to be displayed in a display device (26), and includes operation data acquisition means (60), amount-of-change calculation means (60), position orientation calculation means (60), degree-of-contact calculation means (60), and orientation change means (60). The operation data acquisition means acquires operation data at least including motion data, which is data representing a motion of a predetermined input device (34, 36), from the input device. The amount-of-change calculation means calculates an amount of change of the input device in a predetermined period of time, based on the motion data. The position orientation calculation means calculates a position and an orientation of the player object in the virtual game space. The degree-of-contact calculation means calculates a degree of contact, which represents a degree of the player object and the field object contacting each other in the virtual game space. The orientation change means changes the orientation of the player object, based on the amount of change and the degree of contact. Here, the "field object" refers to a field on which the player object takes various actions in the virtual game space, and may be, for example, a ground object and a surface-of-water object. The "degree of contact" may be represented by values in a predetermined range in a gradual manner, such as 1 to 10, or may be represented by two steps of 0 and 1.

According to the first aspect, it is possible to provide the game apparatus capable of performing an orientation control of the player object, based on the degree of the field object and the player object contacting each other, and of performing a more accurate orientation control unlikely to be affected by errors.

In a second aspect based on the first aspect, the input device includes a gyro sensor. The operation data acquisition means acquires angular velocity data, outputted from the gyro sensor, as the motion data. The amount-of-change calculation means calculates the amount of change, based on the angular velocity data.

According to the second aspect, it is possible to provide the game apparatus capable of: performing the orientation control using the angular velocity data; and even detecting the change of the orientation of the input device that cannot be detected using accelerations and reflecting in the orientation of the player object the detected change, and to provide the game program. Further, it is also possible to provide the game apparatus capable of performing the orientation control that minimizes the effect of the accumulation of the errors caused in the gyro sensor.

In a third aspect based on the first aspect, the input device includes an acceleration sensor. The operation data acquisition means acquires acceleration data, outputted from the acceleration sensor, as the motion data. The amount-of-change calculation means calculates the amount of change, based on the acceleration data.

According to the third aspect, it is possible to provide the game apparatus for: performing the orientation control using the acceleration data; changing the orientation of the player object by performing an intuitive operation on the input device; and realizing a variety of operations and improving operability.

In a fourth aspect based on the third aspect, the amount-of-change calculation means calculates a velocity of movement of the motion of the input device in the predetermined period of time by integrating accelerations represented by the acceleration data. The orientation change means changes the orientation of the player object, based on the velocity of movement and the degree of contact.

According to the fourth aspect, it is possible to provide the game apparatus capable of performing the orientation control, based on the velocity of movement of the input device, and performing a variety of operations.

In a fifth aspect based on the first aspect, the orientation change means changes the orientation of the player object, based on the amount of change, only when the degree of contact between the player object and the field object is smaller than a predetermined value.

According to the fifth aspect, when performing the orientation control for a short period of time, such as while the player object is jumping in a space in which a gravity is set, it is possible to perform a more accurate orientation control unlikely to be affected by errors.

In a sixth aspect based on first aspect, the orientation change means changes the orientation of the player object such that the smaller the degree of contact between the player object and the field object, the larger the proportion of reflecting in the change of the orientation of the player object the amount of change.

According to the sixth aspect, the player can perform a comfortable orientation control of the player object.

In a seventh aspect based on the first aspect, the field object is a liquid object. The game apparatus further comprises water-immersed volume calculation means for calculating a volume of a portion, immersed in the field object, of the player object. The degree-of-contact calculation means calculates the degree of contact, based on the volume.

According to the seventh aspect, when performing an orientation control of an object such as a board floating on the surface of water, it is possible to perform a comfortable orientation control.

In an eighth aspect based on the first aspect, the field object is an object representing the ground. The game apparatus further comprises ground-contacting area calculation means for calculating an area of a portion, contacting the field object, of the player object. The degree-of-contact calculation means calculates the degree of contact, based on the area.

In a ninth aspect based on the first aspect, the field object is an object representing the ground. The game apparatus further includes intra-ground-surface-space volume calculation means for calculating a volume of a portion, included in a space from a surface of the ground of the field object to a certain height in a normal direction, of the player object. The degree-of-contact calculation means calculates the degree of contact, based on the volume.

According to the eighth and ninth aspects, it is possible to perform the orientation control in accordance with the degree of the player object contacting the ground, and therefore it is possible to perform a comfortable orientation control.

A tenth aspect is a computer-readable storage medium having stored therein a game program to be executed by a computer of a game apparatus for causing a player object and a field object that are present in a virtual game space to be displayed in a display device, and the game program causes the computer to function as operation data acquisition means (S2), amount-of-change calculation means (S21), position orientation calculation means (S22), degree-of-contact calculation means (S41), and orientation change means (S47). The operation data acquisition means acquires operation data at least including motion data, which is data representing a motion of a predetermined input device, from the input device. The amount-of-change calculation means calculates an amount of change of the input device in a predetermined period of time, based on the motion data. The position orientation calculation means calculates a position and an orientation of the player object in the virtual game space. The degree-of-contact calculation means calculates a degree of contact, which represents a degree of the player object and the field object contacting each other in the virtual game space. The orientation change means changes the orientation of the player object, based on the amount of change and the degree of contact.

In an eleventh aspect based on the tenth aspect, the input device includes a gyro sensor. The operation data acquisition means acquires angular velocity data, outputted from the gyro sensor, as the motion data. The amount-of-change calculation means calculates the amount of change, based on the angular velocity data.

In a twelfth aspect based on the tenth aspect, the input device includes an acceleration sensor. The operation data acquisition means acquires acceleration data, outputted from the acceleration sensor, as the motion data. The amount-of-change calculation means calculates the amount of change, based on the acceleration data.

In a thirteenth aspect based on the twelfth aspect, the amount-of-change calculation means calculates a velocity of movement of the motion of the input device in the predetermined period of time by integrating accelerations represented by the acceleration data. The orientation change means changes the orientation of the player object, based on the velocity of movement and the degree of contact.

In a fourteenth aspect based on the tenth aspect, the orientation change means changes the orientation of the player object, based on the amount of change, only when the degree of contact between the player object and the field object is smaller than a predetermined value.

In a fifteenth aspect based on the tenth aspect, the orientation change means changes the orientation of the player object such that the smaller the degree of contact between the player object and the field object, the larger the proportion of reflecting in the change of the orientation of the player object the amount of change.

In a sixteenth aspect based on the tenth aspect, the field object is a liquid object. The game program further causes the computer to function as water-immersed volume calculation means for calculating a volume of a portion, immersed in the field object, of the player object. The degree-of-contact calculation means calculates the degree of contact, based on the volume.

In a seventeenth aspect based on the tenth aspect, the field object is an object representing the ground. The game program further causes the computer to function as ground-contacting area calculation means for calculating an area of a portion, contacting the field object, of the player object. The degree-of-contact calculation means calculates the degree of contact, based on the area.

In an eighteenth aspect based on the tenth aspect, the field object is an object representing the ground. The game program further causes the computer to function as intra-ground-surface-space volume calculation means for calculating a volume of a portion, included in a space from a surface of the ground of the field object to a certain height in a normal direction, of the player object. The degree-of-contact calculation means calculates the degree of contact, based on the volume.

According to the computer-readable storage medium based on the tenth through eighteenth aspects, it is possible to obtain an effect similar to that of the game apparatus described above.

According to the present invention, it is possible to provide the game apparatus capable of performing an orientation control of the player object, based on the degree of the field object and the player object contacting each other, and performing an orientation control unlikely to be affected by errors, and to provide the computer-readable storage medium having stored therein the game program.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an external view illustrating a game system 10 according to an embodiment of the present invention;

FIG. 4 is a schematic diagram showing the external view of a connector of the second controller;

FIG. 5 is a schematic diagram showing the state where a string of a strap attached to the first controller is hooked to a hook of the connector of the second controller when the connector is attached to the first controller;

FIG. 10 is a block diagram showing the electrical structure of the embodiment;

FIG. 16 is a diagram showing formats of the data handled by the gyro sensor unit;

FIG. 17 is a schematic diagram showing a yaw angle, a pitch angle, and a roll angle that can be detected by a gyro sensor;

FIG. 19 is a schematic diagram showing a table listing the controls performed by a microcomputer of the gyro sensor unit on a mode-by-mode basis;

FIG. 24 is a diagram illustrating an operation based on angular velocities in the game of the present embodiment;

FIG. 31 is an example of the game screen;

DESCRIPTION OF THE PREFERRED EMBODIMENTS

Figure 2:
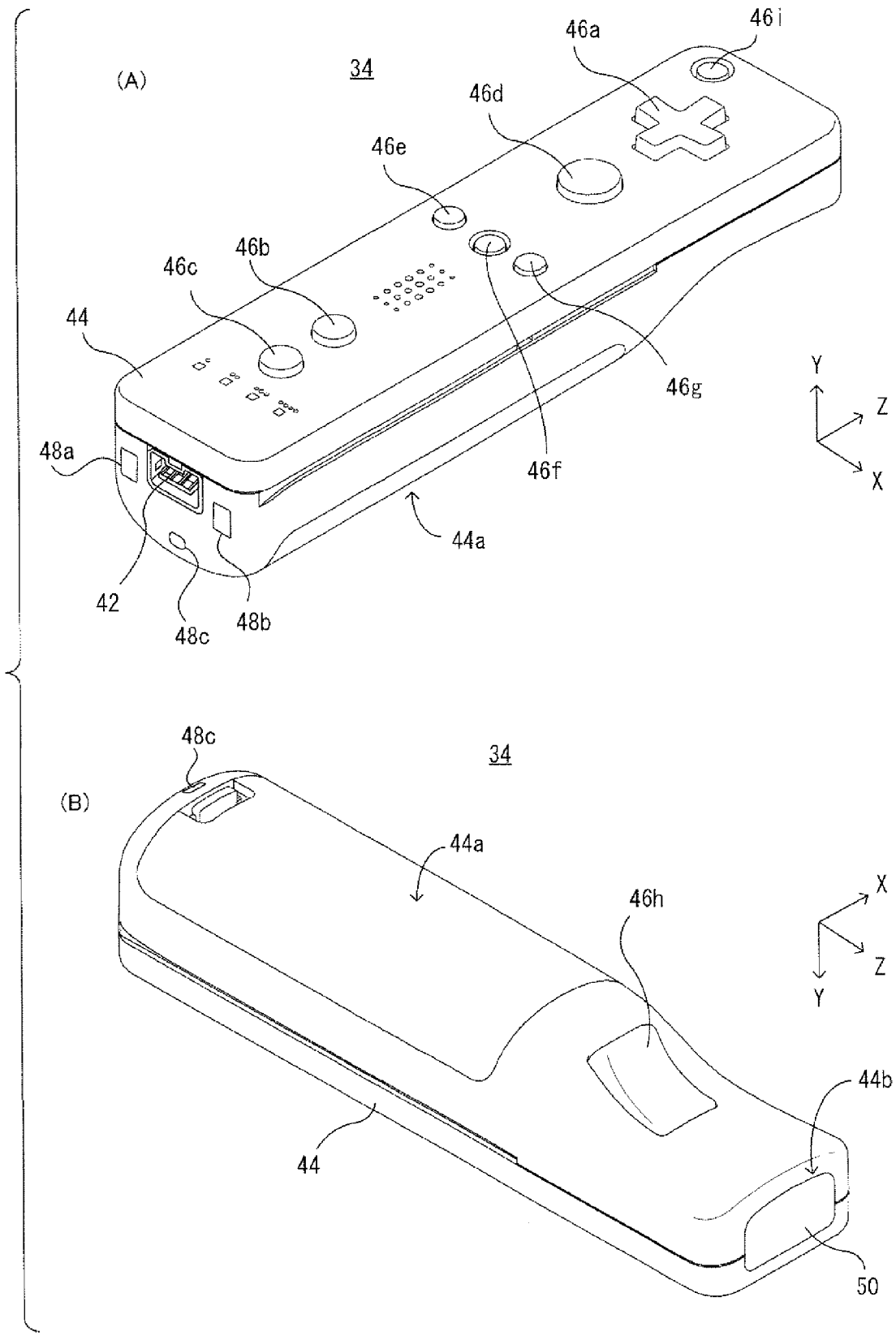
FIG. 2 is a schematic diagram showing the external view of a first controller (a remote control) used in the present embodiment.

Referring to FIG. 1, a game system 10 according to an embodiment of the present invention includes a video game apparatus (hereinafter also simply referred to as a "game apparatus") 12 and a controller 14. The controller 14 functions as an input device or an operation device for a user or a player. The game apparatus 12 and the controller 14 are wirelessly connected to each other. The wireless communication is performed in accordance with, for example, a wireless communication standard such as the BLUETOOTH (registered trademark) standard, but may be performed in accordance with another standard such as an infrared standard or a wireless LAN standard.

The game apparatus 12 includes a generally parallelepiped housing 16. On the front surface of the housing 16, a disc slot 18 and an external memory card slot cover 20 are provided. As an example, an optical disc 22 is used as an information storage medium having stored therein a game program and data. The optical disc 22 is inserted through the disc slot 18 and loaded into a disc drive 74 (see FIG. 10) provided within the housing 16. Inside the external memory card slot cover 20, an external memory card connector 82 (see FIG. 10) is provided. An external memory card (not shown) is inserted into the external memory card connector 82. The external memory card is used to load and temporarily store the game program and the like read from the optical disc 22, and is used to store (save) the game data of (the data stored after or during) a game played using the game system 10. This game data may be stored in an internal memory such as a flash memory 64 (see FIG. 10), instead of the external memory card.

On the rear surface of the housing 16 of the game apparatus 12, an AV cable connector (not shown) is provided. The game apparatus 12 is connected to a monitor (display) 26 via an AV cable 24, using the AV cable connector. Typically, the monitor 26 is a color television such that the AV cable 24 inputs an image signal and a sound signal from the game apparatus 12 to a video input terminal and an audio input terminal of the color television, respectively. For example, a game image of a 3D video game is displayed on the screen of the monitor 26 and a stereo game sound, such as game music or sound effects, is outputted from speakers 28 built in the monitor 26. In the adjacent area of the monitor 26 (above the monitor 26 in the present embodiment), a marker section 30 including two infrared LEDs (markers) 30a and 30b is provided. The marker section 30 is connected to the game apparatus 12 via a power cable (not shown). The power to the marker section 30 is supplied from the game apparatus 12. The markers 30a and 30b emit light and output infrared light forward from the monitor 26. Note that the power to the game apparatus 12 is supplied from a general AC adapter (not shown). The AC adapter, connected to a standard household wall socket, converts household power into a low DC voltage signal suitable to drive the game apparatus 12. In another embodiment, a battery may be used as the power supplies.

Although described in detail below, the controller 14 includes a first controller 34 and a second controller 36, each capable of being held with one hand, and also includes a gyro sensor unit 100 detachably attached to the first controller 34. On the rear end surface of the first controller 34, a connector 42 (see (A) of FIG. 2 and FIG. 11) is provided. At the leading end of a cable 38 extending from the rear end of the second controller 36, a connector 40 (see FIG. 1, FIG. 5, and FIG. 11) is provided. On the front and rear end surfaces of the gyro sensor unit 100, connectors 106 and 108 (see (A) and (B) of FIG. 6, FIG. 7, and FIG. 11) are provided, respectively. The connector 106 on the front end surface of the gyro sensor unit 100 can be connected to the connector 42 of the first controller 34, while the connector 40 of the second controller 36 can be connected to the connector 42 of the first controller 34 or the connector 108 on the rear end surface of the gyro sensor unit 100. The connector 106 may be connected to the connector 42, whereby the gyro sensor unit 100 is physically and electrically coupled to the first controller 34. The gyro sensor unit 100 thus attached to (integrated with) the first controller 34 outputs angular velocity data representing the angular velocities of the first controller 34.

When the gyro sensor unit 100 is thus connected to the first controller 34, the connector 40 of the second controller 36 is connected to the connector 108 on the rear end surface of the gyro sensor unit 100. That is, the connector 42 can be selectively connected to the connector 106 or the connector 40, while the connector 40 can be selectively connected to the connector 42 or the connector 108. The connectors 106 and 108 of the gyro sensor unit 100, although not connectable to each other due to being provided in the same housing, have shapes connectable to each other. The input data of the second controller 36 is transmitted to the first controller 34 via the cable 38 and the gyro sensor unit 100. The first controller 34 transmits controller data, including the input data of the first controller 34 itself, the angular velocity data from the gyro sensor unit 100, and the input data of the second controller 36, to the game apparatus 12.

Note that when the connector 40 is connected to the connector 42, the operation data and the input data of the second controller 36 are transmitted to the first controller 34 via the cable 38, and the first controller 34 transmits the controller data, including the input data of the first controller 34 itself and the input data of the second controller 36, to the game apparatus 12.

At this time, in a system of transmitting the input data of the first controller 34 and the input data of the second controller 36, the amount of data transmitted at a time may be designed not to increase. However, in the case where the gyro sensor unit 100 is added, the angular velocity data from the gyro sensor unit 100 and the input data of the second controller 36 may be alternately outputted to the first controller 34, whereby both the angular velocity data and the input data can be transmitted. Since this data control can be performed by the gyro sensor unit 100, it is not necessary to change any of the designs of the first controller 34 and the second controller 36.

Since the first controller 34 thus, for example, wirelessly, inputs not only an operation signal and the operation data (data) of the first controller 34 but also operation signals and the operation data (data) from the second controller 36 and the gyro sensor unit 100, to the game apparatus 12 remotely from the game apparatus 12, the first controller 34 will herein after also be referred to as a "remote control". Further, the second controller 36 will herein after also be referred to as a "nunchaku", which is a nickname based on its form.

Thus, the gyro sensor unit 100 is an extension unit for adding a gyro function to the first controller 34, using the existing first controller 34 and second controller 36 unchanged.

In the game system 10, to play a game (or another application), first, the user turns on power to the game apparatus 12, and then, the user selects an appropriate optical disc 22 having stored therein a video game (or another application to be executed) and loads the optical disc 22 into the disc drive 74 through the disc slot 18 of the game apparatus 12. Accordingly, the game apparatus 12 starts executing the video game or said another application based on software stored in the loaded optical disc 22. The user operates the controller 14 so as to provide input to the game apparatus 12.

FIG. 2 shows an example of the external view of the first controller (or remote control) 34. (A) of FIG. 2 is a perspective view showing the first controller 34 from the top rear side thereof (B) of FIG. 2 is a perspective view showing the first controller 34 from the bottom front side thereof.

The first controller 34 includes a housing 44 formed by, for example, plastic molding. The housing 44 has a generally parallelepiped shape extending in the longitudinal direction from front to rear (a Z-axis direction). The whole housing 44 can be held with one hand by an adult or even a child. As an example, the housing 44 is approximately as wide and long as a person's palm. The player can perform a game operation by pressing the buttons provided on the first controller 34 and changing the position and the direction of the first controller 34 itself.

On the housing 44, a plurality of operation buttons are provided. That is, on the top surface of the housing 44, a cross key 46a, a 1-button 46b, a 2-button 46c, an A-button 46d, a minus button 46e, a home button 46f, and a plus button or a start button 46g are provided. On the bottom surface of the housing 44, on the other hand, a recessed portion is formed. On a slope surface (on the rear surface side) of the recessed portion, a B-button 46h is provided. These buttons (switches) 46a, 46b, 46c, 46d, 46e, 46f, 46g, and 46h are each assigned an appropriate function in accordance with the game program executed by the game apparatus 12. In addition, on the top surface of the housing 44, a power switch 46i for remotely turning on/off power to the game apparatus 12 is provided. The buttons (switches) provided on the first controller 34 will herein after also be collectively referred to as an "operation (input) section" using a reference numeral "46".

The cross key 46a is a four-direction push switch and includes operation sections corresponding to four directions (front or up, rear or down, right, and left) indicated by arrows. By operating one of these operation sections, the player can instruct a character (a player character) or an object (a player object), each operable by the player, to move in the indicated direction, instruct a cursor to move in the indicated direction, or simply indicate a direction.

The 1-button 46b and the 2-button 46c are push-button switches. These buttons are used to perform a game operation such as adjusting a viewpoint position and a viewpoint direction when displaying a three-dimensional game image, i.e., the position and the angle of view of a virtual camera. Alternatively, the 1-button 46b and the 2-button 46c may be used to operate the same operations as or auxiliary operations of the operations of the A-button 46d and the B-button 46h.

The A-button 46d is a push-button switch and is used to cause the player character or the player object to take an arbitrary action except to move in the indicated directions, such as hitting (punching), throwing, catching (acquiring), riding, or jumping. For example, in an action game, it is possible to instruct the player character or the player object to, for example, jump, punch, or move a weapon. In a role-playing game (RPG) or a simulation RPG, it is possible to instruct the player character or the player object to, for example, acquire an item, or select and determine a weapon and a command. When the first controller 34 is used as a pointing device, the A-button 46d is used to give an instruction to determine an icon or a button image, each indicated by a pointer (an indicating image) in a game screen. For example, when the icon or the button image is determined, it is possible to input an instruction or a command, each set in advance corresponding to the icon or the button image.

The minus button 46e, the home button 46f, the plus button 46g, and the power switch 46i are also push-button switches. The minus button 46e is used to select a game mode. The home button 46f is used to display a game menu (a menu screen). The plus button 46g is used to, for example, start (restart) or pause a game. The power switch 46i is used to remotely turn on/off power to the game apparatus 12.

Note that in the present embodiment, a power switch for tuning on/off power to the first controller 34 itself is not provided such that the first controller 34 is turned on when any of the buttons switches of the operation (input) section 46 of the first controller 34 is operated, and turned off when none is operated for a predetermined time (e.g., 30 seconds).

The B-button 46h is also a push-button switch and is mainly used to perform input that simulates a trigger such as shooting, or to specify a position selected by the first controller 34. When the B-button 46h is pressed down, the motion or the parameter of the player object can also be maintained in a constant state. In a certain case, the B-button 46h functions as a conventional B-button and is used, for example, to cancel an action or a command, each determined using the A-button 46d.

In the housing 44, an acceleration sensor 84 (see FIG. 11) for detecting accelerations in the three-axis directions of X, Y, and Z shown in FIG. 2 (i.e., the left-right direction, the up-down direction, and the front-rear direction, respectively) is provided. Note that as the acceleration sensor 84, a two-axis acceleration sensor for detecting accelerations in two of the left-right direction, the up-down direction, and the front-rear direction may be used in accordance with the shape of the housing 44, the limitation on the manner of holding the first controller 34, or the like. In some cases, a one-axis acceleration sensor may be used.

On the front surface of the housing 44, a light entrance 44b is formed, and in the housing 44, an imaging information calculation section 50 is provided. The imaging information calculation section 50 includes a camera for capturing infrared light and a calculation section for calculating the coordinates of capturing targets in an image. The imaging information calculation section 50 captures an object field including the markers 30a and 30b, using infrared light, and calculates the position coordinates of the markers 30a and 30b in the captured object field.

On the rear surface of the housing 44, the connector 42 is provided. The connector 42 is used to connect the first controller 34 to other devices. In the present embodiment, the connector 40 of the second controller 36 or the connector 106 of the gyro sensor unit 100 is connected to the connector 42.

On the rear surface of the housing 44, a pair of holes 48a and 48b is formed across the connector 42 in the left-right direction (the X-axis direction). A pair of hooks 112Fa and 112Fb (see (A) of FIG. 6) for fixing the gyro sensor unit 100 to the rear surface of the housing 44 is inserted into the pair of holes 48a and 48b, respectively. On the rear surface of the housing 44, a hole 48c for attaching a strap 56 (see FIG. 5) is also formed.

Figure 3:
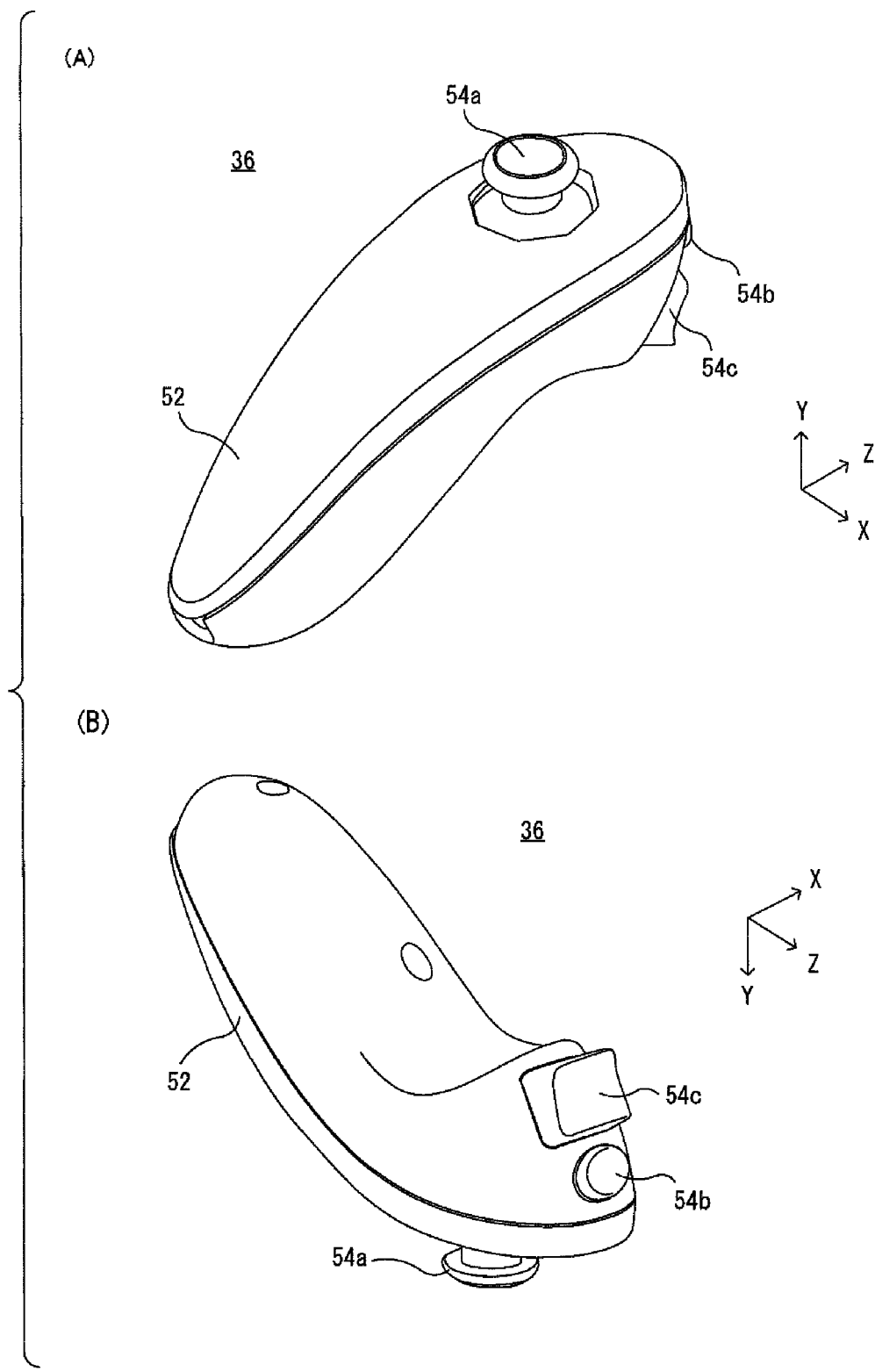
FIG. 3 is a schematic diagram showing the external view of a second controller (a nunchaku) used in the present embodiment.

FIG. 3 shows an example of the external view of the second controller (or nunchaku) 36. (A) of FIG. 3 is a perspective view showing the second controller 36 from the top rear side thereof. (B) of FIG. 3 is a perspective view showing the second controller 36 from the bottom front side thereof. Note that FIG. 3 does not show the cable 38 of the second controller 36.

The second controller 36 includes a housing 52 formed by, for example, plastic molding. In a planar view, the housing 52 has a generally elongated elliptical shape extending in the front-rear direction (the Z-axis direction), and is wider on the rear end side than on the front end side, in the left-right direction (the X-axis direction). In a side view, the whole housing 52 has a curved shape in such a manner that the housing 52 slopes down from a horizontal portion on the front end side to the rear end side. Similarly to the first controller 34, the whole housing 52 can be held with one hand by an adult or even a child, but is slightly shorter than the housing 44 of the first controller 34, in the longitudinal direction (the Z-axis direction). In the second controller 36, the player can also perform a game operation by operating buttons and a stick and changing the position and the direction of the controller itself.

On the front end side of the top surface of the housing 52, an analog joystick 54a is provided. At the front end of the housing 52, a front end surface slightly inclined toward the rear direction is provided, and on the front end surface, a C-button 54b and a Z-button 54c are provided, arranged in the up-down direction (the Y-axis direction shown in FIG. 3). The analog joystick 54a and the buttons 54b and 54c are each assigned an appropriate function in accordance with the game program executed by the game apparatus 12. The analog joystick 54a and the buttons 54b and 54c that are provided on the second controller 36 will herein after also be collectively referred to as an "operation section" using a reference numeral "54".

In the housing 52 of the second controller 36, an acceleration sensor 86 (see FIG. 11) is provided. As the acceleration sensor 86, an acceleration sensor similar to the acceleration sensor 84 of the first controller 34 is used. Specifically, in the present embodiment, a three-axis acceleration sensor is used to separately detect accelerations in the three-axis directions including the left-right direction (the X-axis direction), the up-down direction (the Y-axis direction), and the front-rear direction (the Z-axis direction) of the second controller 36. Therefore, similarly to the first controller 34, an appropriate calculation process is performed on the detected accelerations, whereby it is possible to calculate the tilt and the rotation of the second controller 36, the orientation of the acceleration sensor 86 with respect to the direction of gravity, and the like. Note that it is also possible to calculate the motions applied to the first controller 34 by a swing and the like in a similar manner.

FIG. 4 shows an example of the external view of the connector 40 of the second controller 36. FIG. 4 is a perspective view showing the connector 40 from the bottom front side thereof. Note that FIG. 4 does not show the cable 38 either. The connector 40 includes a housing 122 formed by, for example, plastic molding. On the bottom surface of the housing 122, a hook 124 is provided. The hook 124 is basically used to, when the connector 40 is connected to (the connector 42 of) the first controller 34, hook a string of the strap 56 attached to the first controller 34.

Figure 6:
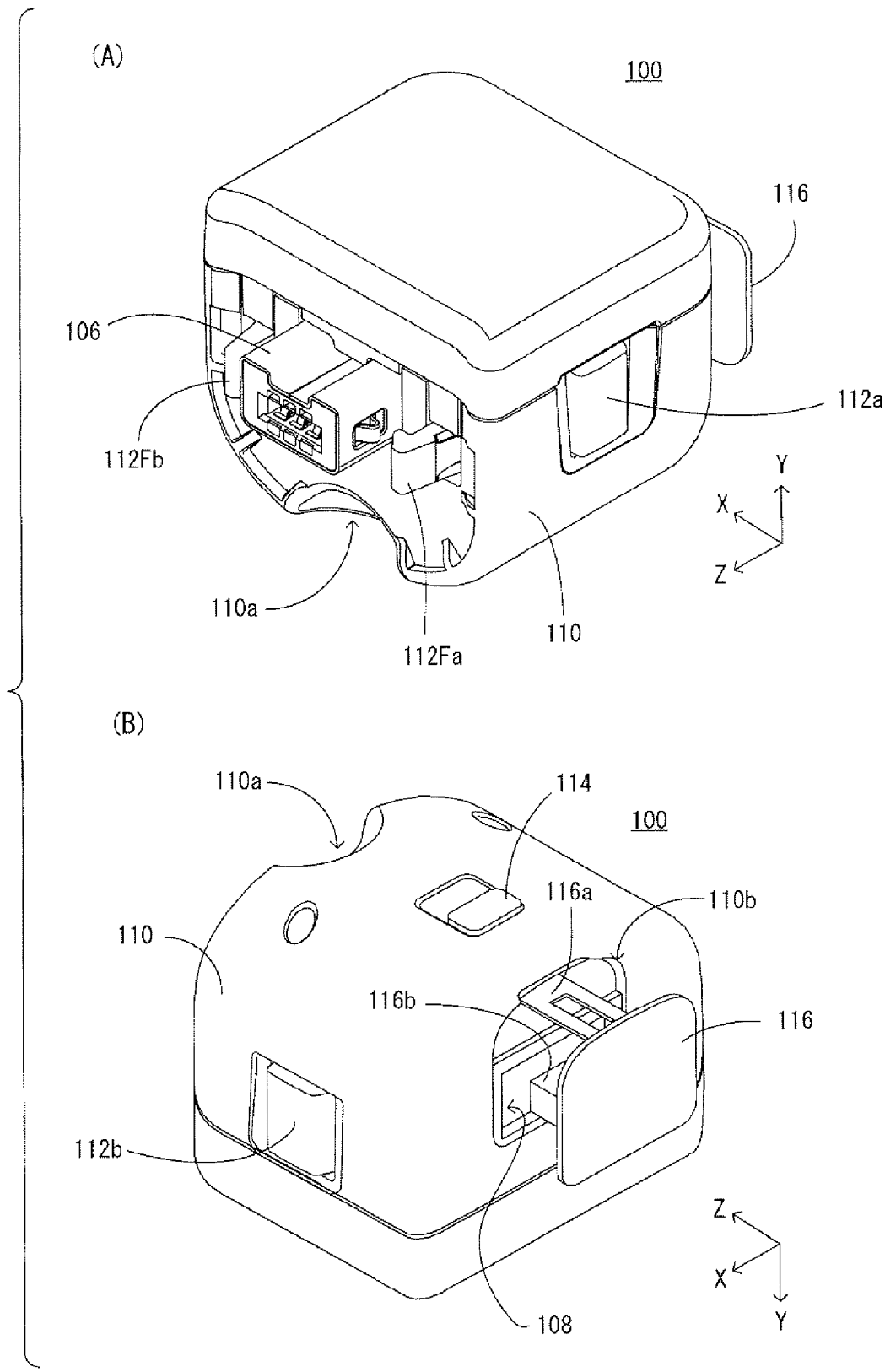
FIG. 6 is a schematic diagram showing the external view of a gyro sensor unit used in the present embodiment.

FIG. 6 shows an example of the external view of the gyro sensor unit 100. (A) of FIG. 6 is a perspective view showing the gyro sensor unit 100 from the top front side thereof. (B) of FIG. 6 is a perspective view showing the gyro sensor unit 100 from the bottom rear side thereof.

The gyro sensor unit 100 includes a housing 110 formed by, for example, plastic molding. The housing 110 has a generally parallelepiped shape, approximately one-fifth as long as and approximately as wide and thick as the housing 44 of the first controller 34. Even when the gyro sensor unit 100 is attached to the first controller 34, the player can perform a game operation by changing the position and the direction of the first controller 34 itself.

On the front and rear surfaces of the housing 110, the connectors 106 and 108 are provided, respectively. On the both side surfaces of the housing 110, a pair of release buttons 112a and 112b is provided. On the bottom surface of the housing 110, a lock switch 114 is provided. From the bottom end of the front surface to the front end of the bottom surface of the housing 110, a generally spherical recessed portion 110a is provided so as to expose the hole 48c for the strap 56 when the gyro sensor unit 100 is attached to the first controller 34 (see FIG. 8).

On the front surface of the housing 110, the pair of hooks 112Fa and 112Fb linked to the pair of release buttons 112a and 112b, respectively, are provided across the connector 106 in the lateral direction (the X-axis direction). When the connector 106 is connected to the connector 42 so as to attach the gyro sensor unit 100 to the first controller 34, the pair of hooks 112Fa and 112Fb is inserted into the pair of holes 48a and 48b (see (A) of FIG. 2) on the rear surface of the housing 44, respectively, and the claws of the hooks 112Fa and 112Fb hook on to the inner walls of the housing 44. Consequently, the gyro sensor unit 100 becomes fixed to the rear surface of the first controller 34.

Figure 8:
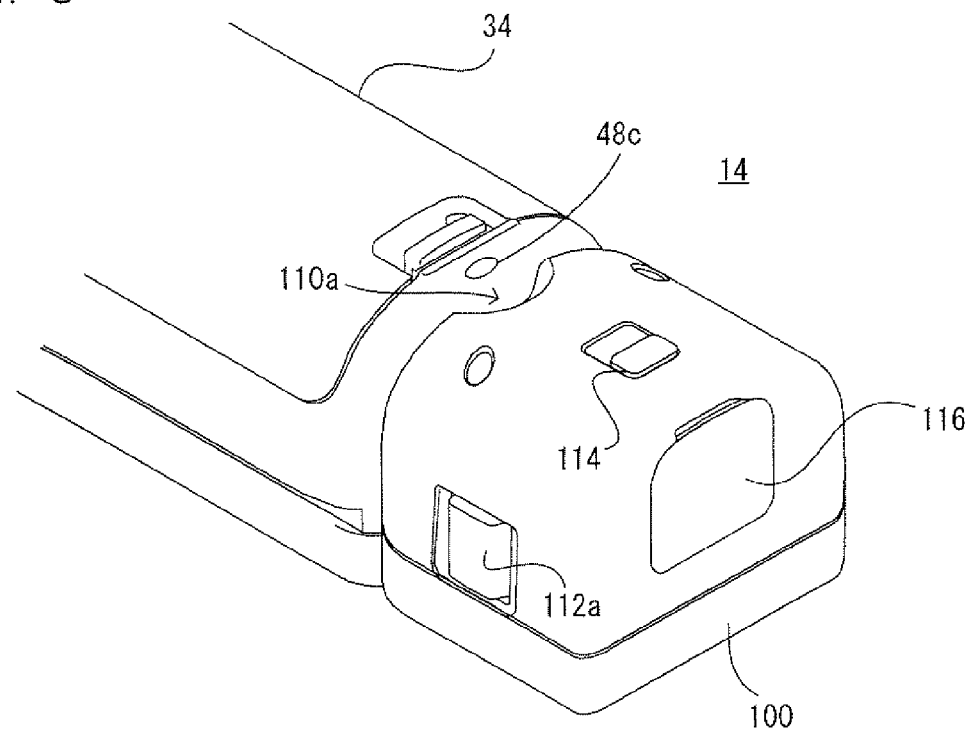
FIG. 8 is a schematic diagram showing the state where the gyro sensor unit is connected to the first controller.

FIG. 8 shows the gyro sensor unit 100 thus attached to the first controller 34. When the pair of release buttons 112a and 112b is pressed in this state, the claws are released and the gyro sensor unit 100 can be detached from the first controller 34.

The lock switch 114 is a slide switch for locking the release buttons 112a and 112b. The release buttons 112a and 112b cannot be pressed (i.e., are in a lock state) when the lock switch 114 is in a first position (e.g., closer to the rear), and can be pressed (i.e., are in a release state) when the lock switch 114 is in a second position (e.g., closer to the front). In the housing 110, lock springs 118a and 118b (see FIG. 7) are provided in such a manner that when the release buttons 112a and 112b are pressed, the lock springs 118a and 118b retract, and while the release buttons 112a and 112b are not pressed, the hooking of the claws is maintained. Therefore, to detach the gyro sensor unit 100, the user is required to press the release buttons 112a and 112b with the lock switch 114 slid from the first position to the second position.

Since the gyro sensor unit 100 is thus attached to the rear surface of the first controller 34, the centrifugal force applied to the gyro sensor unit 100 during a game operation acts, pressing the gyro sensor unit 100 against the first controller 34. While the gyro sensor unit 100 is fixed to the rear surface of the first controller 34 by the hooks 112Fa and 112Fb, the release buttons 112a and 112b are provided with the lock switch 114 to release the hooks 112Fa and 112Fb, and therefore the gyro sensor unit 100 can be fixed to the first controller 34.

On the rear surface of the housing 110, a recessed portion 110b capable of accommodating a connector cover 116 mounted to the connector 108 is formed around the connector 108. At one end of the main surface of the connector cover 116, a protrusion 116a, elongated in the front-rear direction (the Z-axis direction) and thin (i.e., easy to bend), is provided. The front end of the protrusion 116a is engaged with the housing 110 such that even when dismounted from the connector 108, the connector cover 116 is fastened to the housing 110.

Figure 9:
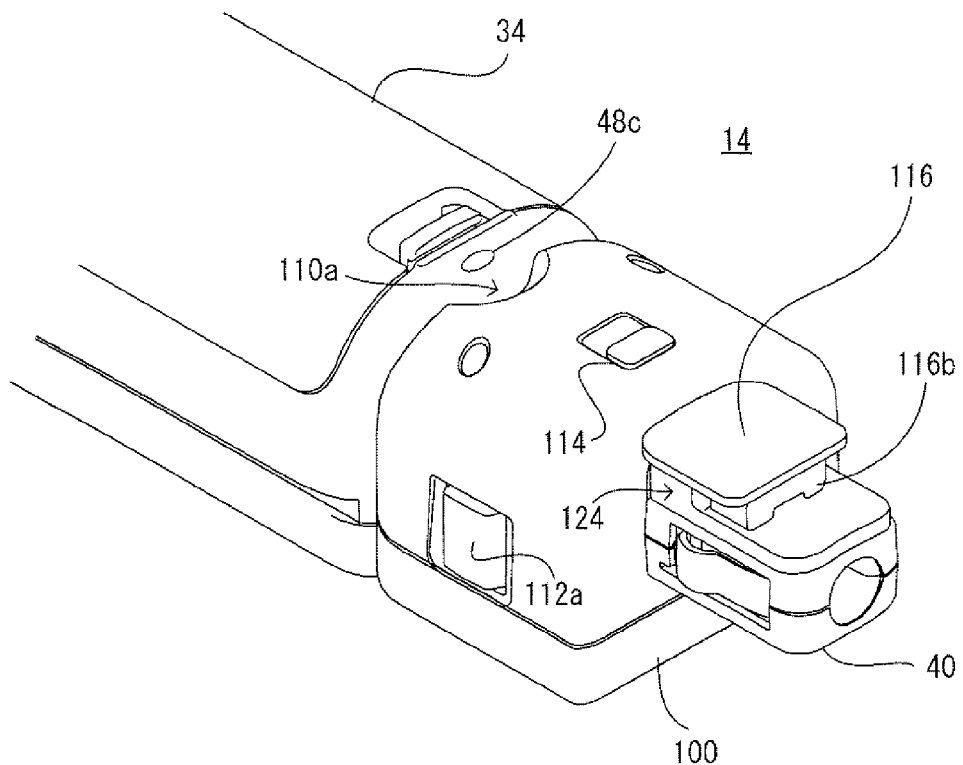
FIG. 9 is a schematic diagram showing the state where the second controller is connected to the first controller via the gyro sensor unit.

At the other end of the main surface of the connector cover 116, a protrusion 116b, elongated in the left-right direction (the X-axis direction) and thick (i.e., difficult to bend), is provided. The thickness (the height in the Z-axis direction) of the protrusion 116b is approximately the same as the thickness (the height in the Y-axis direction) of the hook 124 (see FIG. 4) provided in the connector 40 of the second controller 36. When the second controller 36 is connected to the first controller 34 via the gyro sensor unit 100, the main surface of the connector cover 116 becomes horizontal such that the protrusion 116b is engaged with a side surface of the hook 124, as shown in FIG. 9. The connector cover 116 dismounted from the connector 108 is thus integrated with the connector 40, whereby not only are the operability and the appearance improved, but also the connector 40 can be fixed to the gyro sensor unit 100.

Figure 7:
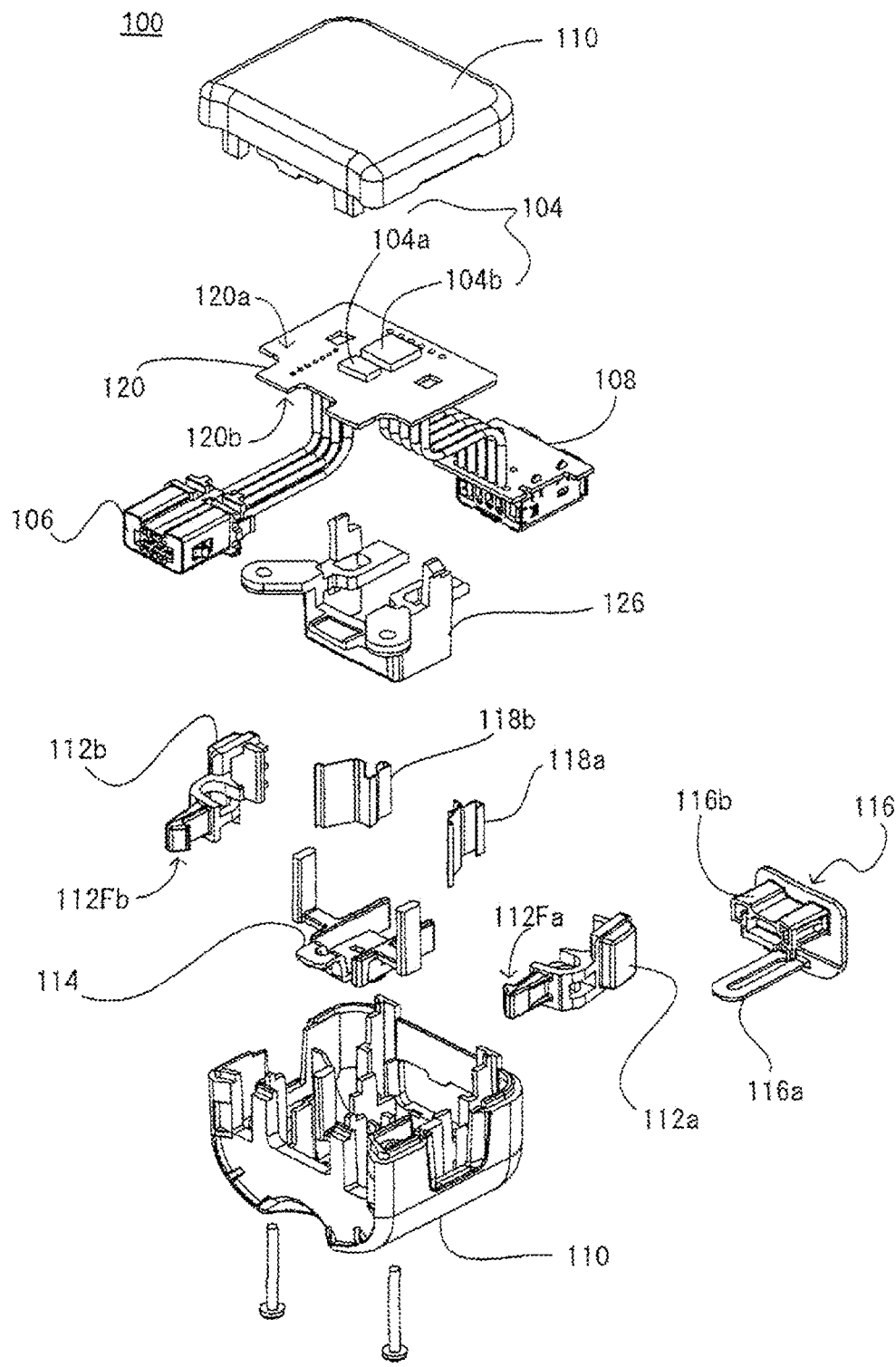
FIG. 7 is a schematic diagram showing the structure of the gyro sensor unit.

FIG. 7 shows an example of the structure of the gyro sensor unit 100. The gyro sensor unit 100 includes a gyro substrate 120 and a supporting member 126, in addition to the housing 110, the connectors 106 and 108, the release buttons 112a and 112b, the hooks 112Fa and 112Fb, the lock switch 114, the connector cover 116, and the lock springs 118a and 118b. The gyro substrate 120 is connected to the connectors 106 and 108 via signal lines, and the supporting member 126 supports the gyro substrate 120 and the connectors 106 and 108.

In the gyro substrate 120, a gyro sensor 104 is provided. The gyro sensor 104 is constructed in two chips of a one-axis gyro sensor 104a and a two-axis gyro sensor 104b. The gyro sensor 104a detects a yaw angular velocity (the angular velocity around the Y-axis) and the gyro sensor 104b detects a roll angular velocity (the angular velocity around the Z-axis) and a pitch angular velocity (the angular velocity around the X-axis). The gyro sensors 104a and 104b are provided, horizontally arranged on a top surface 120a of the gyro substrate 120.

Note that the layout of the gyro sensors 104a and 104b is not limited to that of FIG. 7. In another embodiment, the gyro sensor 104a is horizontally placed on one of the top surface 120a and a bottom surface 120b of the gyro substrate 120, while the gyro sensor 104b is horizontally placed on the other of the top surface 120a and the bottom surface 120b of the gyro substrate 120, facing the gyro sensor 104a across the gyro substrate 120. In yet another embodiment, the gyro sensor 104a is vertically placed on one of the top surface 120a and the bottom surface 120b of the gyro substrate 120, while the gyro sensor 104b is horizontally placed on the other of the top surface 120a and the bottom surface 120b of the gyro substrate 120.

The gyro sensor 104 is not necessarily constructed in two chips, and may be constructed in three chips of three one-axis gyro sensors or may be constructed in one chip of one three-axis gyro sensor. In each case, the position and the direction of each chip is determined so as to properly detect the three angular velocities described above. In some cases, the gyro sensor 104 may include one two-axis gyro sensor or may include one or two one-axis gyro sensors.

Note that the shape of the first controller 34 shown in FIG. 2, the shape of the second controller 36 shown in FIGS. 3 and 4, the shape of the gyro sensor unit 100 shown in FIG. 6, and the shapes, the numbers, the location positions and the like of the buttons (the switches, the sticks, etc.) are provided only for illustrative purposes, and therefore can be changed to other shapes, other numbers, other location positions, and the like, appropriately.

Note that in the preferred embodiments, the sensor is a gyro sensor (an angular velocity sensor), but may be another motion sensor such as an acceleration sensor, a velocity sensor, a displacement sensor, or a rotation angle sensor. Other than a motion sensor, there are an inclination sensor, an image sensor, an optical sensor, a pressure sensor, a magnetic sensor, a temperature sensor, and the like, and even when any one of these sensors is added, it is possible to perform an operation using the detection target of the added sensor. It is possible, using other devices unchanged that are conventionally connected to an operation device, to add any one of these sensors to the operation device.

Further, the power to the controller 14 is supplied from a battery (not shown) replaceably accommodated within the first controller 34. This power is supplied to the second controller 36 via the connector 40 and the cable 38. When the gyro sensor unit 100 is connected to the first controller 34, this power is supplied to the gyro sensor unit 100 via the connector 42 and the connector 106. If the second controller 36 is connected to the gyro sensor unit 100, part of the power supplied from the first controller 34 to the gyro sensor unit 100 is also supplied to the second controller 36 via the connector 108, the connector 40, and the cable 38.

FIG. 10 is a block diagram showing the electrical structure of the game system 10, shown in FIG. 1, according to the present embodiment. Although not shown, the components of the housing 16 are mounted on a printed circuit board. As shown in FIG. 2, in the game apparatus 12, a CPU 60 is provided and functions as a game processor. The CPU 60 is connected to a system LSI 62. The system LSI 62 is connected to an external main memory 66, a ROM/RTC 68, the disc drive 74, and an AV-IC 76.

The external main memory 66 stores a program, such as a game program, or various other data, and is used as a work area or a buffer area of the CPU 60. The ROM/RTC 68, which is a so-called boot ROM, has incorporated therein a program for starting the game apparatus 12 and includes a clock circuit for counting time. The disc drive 74 reads a program, image data, sound data, or the like from the optical disc 22, and writes the read program or data into an internal main memory 62e described below or the external main memory 66, under the control of the CPU 60.

The system LSI 62 includes an input/output processor (I/O processor) 62a, a GPU (Graphics Processor Unit) 62b, a DSP (Digital Signal Processor) 62c, a VRAM 62d, and the internal main memory 62e. Although not shown, these components are connected to each other via an internal bus. The input/output processor 62a performs data transmission/reception, downloads data, and the like. The data transmission/reception will be described below.

The GPU 62b, which forms a part of drawing means, receives a graphics command (a command to draw an image) from the CPU 60 and generates game image data in accordance with the received command. Note that the CPU 60 provides the GPU 62b with an image generation program, which is necessary to generate the game image data, in addition to the graphics command.

Although not shown, the VRAM 62d is connected to the GPU 62b as described above. The GPU 62b accesses the VRAM 62d, thereby acquiring the data (image data including polygon data, texture data, etc.) necessary for the GPU 62b to execute the graphics command. Note that the CPU 60 writes the image data necessary to draw an image into the VRAM 62d via the GPU 62b. The CPU 62b accesses the VRAM 62d and generates the game image data for drawing an image.

Note that in the present embodiment, the case described is where the CPU 62b generates the game image data, but when an arbitrary application other than a game application is executed, the CPU 62b generates image data regarding the arbitrary application.

The DSP 62c functions as an audio processor and generates audio data, corresponding to a sound, a voice, or music that is outputted from the speakers 28, with the use of sound data and acoustic waveform (timbre) data that are stored in the internal main memory 62e or the external main memory 66.

The game image data and the audio data that have been generated as described above are read by the AV-IC 76 and outputted to the monitor 26 and the speakers 28, respectively, via an AV connector 78. Accordingly, a game screen is displayed on the monitor 26 and the sound (music) necessary for the game is outputted from the speakers 28.

The input/output processor 62a is connected to the flash memory 64, a wireless communication module 70, and a wireless controller module 72, and is also connected to an extension connector 80 and the external memory card connector 82. The wireless communication module 70 is connected to an antenna 70a. The wireless controller module 72 is connected to an antenna 72a.

Although not shown, the input/output processor 62a can communicate with other game apparatuses or various servers that are connected to a network, via the wireless communication module 70. Note that the input/output processor 62a can also communicate with other game apparatuses, directly not via the network. The input/output processor 62a periodically accesses the flash memory 64 and detects the presence or absence of the data (herein after referred to as "transmission data") required to be transmitted to the network. When the transmission data is present, the input/output processor 62a transmits the transmission data to the network via the wireless communication module 70 and the antenna 70a. The input/output processor 62a receives the data (herein after referred to as "reception data") transmitted from other game apparatuses, via the network, the antenna 70a, and the wireless communication module 70, and stores the reception data in the flash memory 64. Note that if not satisfying certain conditions, the reception data is discarded as it has been received. The input/output processor 62a receives the data (herein after referred to as "download data") downloaded from a download server, via the network, the antenna 70a, and the wireless communication module 70, and stores the download data in the flash memory 64.

The input/output processor 62a receives input data transmitted from the first controller 34 via the antenna 72a and the wireless controller module 72, and stores (temporarily stores) the received data in the buffer area of the internal main memory 62e or the external main memory 66. The input data is deleted from the buffer area after being used for processing (e.g., game processing) executed by the CPU 60.

Note that in the present embodiment, as described above, the wireless controller module 72 communicates with the first controller 34 in accordance with the BLUETOOTH standard. Consequently, it is possible to not only acquire data from the controller 14, but also transmit a certain instruction from the game apparatus 12 to the controller 14, thereby controlling the operation of the controller 14 from the game apparatus 12.

The input/output processor 62a is connected to the extension connector 80 and the external memory card connector 82. The extension connector 80, which is a connector for an interface such as USB or SCSI, can be connected to a medium such as an external storage medium, and can be connected to a peripheral device such as another controller different from the first controller 34. The extension connector 80 can also be connected to a wired LAN adapter, thereby using the wired LAN instead of the wireless communication module 70. The external memory card connector 82 can be connected to an external storage medium such as a memory card. For example, the input/output processor 62a can access the external storage media via the extension connector 80 and the external memory card connector 82, and can store and read data.

Although not described in detail, when a power button is turned on, a mode (herein after referred to as a "normal mode") where power is supplied to all of the components of the game apparatus 12 via the AC adapter (not shown) so that currents are applied in a normal manner, is set in the system LSI 62. On the other hand, when the power button is turned off, a mode (herein after referred to as a "standby mode") where power is supplied to some of the components of the game apparatus 12 so that power consumption is reduced to the minimum necessary, is set in the system LSI 62.

In the present embodiment, when the standby mode is set, the system LSI 62 gives an instruction to stop the supply of power to the components other than the input/output processor 62a, the flash memory 64, the external main memory 66, the ROM/RTC 68, the wireless communication module 70, and the wireless controller module 72. Therefore, in the present embodiment, the CPU 60 does not execute an application in the standby mode.

Note that although power is supplied to the system LSI 62 even in the standby mode, power consumption is reduced by stopping the supply of a clock to the GPU 62b, the DSP 62c, and the VRAM 61d and thus not driving them.

Although not shown, in the housing 16 of the game apparatus 12, a fan for expelling the heat of ICs, such as the CPU 60, the system LSI 62, and the like, to the outside of the housing 16 is provided. This fan is also stopped in the standby mode.

Note that when the user does not wish to use the standby mode, the setting is made in advance so that the standby mode is not used, whereby, when the power button is turned off, the supply of power to all of the circuit components is completely stopped.

The switching between the normal mode and the standby mode can be remotely controlled by switching on/off the power switch 46i of the first controller 34. When this remote control is not performed, the setting may be made so that power is not supplied to the wireless controller module 72a in the standby mode.

A reset button is also connected to the system LSI 62. When the reset button is pressed, the system LSI 62 restarts the starting program of the game apparatus 12. An eject button is connected to the disc drive 74. When the eject button is pressed, the optical disc 22 is ejected from the disc drive 74.

Figure 11:
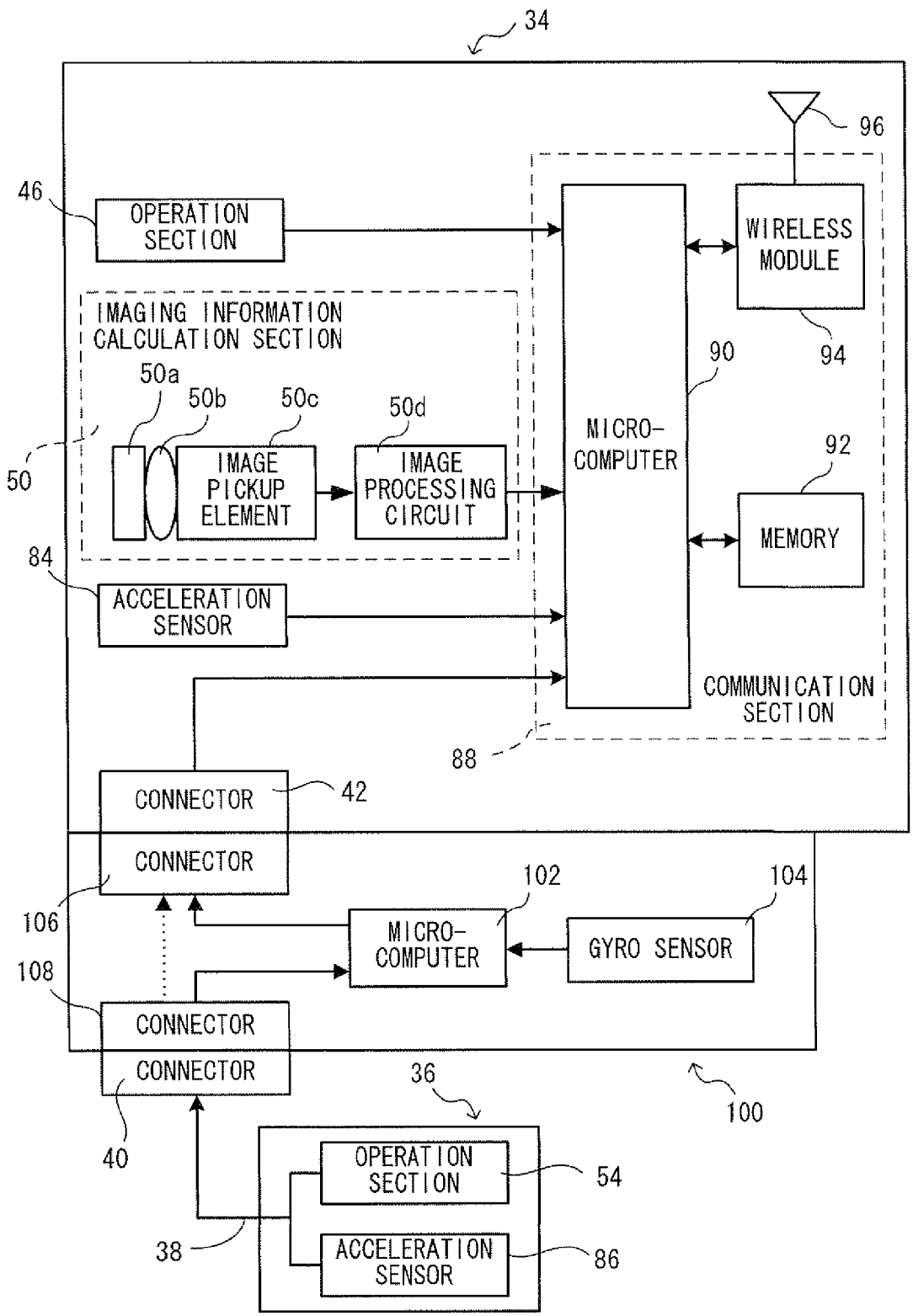
FIG. 11 is a block diagram showing the electrical structure of an overall controller used in the embodiment.

FIG. 11 shows an example of the electrical structure of the overall controller 14 when the first controller 34 and the second controller 36 are connected to each other via the gyro sensor unit 100.

The first controller 34 includes a communication section 88. The communication section 88 is connected to the operation section 46, the imaging information calculation section 50, the acceleration sensor 84, and the connector 42. The operation section 46 represents the operation buttons and operation switches 46a, 46b, 46c, 46d, 46e, 46f, 46g, 46h, and 46i described above. When the operation section 46 is operated, the data representing this operation is outputted to the communication section 88. From the imaging information calculation section 50, the data representing the position coordinates of the markers 30a and 30b in the object field is outputted to the communication section 88.

As described above, in the first controller 34, the imaging information calculation section 50 is provided. The imaging information calculation section 50 includes an infrared filter 50a, a lens 50b, an image pickup element 50c, and an image processing circuit 50d. The infrared filter 50a passes only infrared light, among the light incident on the front surface of the first controller 34. As described above, the markers 30a and 30b, provided in the adjacent area of (around) the display screen of the monitor 26, are infrared LEDs for outputting infrared light forward from the monitor 26. Therefore, with the infrared filter 50a provided, it is possible to capture the images of the markers 30a and 30b more accurately. The lens 50b collects the infrared light having passed through the infrared filter 50a and makes the collected infrared light incident on the image pickup element 50c. The image pickup element 50c, which is a solid-state image pickup device such as a CMOS sensor or a CCD, captures the infrared light collected by the lens 50b. The image pickup element 50c captures only the infrared light having passed through the infrared filter 50a, thereby generating image data. Hereinafter, an image captured by the image pickup element 50c will be referred to as a "captured image". The image data generated by the image pickup element 50c is processed by the image processing circuit 50d. The image processing circuit 50d calculates the positions of capturing targets (the markers 30a and 30b) in the captured image, and outputs the values of the coordinates representing the calculated positions as capturing data ("marker coordinate data" as described below) to a microcomputer 90 at predetermined time intervals. Note that the process performed by the image processing circuit 50d will be described below.

Figure 12:
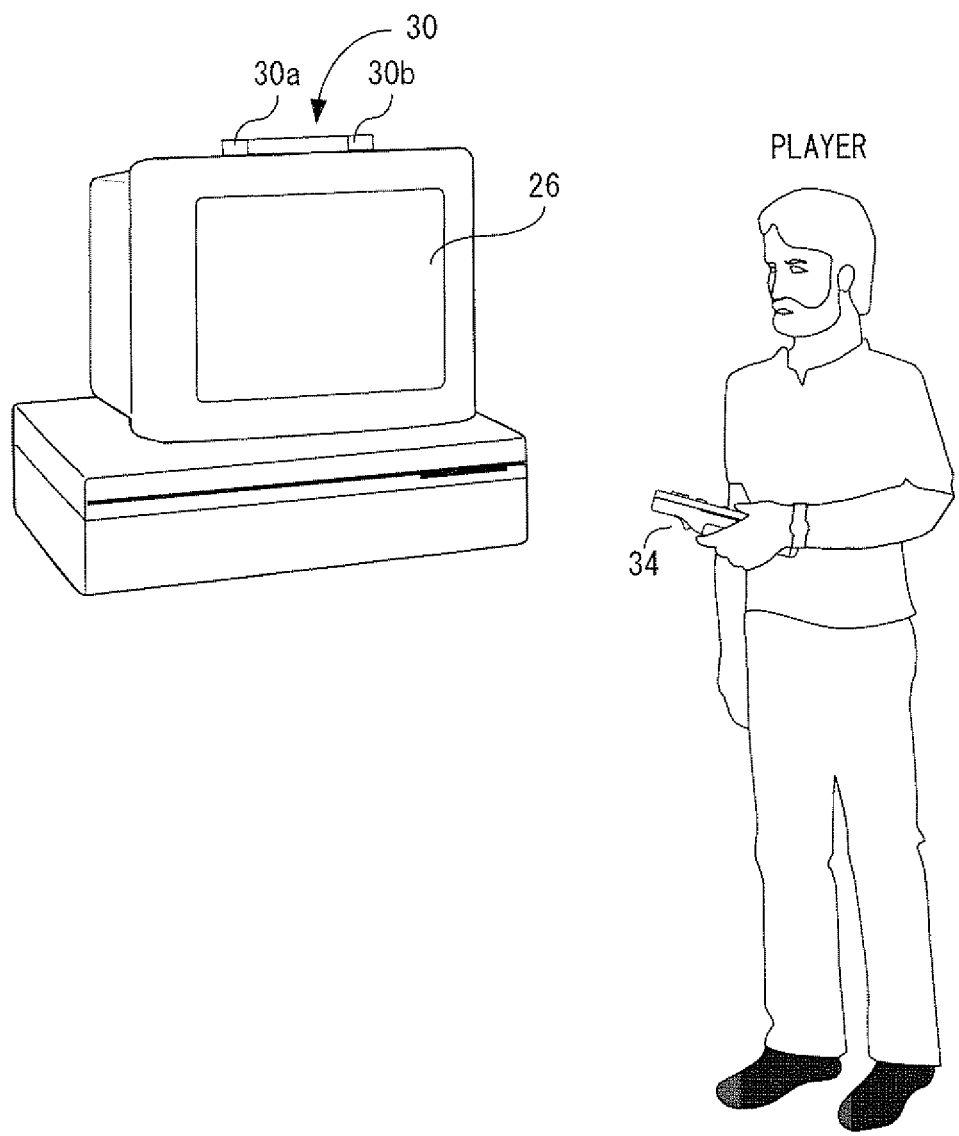
FIG. 12 is a schematic diagram outlining the state of playing a game using the first controller connected to the gyro sensor unit.

FIG. 12 is a schematic diagram outlining the state of playing a game using the first controller 34. Note that the same is true not only of playing a game, but also of executing another application, reproducing a DVD, and the like. As shown in FIG. 12, when playing a game using the first controller 34 in the game system 10, the player holds the first controller 34 with one hand. Strictly speaking, the player holds the first controller 34 in such a manner that the front end surface (the light entrance 44b side to be captured by the imaging information calculation section 50) of the first controller 34 is directed toward the markers 30a and 30b. Note that as can be seen from FIG. 1, the markers 30a and 30b are arranged parallel to the lateral direction of the screen of the monitor 26. Based on this state, the player performs a game operation by changing the position, pointed at by the first controller 34, on the screen and changing the distance between the first controller 34 and each of the markers 30a and 30b.

Although difficult to discern in FIG. 12, the same is also true of the case where the gyro sensor unit 100 is connected to the first controller 34.

Figure 13:
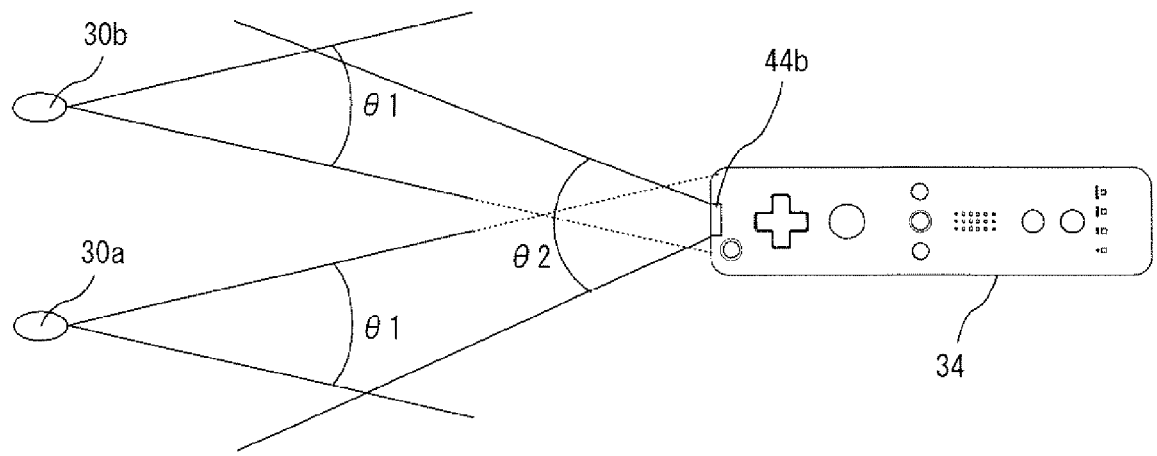
FIG. 13 is a schematic diagram illustrating the fields of view of markers of FIG. 1 and that of the first controller.

FIG. 13 is a diagram illustrating the fields of view of the markers 30a and 30b and that of the first controller 34. As shown in FIG. 13, the markers 30a and 30b each emit infrared light in the range of a field of view θ1. The image pickup element 50c of the imaging information calculation section 50 can receive the light incident thereon in the range of a field of view θ2 around the visual axis of the first controller 34. For example, the fields of view θ1 of the markers 30a and 30b each are 34° (a half angle), and the field of view θ2 of the image pickup element 50c is 41°. The player holds the first controller 34 in such a manner that the image pickup element 50c is positioned and directed to receive the infrared light from the two markers 30a and 30b. Specifically, the player holds the first controller 34 in such a manner that at least one of the markers 30a and 30b is present in the field of view θ2 of the image pickup element 50c, and at the same time, the first controller 34 is present in at least one of the fields of view θ1 of the markers 30a and 30b. In this state, the first controller 34 can sense at least one of the markers 30a and 30b. The player can perform the game operation by changing the position and the direction of the first controller 34 in the range where this state is satisfied.

When the position and the direction of the first controller 34 go beyond this range, it becomes impossible to perform the game operation based on the position and the direction of the first controller 34. Hereinafter, this range will be referred to as an "operable range".

Figure 14:
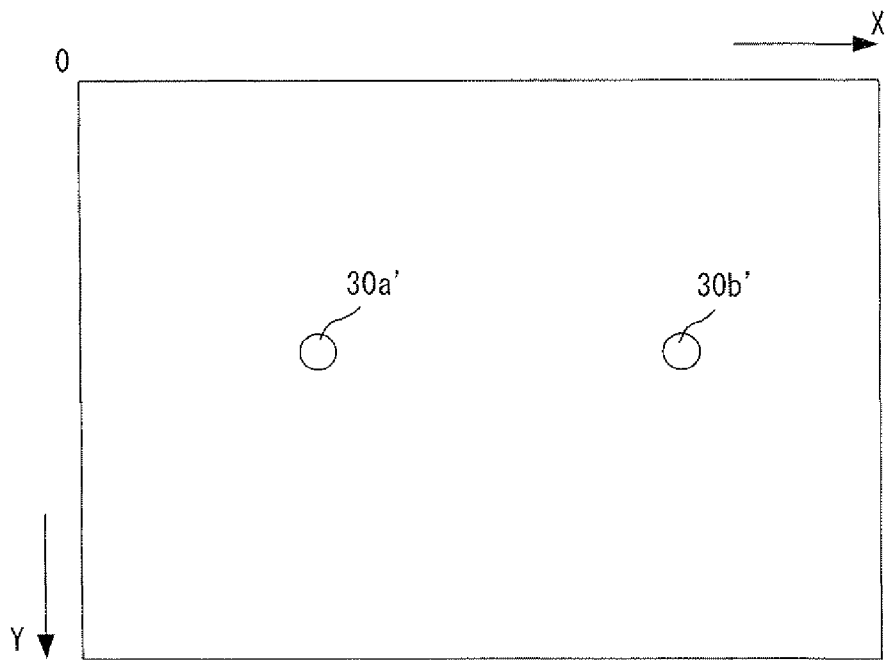
FIG. 14 is a schematic diagram showing an example of a captured image including target images.

When the first controller 34 is held within the operable range, the images of the markers 30a and 30b are captured by the imaging information calculation section 50. That is, the captured image obtained by the image pickup element 50c includes the images (target images) of the markers 30a and 30b, i.e., the capturing targets. FIG. 14 is a diagram showing an example of the captured image including the target images. With the use of image data regarding the captured image including the target images, the image processing circuit 50d calculates the coordinates (marker coordinates) representing the positions of the markers 30a and 30b in the captured image.

In the image data regarding the captured image, the target images appear as high-brightness areas, and therefore, first, the image processing circuit 50d detects these high-brightness areas as candidates for the target images. Next, the image processing circuit 50d determines, based on the sizes of the detected high-brightness areas, whether or not the high-brightness areas are the target images. In the captured image, not only images 30a' and 30b', which are the target images corresponding to the two markers 30a and 30b, respectively, but also images other than the target images may be included due to sunlight through a window or the light of a fluorescent lamp in a room. The determination of whether or not the high-brightness areas are the target images is made so as to distinguish the images 30a' and 30b', which are the target images, from the other images and properly detect the target images. Specifically, in the determination process, it is determined whether or not the sizes of the detected high-brightness areas are within a predetermined range. When the sizes of the high-brightness areas are within the predetermined range, it is determined that the high-brightness areas represent the target images. On the other hand, when the sizes of the high-brightness areas are not within the predetermined range, it is determined that the high-brightness areas represent the images other than the target images.

When it is determined, in the determination process described above, that the high-brightness areas represent the target images, the image processing circuit 50d calculates the positions of the high-brightness areas. Specifically, the image processing circuit 50d calculates the centers of gravity of the high-brightness areas. Here, the coordinates of each of the centers of gravity are referred to as "marker coordinates". The centers of gravity can be calculated on a smaller scale than the resolution of the image pickup element 50c. Here, the resolution of the captured image obtained by the image pickup element 50c is 126×96, while the centers of gravity are calculated on a scale of 1024×768. That is, the marker coordinates are represented by integer values from (0, 0) to (1024, 768).

Note that the position in the captured image is represented by a coordinate system (an XY coordinate system) in which: the coordinate point at the upper left corner of the captured image is set as its origin; the downward direction is a positive Y-axis direction; and the right direction is a positive X-axis direction.

When the target images are properly detected, two high-brightness areas are determined as the target images in the determination process, and therefore two sets of the marker coordinates are calculated. The image processing circuit 50d outputs the data representing the calculated two sets of the marker coordinates. The outputted data (marker coordinate data) representing the marker coordinates is included in input data by the microcomputer 90 and transmitted to the game apparatus 12 as described above.

When detecting the marker coordinate data from the received input data, the game apparatus 12 (the CPU 60) can calculate a pointing position (pointing coordinates) of the first controller 34 on the screen of the monitor 26 and the distance between the first controller 34 and each of the markers 30a and 30b, based on the marker coordinate data. Specifically, the position at which the first controller 34 is pointed, i.e., the pointing position, is calculated based on the position of the midpoint of the two sets of the marker coordinates. Since the distance between the target images in the captured image changes depending on the distance between the first controller 34 and each of the markers 30a and 30b, the game apparatus 12 can comprehend the distance between the first controller 34 and each of the markers 30a and 30b by calculating the distance between the two sets of the marker coordinates.

Referring back to FIG. 11, the data representing the accelerations detected by the acceleration sensor 84 is also outputted to the communication section 88. The acceleration sensor 84 has a maximum sampling period of, for example, approximately 200 frames/sec.

The connector 42 is connected to the connector 106 of the gyro sensor unit 100. The gyro sensor unit 100 includes a microcomputer 102 and the gyro sensor 104. The gyro sensor 104 represents the gyro sensors 104a and 104b described above, and for example, has a similar sampling period to that of the acceleration sensor 84. The microcomputer 102 outputs the data representing the angular velocities detected by the gyro sensor 104 to the communication section 88 via the connector 106 and the connector 42.

The connector 108 of the gyro sensor unit 100 is connected to the connector 40 of the cable 38 extending from the second controller 36. The connector 40 is connected to the operation section 54 and the acceleration sensor 86 of the second controller 36. The operation section 54 represents the analog joystick 54a and the buttons 54b and 54c that are described above. When the operation section 54 is operated, the data representing this operation is inputted to the microcomputer 102 of the gyro sensor unit 100 via the cable 38, the connector 40, and the connector 42. The microcomputer 102 outputs the received data to the communication section 88 via the connector 106 and the connector 42. The acceleration sensor 86 also has a similar sampling period to that of the acceleration sensor 84, and the microcomputer 102 also outputs the data representing the accelerations detected by the acceleration sensor 86 to the communication section 88.

The output to the communication section 88 in each case, as described above, is performed in a cycle of, for example, 1/200 sec. Therefore, the operation data from the operation section 46, the position coordinate data from the imaging information calculation section 50, the acceleration data from the acceleration sensor 84, the angular velocity data from the gyro sensor 104, the operation data from the operation section 54, and the acceleration data from the acceleration sensor 86, each are outputted to the communication section 88 once in an arbitrary 1/200 sec.

Figure 15:
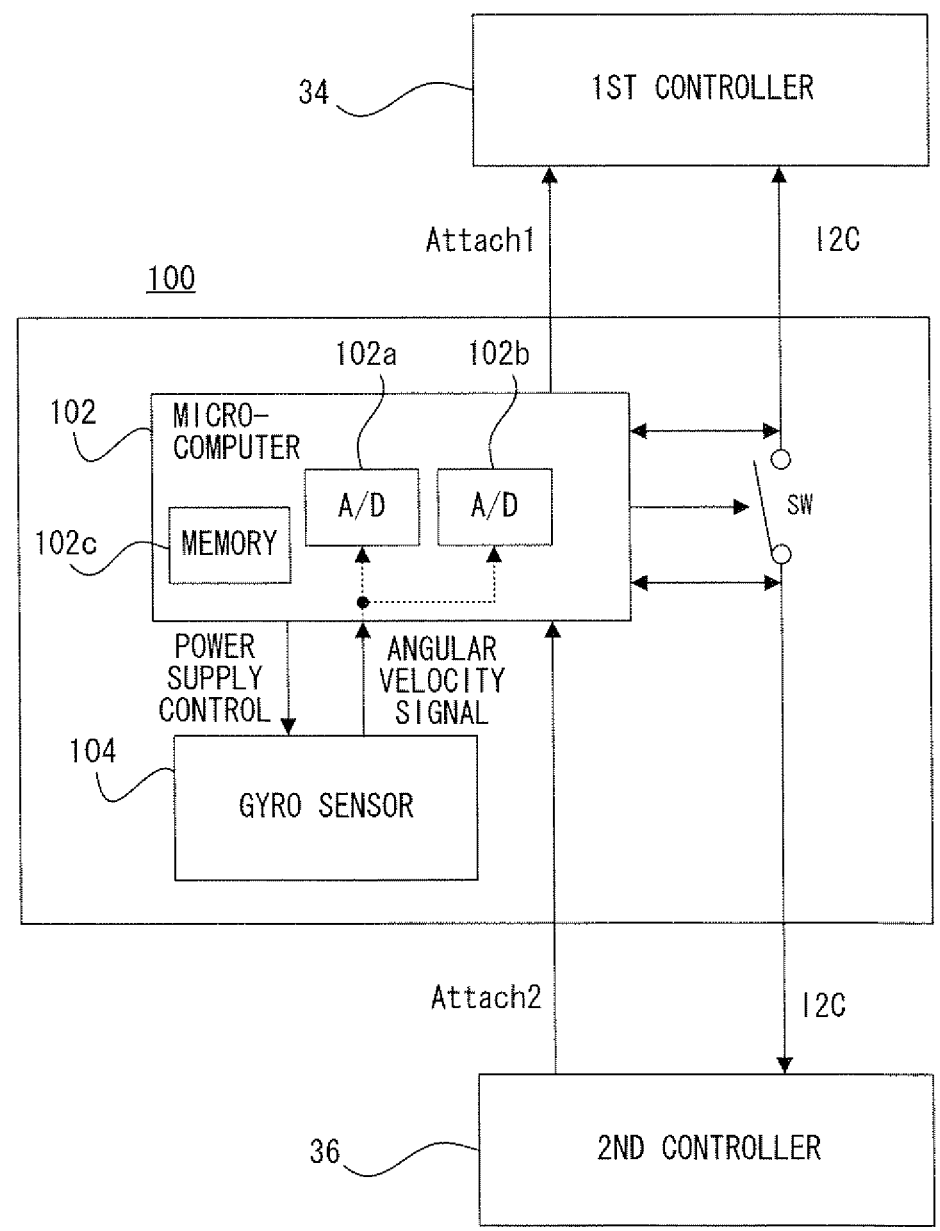
FIG. 15 is a block diagram showing the electrical structure of the gyro sensor unit provided between the first controller and the second controller, in the controller of FIG. 11.

FIG. 15 shows a main structure of the gyro sensor unit 100 of the overall structure shown in FIG. 11. The connector 42, the connector 106, the connector 108, and the connector 40 each are, for example, a 6-pin connector, the six pins of which include Attach pins, each for controlling a variable "Attach" that represents the connection state between the connectors. "Attach" varies between "Low" that represents that the connectors are disconnected from each other, and "High" that represents that the connectors are connected to each other. Particularly, herein after, "Attach" used between the connector 42 and the connector 106, i.e., between the first controller 34 and the gyro sensor unit 100, will be referred to as "Attach1", and "Attach" used between the connector 108 and the connector 40, i.e., between the gyro sensor unit 100 and the second controller 36, will be referred to as "Attach2".

In the case where, even when the gyro sensor unit 100 is attached to the first controller 34, the application is of a gyro-incompatible type and the second controller 36 is not attached to the gyro sensor unit 100, "Attach1" is controlled to be "Low" by the microcomputer 102 of the gyro sensor unit 100 (the standby mode: see FIG. 19) so that the gyro-incompatible application cannot recognize the gyro sensor unit 100. In the standby mode, the supply of power to the gyro sensor 104 is stopped and the gyro function is in a stopped state. The microcomputer 102 mostly switches modes based on "Attach2" and manages power based on the instruction from a gyro-compatible application.

In the six pins, another two pins are assigned I2C buses, and the gyro sensor unit 100 also includes a bus switch SW for connecting/separating the I2C bus on the first controller 34 side and the I2C bus on the second controller 36 side to/from each other. The bus switch SW is turned on by the microcomputer 102 when the gyro-incompatible application is executed in the state where the second controller 36 is connected to the first controller 34 via the gyro sensor unit 100. Thereafter, the data from the second controller 36 is outputted to the communication section 88 via the I2C buses, not via the microcomputer 102 (the bypass mode: see FIG. 19). As in the standby mode, it is only necessary for the microcomputer 102 to switch modes and manage power, and therefore power consumption is reduced. Further, even when the gyro sensor unit 100 remains attached to the first controller 34, the gyro-incompatible application can be executed. When the bus switch SW is off, the I2C buses are connected to the microcomputer 102 such that the data to be outputted to the first controller 34 is controlled by the microcomputer 102.

The bus switch SW is turned on also in the standby mode. Consequently, even when "Attach1" is controlled to be "Low", the gyro-compatible application can confirm, with reference to a particular address of the I2C bus, whether or not the gyro sensor unit 100 is attached to the first controller 34.

Note that in the gyro sensor unit 100, a total of four modes are provided, such as a "gyro" mode and a "gyro and second controller" mode, as well as the "standby" mode and the "bypass" mode that are described above. In the gyro mode and the gyro and second controller mode, the bus switch SW is turned off.

The microcomputer 102 of the gyro sensor unit 100 includes two types of circuits, A/D conversion circuits 102a and 102b. A three-axis angular velocity signal outputted from the gyro sensor 104 is inputted to each of the A/D conversion circuits 102a and 102b. The A/D conversion circuit 102a performs A/D conversion in a high angular velocity mode, which covers the whole detection range (e.g., ±360 degrees/sec.) of the gyro sensor 104, while the A/D conversion circuit 102b performs A/D conversion in a low angular velocity mode, which covers a part of the detection range (e.g., ±90 degrees/sec.) of the gyro sensor 104. The microcomputer 102 outputs either one of these two A/D conversion results as the angular velocity data.

Specifically, when the two types of the angular velocity data that correspond to a given time are outputted from the A/D conversion circuits 102a and 102b, the microcomputer 102 first determines, on an axis-by-axis basis (i.e., with respect to a yaw angle, a roll angle, and a pitch angle), whether or not, of the two types, a value A of the angular velocity data in the low angular velocity mode is within the range from a first threshold Th1 to a second threshold Th2 (>Th1), i.e., whether or not the condition "Th1≤A≤Th2" is satisfied. Next, based on these three determinations, the microcomputer 102 selects either the low angular velocity mode or the high angular velocity mode. For example, as for each of the three determinations, if the determination is "Yes", the microcomputer 102 selects the low angular velocity mode, and if "No", the microcomputer 102 selects the high angular velocity mode, on an axis-by-axis basis. The microcomputer 102 outputs the angular velocity data corresponding to the modes selected on an axis-by-axis basis, with mode information representing the selected modes. That is, the accuracy of data may be changed depending on the angular velocity, whereby, even with the same amount of data, it is possible to output data of higher accuracy when the velocity is low.

FIG. 16 shows formats of the data handled by the gyro sensor unit 100. (A) of FIG. 16 shows a format of the data (herein after referred to as "gyro data") for the gyro sensor unit 100, and (B) of FIG. 16 shows a format of the data (hereinafter referred to as "second controller data") for the second controller 36. The gyro data includes yaw angular velocity data, roll angular velocity data, pitch angular velocity data, yaw angular velocity mode information, roll angular velocity mode information, pitch angular velocity mode information, second controller connection information, and gyro/second controller identification information.

Note that as shown in FIG. 17, the rotation around the y-axis is represented by the yaw angle, the rotation around the x-axis is represented by the pitch angle, and the rotation around the z-axis is represented by the roll angle.

The yaw angular velocity data, the roll angular velocity data, and the pitch angular velocity data each are, for example, 14-bit data obtained by A/D converting a yaw angular velocity signal, a roll angular velocity signal, and a pitch angular velocity signal, respectively, that are outputted from the gyro sensor 104. The yaw angular velocity mode information, the roll angular velocity mode information, and the pitch angular velocity mode information each are 1-bit information that represents the mode of the corresponding angular velocity data and changes between "0" corresponding to the high angular velocity mode and "1" corresponding to the low angular velocity mode.

The second controller connection information is 1-bit information that represents whether or not the second controller 36 is connected to the connector 106, and changes between "0" representing disconnection and "1" representing connection. The gyro/second controller identification information is 1-bit information that identifies whether the data is outputted from the gyro sensor unit 100 or outputted from the second controller 36, and changes between "1" representing that the data is from the gyro sensor unit 100 and "0" representing that the data is from the second controller 36.

On the other hand, the second controller data includes: X-stick operation data and Y-stick operation data that represent a stick operation in the left-right direction (the X-axis direction) and a stick operation in the up down direction the y-axis direction), respectively; X-acceleration data, Y-acceleration data, and Z-acceleration data that represent the acceleration in the X-axis direction, the acceleration in the Y-axis direction, and the acceleration in the Z-axis direction, respectively; button operation data; second controller connection information; and gyro/second controller identification information.

The gyro sensor unit 100 alternately outputs the gyro data based on the format of (A) of FIG. 16 and the second controller data based on the format of (B) of FIG. 16, to the communication section 88 in a cycle of, for example, ½00 sec. Therefore, output is performed for one format in a cycle of 1/100 sec., which is sufficiently shorter than a processing period of 1/60 sec. for general game processing and the like. Thus, even when alternatively outputted, both of the data can be simultaneously used in one frame in game processing.

The communication section 88 shown in FIG. 11 includes the microcomputer 90, a memory 92, a wireless communication module 94, and an antenna 96. Using the memory 92 as a storage area (a work area and a buffer area) during a process, for example, the microcomputer 90 transmits acquired data to the game apparatus 12 and receives data from the game apparatus 12, in control of the wireless communication module 94.

The data outputted from the gyro sensor unit 100 to the communication section 88 is temporarily stored in the memory 92 via the microcomputer 90. The data outputted from the operation section 46, the imaging information calculation section 50, and the acceleration sensor 84 of the first controller 34 to the communication section 88 is also temporarily stored in the memory 92. At the timing of performing transmission to the game apparatus 12, the microcomputer 90 outputs the data stored in the memory 92 to the wireless communication module 94 as controller data. The controller data includes the data (herein after referred to as "first controller data") for the first controller 34, as well as the gyro data shown in (A) of FIG. 16 and/or the second controller data shown in (B) of FIG. 16. The first controller data includes: X-acceleration data, Y-acceleration data, and Z-acceleration data that are based on the output of the acceleration sensor 84; the position coordinate data based on the output of the imaging information calculation section 50; and button operation data (key data) based on the output of the operation (input) section 46.

With the use of near field communication technology such as the BLUETOOTH technology, the wireless communication module 94 modulates a carrier wave of a predetermined frequency by the controller data and radiates the resultant weak radio signal from the antenna 96. That is, the controller data is modulated into a weak radio signal by the wireless communication module 94 and transmitted from the first controller 34. The weak radio signal is received by the wireless controller module 72 of the game apparatus 12. The received weak radio signal is demodulated or decoded whereby the game apparatus 12 can acquire the controller data. The CPU 60 of the game apparatus 12 executes the game processing based on the controller data acquired from the controller 14. Note that the wireless communication between the first controller 34 and the game apparatus 12 may be performed in accordance with another standard such as a wireless LAN standard.

Figure 18:
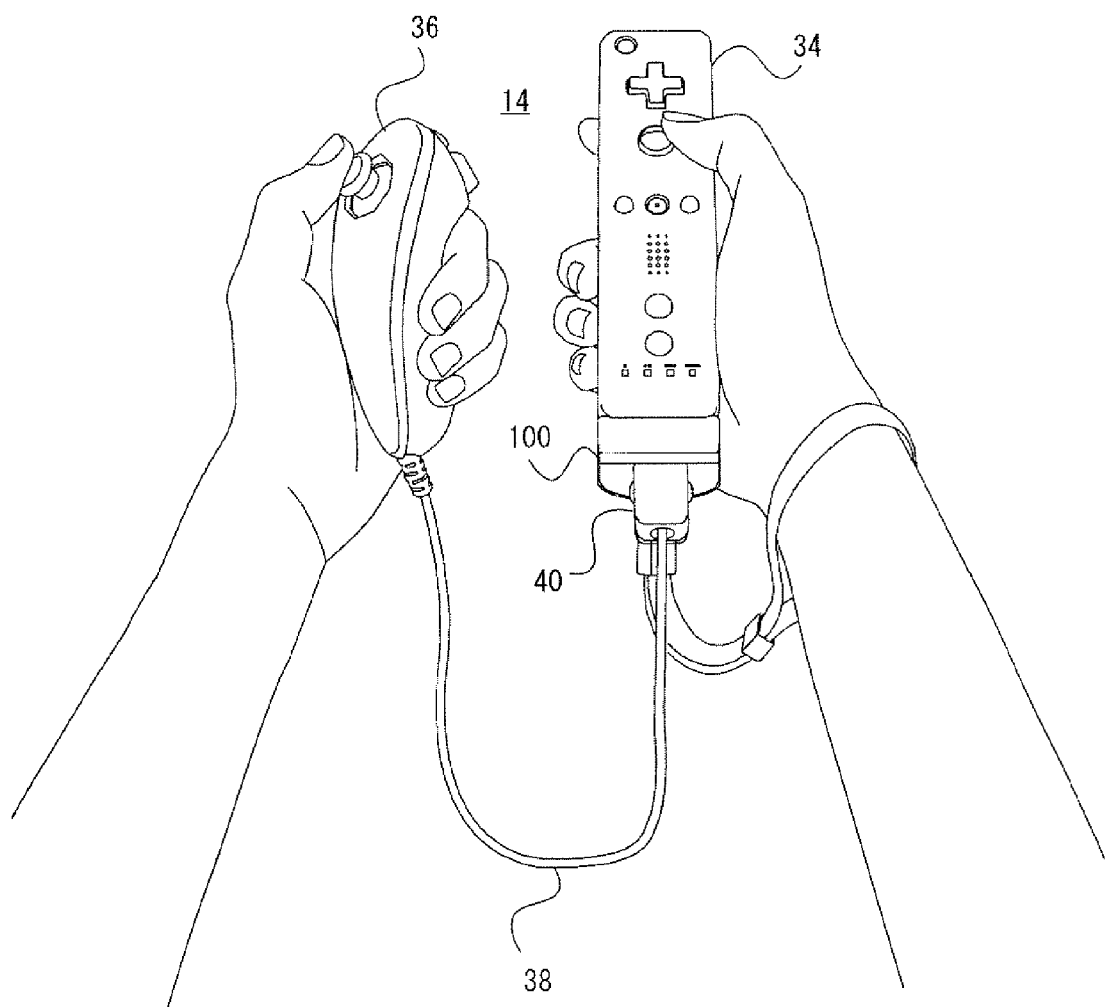
FIG. 18 is a schematic diagram showing an example of the state of a player holding the first controller and the second controller when actually playing a game using the overall controller.

In the game system 10, it is possible to perform input to an application such as a game not only by a button operation but also by moving the controller 14 itself. When playing the game, for example, as shown in FIG. 18, the player holds the first controller 34 (a hold section 44a of the housing 44 in FIG. 2, to be specific) with his/her right hand and holds the second controller 36 with his/her left hand. As described above, the first controller 34 includes the acceleration sensor 84 for detecting the three-axis accelerations, and the second controller 36 also has the similar acceleration sensor 86. When the first controller 34 and the second controller 36 each are moved by the player, the acceleration sensor 84 and the acceleration sensor 86 each detect three-axis acceleration values representing the motion of the respective controller itself. When the gyro sensor unit 100 is attached to the first controller 34, three-axis angular velocity values representing the first controller 34 itself is also detected.

These detected values are transmitted to the game apparatus 12 as the controller data described above. In the game apparatus 12 (see FIG. 10), the controller data from the controller 14 is received by the input/output processor 62a via the antenna 72a and the wireless controller module 72, and the received controller data is written into the buffer area of the internal main memory 62e or the external main memory 66. The CPU 44 reads the controller data stored in the buffer area of the internal main memory 62e or the external main memory 66, and reconstruct the detected values, i.e., the acceleration values and/or the angular velocity values that are detected by the controller 14.

Note that since the angular velocity data has the two modes including the high angular velocity mode and the low angular velocity mode, two types of angular velocity reconstruction algorithm are provided corresponding to these two modes. To reconstruct the angular velocity values from the angular velocity data, the angular velocity reconstruction algorithm corresponding to the mode of the angular velocity data is selected based on the angular velocity mode information.

Concurrently during this reconstruction process, the CPU 60 may calculate the velocity of the controller 14 based on the reconstructed acceleration values. Further concurrently, the moving distance and the position of the controller 14 based on the calculated velocity can also be obtained. On the other hand, based on the reconstructed angular velocity values, the rotation angle of the controller 14 can be obtained Note that initial values (integration constants) for obtaining the velocity by integrating the accelerations and those for obtaining the rotation angle by integrating the angular velocities can be calculated by, for example, the position coordinate data from the imaging information calculation section 50. The position coordinate data can also be used to correct the errors accumulated by integrations.

The game processing is executed based on variables such as the acceleration, the velocity, the moving distance, the angular velocity, and the rotation angle that are thus obtained. Therefore, it is not necessary to perform the whole process above and only necessary to appropriately calculate the variable necessary for the game processing. Note that, in principle, an angular velocity and a rotation angle can be calculated also by accelerations, but to that end, a complicated routine is necessary for the game program, and therefore the processing load of the CPU 60 increases. The use of the gyro sensor unit 100 makes program development easy and reduces the processing load of the CPU 60.

Incidentally, the game includes a one-controller game using only the first controller 34 and a two-controller game using the first controller 34 and the second controller 36, and further, each game is classified into a gyro-compatible game or a gyro-incompatible game. The first controller 34, which is a main controller, can be used to play both the gyro-compatible and gyro-incompatible games. The second controller 36, which is an extension controller, is connected to the first controller 34 directly or via the gyro sensor unit 100 when the two-controller game is played, and is normally detached when the one-controller game is played.

On the other hand, the gyro sensor unit 100, which is an extension sensor or an extension controller, is not necessary when the gyro-incompatible game is played, but is not necessary to be detached. Therefore, the gyro sensor unit 100 normally remains attached to the first controller 34 and is handled with the first controller 34 as a unit. The second controller 36 is attached and detached as in the case where the gyro sensor unit 100 does not intermediate, except that the connector 40 is connected to the connector 108, not the connector 42.

FIG. 19 shows a table listing the controls performed by the microcomputer 102 of the gyro sensor unit 100 on a mode-by-mode basis. The modes provided for the gyro sensor unit 100 are the four types of modes described above including the "standby" mode, the "bypass" mode, the "gyro" mode, and the "gyro and second controller" mode. The controlled objects of the microcomputer 102 have six items including "gyro function", "gyro power", "bus switch", "extension connector", "Attach1", and "I2C address".

The gyro function is in a stopped state ("No Active") in the standby mode and the bypass mode, and is in an operating state ("Active") in the gyro mode and the gyro and second controller mode. The gyro power, i.e., the supply of power to the gyro sensor 104, is stopped ("Off") in the standby mode and the bypass mode, and is not stopped ("On") in the gyro mode and the gyro and second controller mode. The bus switch SW is connected ("Connect") in the standby mode and the bypass mode, and is disconnected ("Disconnect") in the gyro mode and the gyro and second controller mode.

The extension connector, i.e., the connector 108, is in an operating state in the bypass mode and the gyro and second controller mode, and is in a stopped state in the standby mode and the gyro mode. "Attach1" is controlled to be "Low", which represents a disconnected state, in the standby mode, and is controlled to be "High", which represents a connected state, in the bypass mode, the gyro mode, and the gyro and second controller mode. As for the I2C address, a particular address is monitored only in the standby mode and the bypass mode.

Figure 20:
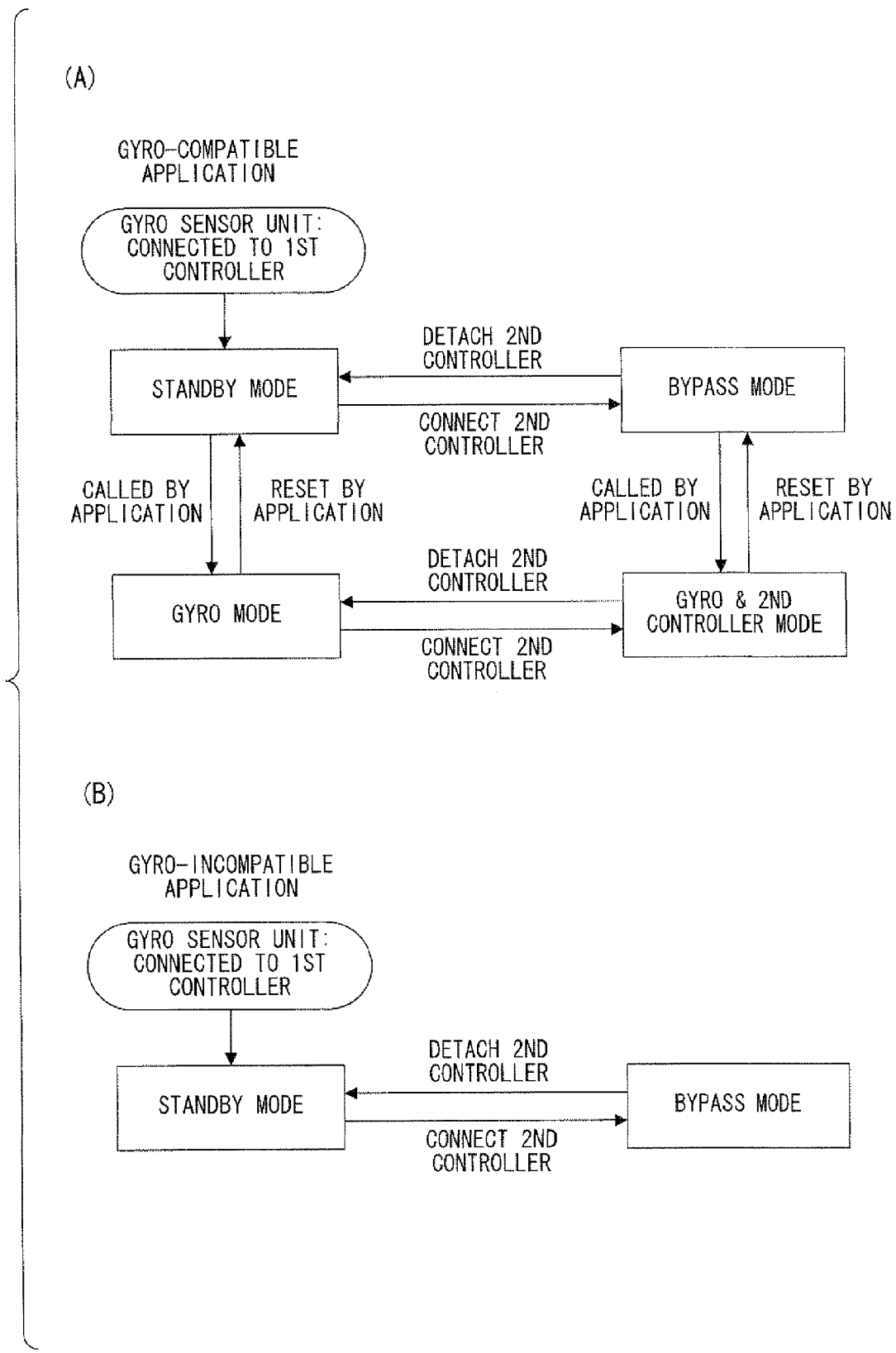
FIG. 20 is a schematic diagram showing the mode switching performed for the gyro sensor unit.

The mode switching is performed as shown in FIG. 20. (A) of FIG. 20 shows a switching process when the application is gyro-compatible, while (B) of FIG. 20 shows a switching process when the application is gyro-incompatible. In common with (A) and (B) of FIG. 20, i.e., regardless of the gyro-compatible application or the gyro-incompatible application, the gyro sensor unit 100 starts in response to the gyro sensor unit 100 itself being connected to the first controller 34 and enters the standby mode, i.e., an initial mode. Here, when the second controller 36 is connected to the gyro sensor unit 100, the standby mode switches to the bypass mode, and when the second controller 36 is detached thereafter, the bypass mode switches back to the standby mode.

Here, to acquire the angular velocity data as necessary, the gyro-compatible application calls and resets the gyro sensor unit 100. As described above, in the present embodiment, since it is possible to control a controller from a game apparatus by communication, it is possible to control the gyro sensor unit 100 by an application. Consequently, as shown in (A) of FIG. 20, when called in the standby mode by the application, the gyro sensor unit 100 switches to the gyro mode, and when reset in the gyro mode by the application, the gyro sensor unit 100 switches back to the standby mode. When the second controller 36 is connected to the gyro sensor unit 100 in the gyro mode, the gyro sensor unit 100 switches to the gyro and second controller mode, and when the second controller 36 is detached in the gyro and second controller mode, the gyro sensor unit 100 switches back to the gyro mode. When reset in the gyro and second controller mode by the application, the gyro sensor unit 100 switches to the bypass mode, and when called in the bypass mode by the application, the gyro sensor unit 100 switches back to the gyro and second controller mode.

On the other hand, the gyro-incompatible application does not have a function of approaching, i.e., calling and resetting the gyro sensor unit 100. Therefore, when the gyro-incompatible application is executed, the mode of the gyro sensor unit 100 merely switches between the standby mode and the bypass mode, as shown in (B) of FIG. 20.

The mode switching of the gyro sensor unit 100 as described above is realized by the microcomputer 102 with reference to the table shown in FIG. 19, but will not be described in further detail here.

Figure 21:
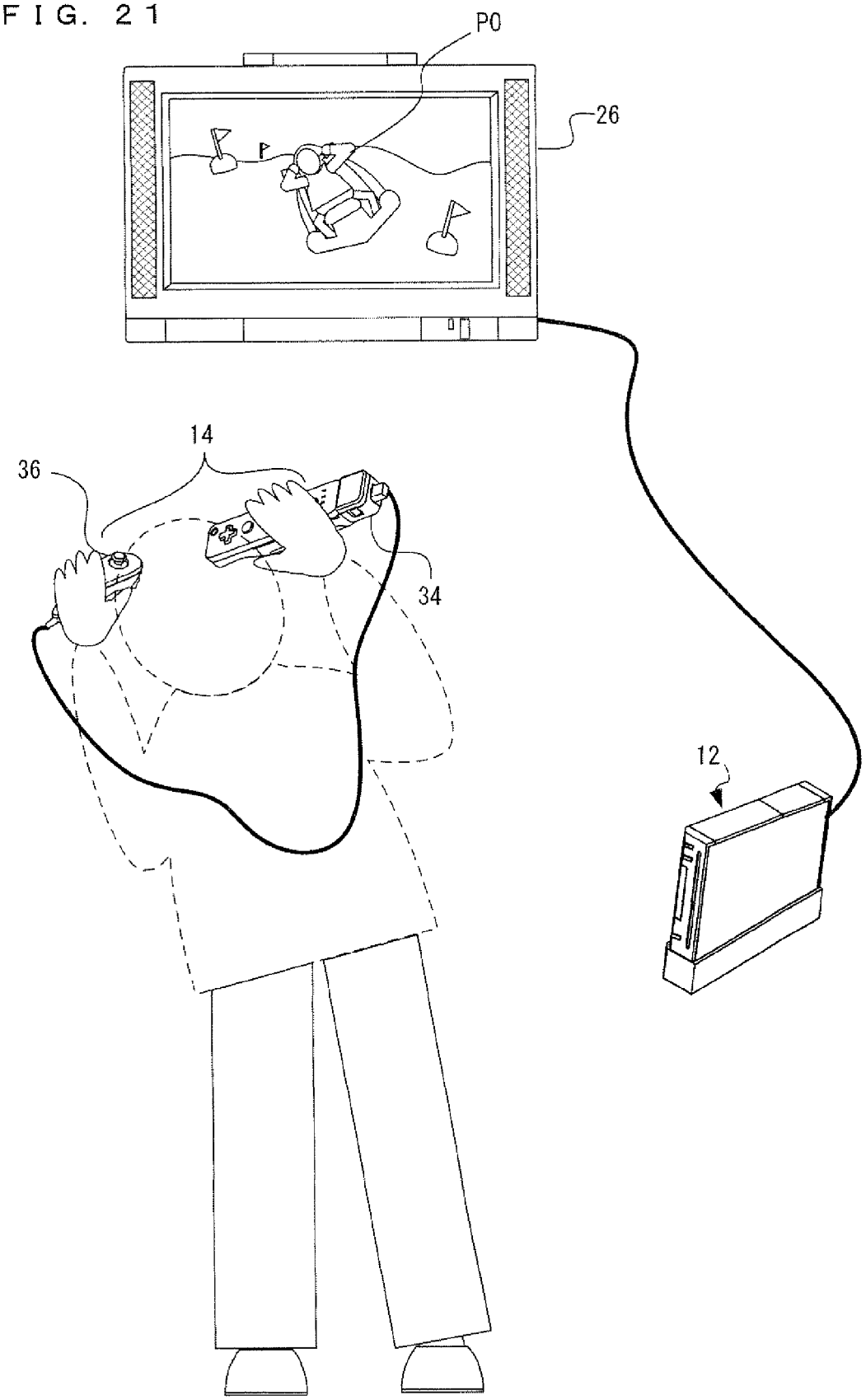
FIG. 21 is a diagram showing the state where the player plays a personal watercraft game of the present embodiment.
Figure 22:
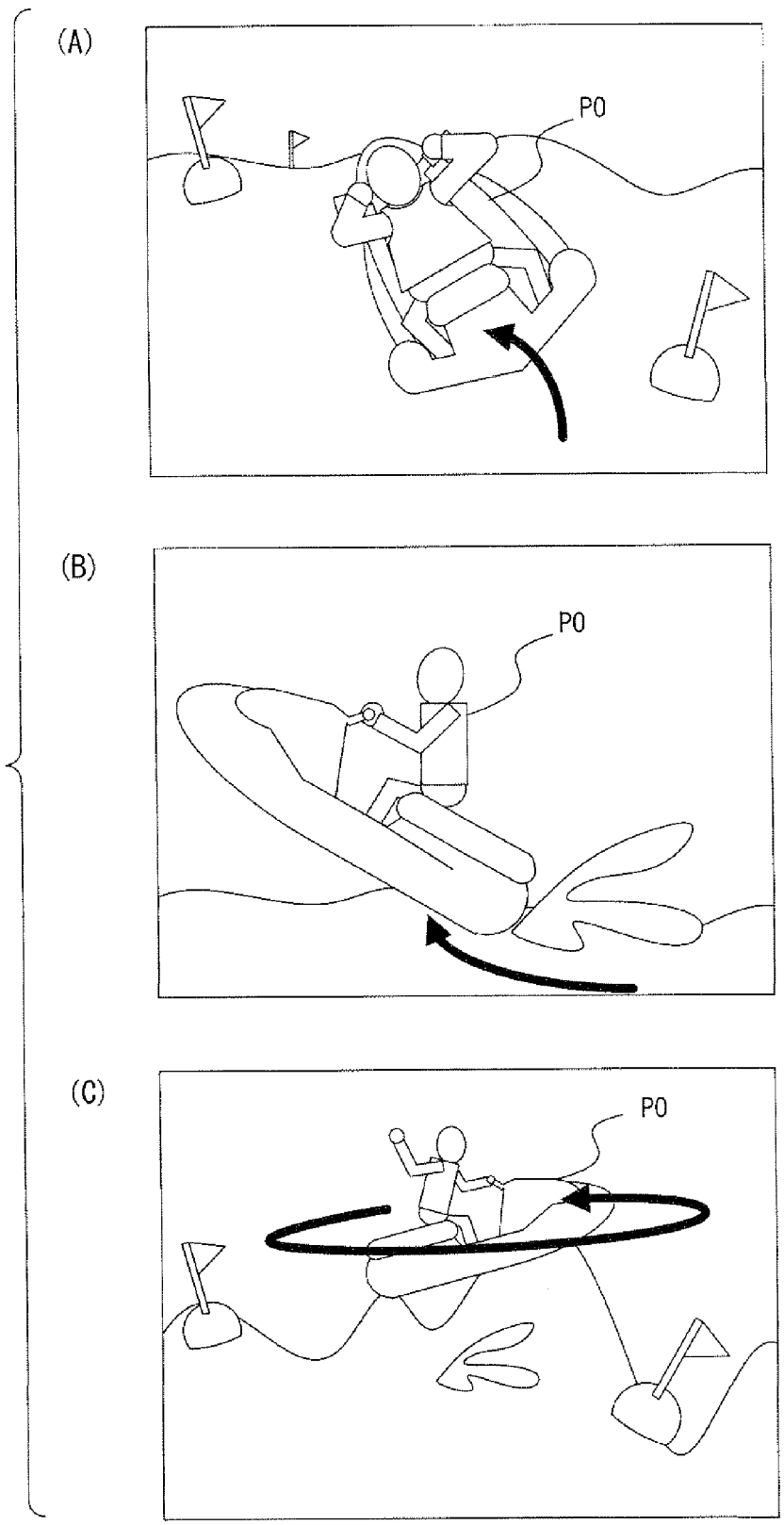
FIG. 22 is a diagram illustrating the operations of a personal watercraft object in a game space of the personal watercraft game of the present embodiment.

With reference to the drawings, an example of a virtual game using the game system 10 will be described. First, an overview of the game will be described. FIG. 21 is a diagram showing the state where the player plays the game as a first embodiment. The first embodiment is the game where the player operates a personal watercraft in the game by moving the first controller 34 and the second controller 36. As shown in FIG. 21, the player holds the first controller 34 and the second controller 36 face to face as if holding a set of handlebars. After the personal watercraft game starts, the player tilts the two controllers, keeping them as much in the same straight line as possible, as if tilting the handlebars of an actual personal watercraft. Similarly to the actual personal watercraft, when the player tilts the two controllers in the roll direction as viewed from him/her, a personal watercraft (and a player object combined with the personal watercraft) PO in a game space can be tilted and turned left or right. For example, when, as shown in FIG. 21, the player tilts the two controllers to the left, the personal watercraft PO in the game space turns left, tilting to the left, as shown in (a) of FIG. 22. When the player tilts the two controllers in the pitch direction as viewed from him/her, the personal watercraft PO in the game space can be tilted in the up-down direction. For example, when the player tilts the two controllers in the direction of the player facing upward, the personal watercraft PO in the game space has such an orientation that the front portion of the body thereof rises up to the surface, as shown in (b) of FIG. 22. Note that (b) of FIG. 22 shows the personal watercraft PO in the game space from the side, but in practice, the game screen shows the personal watercraft PO from the rear as shown in (a) of FIG. 22.

When the B-button 46h, for example, is set as an accelerator button, it is possible to move forward while pressing down the B-button 46h. Therefore, it is possible to perform an accelerator operation as if operating an accelerator provided on the handlebars of the actual personal watercraft.

In the case of the handlebars of a normal motorcycle, not a personal watercraft, acceleration is performed by twisting the right-hand handlebar in the pitch direction. However, also in the game of the present embodiment, acceleration can be performed by twisting the right-hand handlebar of the personal watercraft PO. Specifically, when the first controller 34 is rotated around the z-axis, the personal watercraft PO in the game is accelerated. That is, acceleration can be performed by twisting the player's right hand as if twisting the accelerator of an actual motorcycle. In the present embodiment, basically, the accelerator operation is performed by the operation of the B-button 46h described above, and further acceleration can be temporarily performed up to more than the maximum velocity of the button operation, by adding a twist.

That is, the player can perform an intuitive handlebar operation and an intuitive accelerator operation that are similar to the operations of the actual personal watercraft. Additionally, the player can also accelerate the personal watercraft PO further by an operation similar to the accelerator operation of the actual motorcycle. The player can control the velocity of the personal watercraft PO with the button, without constantly keeping the first controller 34 twisted to perform acceleration. The player can obtain a greater velocity than that of normal running, by adding a twist particularly at the timing when the user wishes to perform acceleration, whereby the player's burden is made lower than constantly keeping the first controller 34 twisted. Therefore, in another embodiment such as a game of operating a normal motorcycle, not a personal watercraft, when priority is given to performing a more realistic operation, the magnitude of acceleration may be determined based only on the orientation of the first controller 34.

In the present embodiment, depending on the orientation of the personal watercraft PO when it rides on a wave, the personal watercraft PO is temporarily floating in the air (herein after, this state will be referred to as a "jump state"). When rotating the first controller 34 in the yaw direction (the y-axis direction, or the x-axis direction in some cases, of the first controller 34) as viewed from the player in the jump state, the player can rotate (spin) the personal watercraft PO laterally as shown in (c) of FIG. 22. In this operation, the player may rotate the first controller 34 alone in his/her hand, or the player himself/herself may rotate 360 degrees laterally, holding the two controllers. The angular velocities caused by this rotation operation are reflected in the orientation of the personal watercraft PO, and as a result, the personal watercraft PO rotating laterally is drawn. That is, in the present embodiment, in the jump state, control is performed so that the yaw angular velocity data acquired from the gyro sensor unit 100 is reflected in the orientation of the personal watercraft 20.

Figure 23:
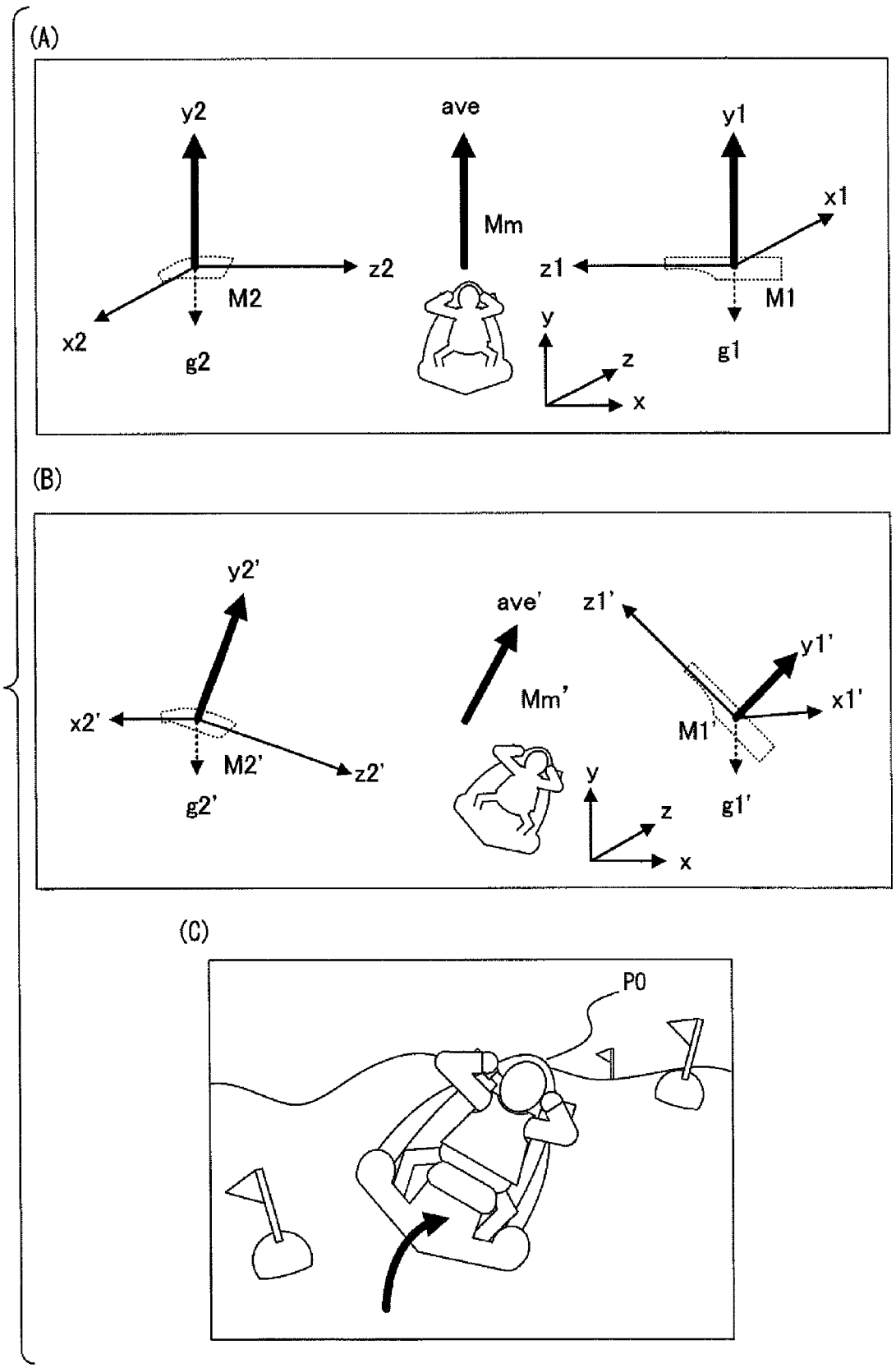
FIG. 23 is a diagram illustrating an orientation control method, based on accelerations, of the personal watercraft object in the game of the present embodiment.

With reference to FIGS. 23 and 24, the operation based on the orientations of the two controllers as described above will be described in further detail. Referring to FIG. 23, M1 and M2 represent the orientations of the first controller 34 and the second controller 36, respectively. Each orientation is represented by, for example, a three-dimensional rotation matrix and represents the orientation to which the controller has rotated from a reference state. The reference state may be, for example, the state where the first controller 34 and the second controller 36 horizontally face each other as shown in (a) of FIG. 23. The axis directions of the acceleration sensor of the first controller 34 are represented as x1, y1, and z1, while those of the second controller 36 are represented as x2, y2, and z2. In the reference state shown in (a) of FIG. 23, however, the first controller 34 and the second controller 36 face each other, although the axis directions of the two controllers do not coincide with each other. The rotations of the two controllers are calculated, not as those represented by the coordinate systems of the acceleration sensors but as those represented by a coordinate system (x, y, and z, shown in (a) of FIG. 23) defined in a space. In the present embodiment, an example of this coordinate system is set so that: an x-direction is the right direction of the player, i.e., a z2 direction in the reference state; a y-direction is the upward direction of the player, i.e., y1 and y2 directions in the reference state; and a z-direction is the front direction of the player, i.e., an x1 direction in the reference state.

The orientations M1 and M2 are determined based on accelerations. That is, the orientations M1 and M2 are calculated on the assumption that the accelerations obtained from the first controller 34 and the second controller 36 are regarded as gravitational accelerations g1 and g2, respectively, and the direction of gravity is a vertically downward direction. That is, the accelerations g1 and g2 are obtained as three-dimensional vectors of the coordinate systems of the respective acceleration sensors. When these three-dimensional vectors are directed in the vertically downward direction, i.e., a negative y-axis direction, of the space coordinate system, the directions of all of the axes of the acceleration sensors in the space coordinate system are determined relatively, and thus the orientations M1 and M2 are also obtained by calculating how the two controllers have rotated from the reference state to have the corresponding orientations represented by the vectors. For example, as shown in (b) of FIG. 23, in the case where the acceleration applied to the first controller 34 changes to g1', the directions of x1, y1, and z1 when the vector direction of g1' is directed in the negative y-axis direction of the space coordinate system are x1', y1', and z1', respectively, and therefore a rotation M1' can be calculated. After the orientations M1 and M2 are calculated, an orientation Mm, which is the average of M1 and M2, is calculated. The average orientation Mm is used to control the personal watercraft PO in the game. With the use of the average orientation Mm for the control, not only can the effect of incorrect input be reduced, but also natural input can be performed even when simultaneously performing another operation on one of the two controllers. In the handlebars of some motorcycle, the left and right handlebars may not be in the same straight line, and may form a certain angle there between in a slanted manner or may be nearly parallel to each other. However, even when the player holds the two controllers in such manners, the average orientation Mm is the same as that obtained when holding the two controllers as if holding handlebars in the same straight line, and thus it is possible to reduce the effect caused by variation of the manner that the player holds the two controllers.

Referring to FIG. 23, by showing how the directions of specific vectors, determined for convenience, change in accordance with three-dimensional rotations, it will be described how the rotations of the two controllers and the average rotation change. Here, on the assumption that as for the orientations of the first controller 34 and the second controller 36, the average vector of two vectors directed in the upward directions (the y1 direction and the y2 direction, respectively) of the two controllers in the reference state is a vector ave, the average orientation Mm will be described with reference to the average vector ave. In the reference state shown in (a) of FIG. 23, the average vector ave is directed upward, i.e., directed in a positive y-axis direction. When the directions (y1 and y2) of the upward vectors of the two controllers become y1' and y2' of (b) of FIG. 23, respectively, due to the changes of the orientations of the two controllers, the average vector ave becomes ave' of (b) of FIG. 23. Referring to (b) of FIG. 23, the first controller 34 and the second controller 36 tilt in different manners, but the tilt of the average vector ave' represents the average of the tilts of the two controllers. The orientation of the personal watercraft PO is also determined in accordance with the orientation of the average vector ave'. In practice, however, it is not necessary to calculate vectors, and it is only necessary to calculate a rotation Mm' by which the average vector ave becomes ave'. The orientation of the personal watercraft PO is obtained by adding the rotation Mm' to the orientation in the reference state, and as a result, the personal watercraft PO tilts as shown in (c) of FIG. 23. The orientation of the personal watercraft PO may not be obtained by rotating the orientation in the reference state, and may be determined in advance in accordance with the value of Mm. Consequently, it is possible to finely set, for example, the pose of the player object on the personal watercraft PO in accordance with the tilt.

Next, with reference to FIG. 24, the operation based on the angular velocities of the first controller 34 will be described. First, the accelerator operation of the personal watercraft PO performed by twisting the first controller 34 will be described. Similarly to FIG. 23, (a) and (b) of FIG. 24 show a reference state, the states of the two controllers after the accelerator operation, and an average rotation. Here, the diagrams each are viewed from the side of the player, i.e., viewed along the x-direction defined in the space of FIG. 23. Similarly to (a) of FIG. 23, (a) of FIG. 24 shows the reference state. (b) of FIG. 24 shows the state where the operation of twisting the first controller 34 back toward the player has been performed. That is, it is shown that the operation of accelerating the personal watercraft PO using the first controller 34 to resemble the accelerator of a motorcycle has been performed. At this time, the gyro sensor 104 detects an angular velocity Rz around the z-axis (i.e., a pitch rotation, since the first controller 34 is held laterally in the present embodiment) of the first controller 34. As for the orientations of the two controllers, since the first controller 34 is greatly tilted but the second controller 36 is not tilted, the average rotation Mm' is a slightly tilted rotation. That is, when both the first controller 34 and the second controller 36 are tilted so as to tilt the orientation of the personal watercraft PO, the personal watercraft PO tilts as a result of the tilts of the both controllers. In contrast, when only the first controller 34 is tilted so as to perform acceleration, the personal watercraft PO tilts in a limited manner so as not to tilt in an unnatural manner. As shown in (c) of FIG. 24, the personal watercraft PO tilts, slightly floating, and also is accelerated in the game space based on the input of the angular velocity Rz. That is, since the personal watercraft PO floats when accelerating, it is also comfortable as the behavior of a personal watercraft. Thus, even if the rotation of the first controller 34 is used for the accelerator operation, it is possible to perform an orientation control of an object based on the orientations of the two controllers and perform the acceleration of the object based on the rotation of the first controller 34, simultaneously and comfortably, since the reflection of the orientation of the first controller 34 is reduced and the object floats when accelerating.

Next, the operation of laterally rotating the personal watercraft PO in the jump state as described above and an overview of the control process performed at this time will be described. As described above, in the present embodiment, in the state where the player object (the personal watercraft PO in the present embodiment) is temporarily floating in the air in the virtual game space, as in the jump state, an orientation control of the personal watercraft PO is performed based on angular velocity data. The advantages of performing the orientation control in the jump state using the angular velocity data from the gyro sensor 104 are as follows. First, it may be difficult to detect the yaw rotation of the first controller 34 using acceleration data. For example, when the first controller 34 is rotated in the yaw direction, maintaining an even orientation with the ground, only the gravitational acceleration is outputted as the acceleration data. Therefore, it may be difficult to accurately detect the change of the orientation of the first controller 34 as a result of the rotation operation. In response, in the present embodiment, the change of the orientation of the first controller 34 as a result of the rotation operation is detected more accurately, by using the angular velocity data from the gyro sensor unit 100. Consequently, it is possible to perform an intuitive operation of rotating the personal watercraft PO in the yaw direction by rotating the first controller 34 in the yaw direction. Note that since, generally, the gyro sensor 104 is likely to cause errors due to its characteristics, if the gyro sensor 104 continues to calculate the orientation of the first controller 34 for a long period of time, the errors caused by angular velocities are accumulated and the error of the orientation increases. Accordingly, if the amount of change in orientation is calculated based on the amount of change in angular velocity for a short period of time, the error of the orientation decreases. For example, it is assumed that when the first controller 34 is rotated 90 degrees in the yaw direction for one second, the data representing 89 degrees is obtained from the gyro sensor 104. That is, it is assumed that although the first controller 34 is rotated 90 degrees, the gyro sensor 104 detects a change of only 89 degrees and an error of one degree per second occurs. In this case, it is possible to calculate the amount of change in orientation more accurately in the case of performing the orientation control based on data of 2 seconds than that of 10 seconds, since the accumulation of errors is smaller in the first case. In the present embodiment, since the angular velocity data is used to perform the orientation control in the state of "temporarily" floating in the air as in the jump state, i.e., in a state of which the duration is short, it is possible to effectively use the characteristics described above. Consequently, it is possible to detect the change of the orientation of the first controller 34 more accurately and reflect in the personal watercraft PO the accurately detected change.

Incidentally, in the virtual game of the present embodiment, as a basic game screen, the personal watercraft PO is drawn as viewed from the rear as shown in (a) of FIG. 22. That is, a virtual camera is located behind the personal watercraft PO such that the position and the like of the virtual camera are controlled to follow the personal watercraft PO. However, when the personal watercraft PO is rotated in the jump state, if the position of the virtual camera is still maintained behind the personal watercraft PO during the rotation, the virtual camera moves widely rotating around the personal watercraft PO. As a result, it is difficult for the player to understand that the personal watercraft PO is rotated. Further, the player loses his/her sense of direction during the rotation, and as a result, it is difficult to comprehend in which direction he/she faces when landing on the water after having jumped. This may even make the game less interesting. In response, in the present embodiment, control is performed so that the position of the virtual camera is temporarily fixed in the jump state and the rotating personal watercraft 20 is objectively drawn as shown in (c) of FIG. 22. Therefore, during the rotation, the images of the personal watercraft PO as viewed from the front and the side are also drawn.

Figure 25:
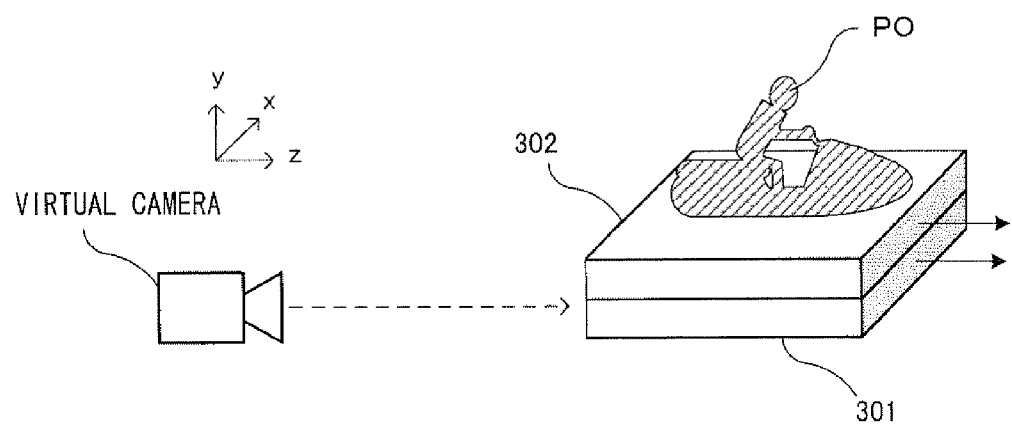
FIG. 25 is a diagram showing the concept of the orientation control of the present embodiment.

With reference to FIGS. 25 through 33, an overview of the control process in the jump state in the present embodiment will be described below. In the control process of the present embodiment, two control layers are provided for performing the orientation control. FIG. 25 is a diagram showing the concept of the control layers. FIG. 25 shows a first control layer 301 and a second control layer 302 placed on the first control layer 301 (and the personal watercraft PO placed on these layers) in an overlapping manner. Note that FIG. 25 is a conceptual diagram, and the control layers are not actually displayed in the game screen. Displayed in the game screen is the personal watercraft PO of which the orientation reflects the orientations determined based on the control layers.

The first control layer 301 is a layer for performing a basic motion control and a basic orientation control of the personal watercraft PO, and is a control layer reflecting the operation based on the orientation of the controller 14 as described above with reference to FIGS. 23 and 24. The position, the angle of view, and the like of the virtual camera are also set based on the orientation of the personal watercraft PO in the first control layer 301.

On the other hand, the second control layer 302 is a control layer for controlling the orientation of the personal watercraft PC based on the angular velocity data outputted from the gyro sensor unit 100. More specifically, in the second control layer 302, only the change of the orientation of the first controller 34 in the yaw direction is reflected (the other orientations of the personal watercraft PO are the same as those in the first control layer 301). Here, the angular velocity data is reflected in the second control layer 302 only in the jump state. That is, the second control layer 302 is used to perform the orientation control in the jump state only. In the present embodiment, also during the period (herein after referred to as an "intermediate state") from when the personal watercraft PO starts separating from the surface of water to when the personal watercraft PO is completely separate from the surface of water, the change of the orientation of the first controller 34 is reflected gradually in accordance with the degree of contact between the surface of water and the personal watercraft PO. Specifically, in the present embodiment, a degree of contact D between the surface of water and the personal watercraft PO is calculated, and the degree of reflecting the angular velocity data in the second control layer 302 is changed in accordance with the value of the calculated degree of contact D. In the present embodiment, the value of the degree of contact D is in the range of "0≤D≤1". When D="1", the personal watercraft PO is in the state of being completely immersed in the water.

When D="0", the personal watercraft PO is in the state of being completely separate from the surface of water. Here, the "state of being completely immersed in the water" refers to the state where the bottom of the personal watercraft PO is as immersed in the water as when the personal watercraft PO is floating on the surface of water in a stopped state. That is, when the degree of contact D is "0" (in the state where the personal watercraft PO is floating in the air), 100% of the angular velocity data is reflected in the orientation control of the personal watercraft PO, whereas, when the degree of contact D is "1" (in a state not the jump state), the angular velocity data is not reflected (as a result, when the degree of contact D is "1", the second control layer 302 moves remaining on the first control layer 301). In the intermediate state, in accordance with the degree of contact D, for example, 50% of the angular velocity data is reflected in the orientation control of the personal watercraft PO.

Figure 26:
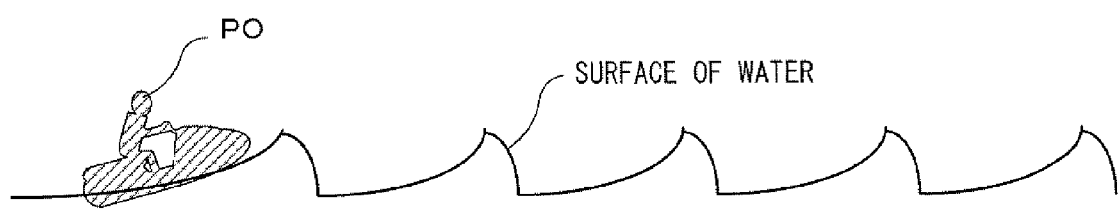
FIG. 26 is a diagram showing an example of the state of the surface of water in a virtual game space.

Note that the reason that the gradual (analog) control described above is performed in the intermediate state is so that the input value of the gyro sensor 104 is prevented from instantaneously acting on the personal watercraft PO in the case where the state frequently alternates between the jump state (i.e., the state of floating in the air) and a non-jump state (i.e., the state of contacting the ground (or the water)). For example, when minimal slopes (waves) are continuously present on the surface of water as shown in FIG. 26, if control is performed in accordance with the degree of contact D using only the two steps of "0" and "1", it is difficult for the player to understand the timing of performing the rotation operation in the jump state. Further, when the rotation operation is reflected even in the intermediate state to a certain degree, it is possible to provide the player with a more comfortable sense of playing. Thus, the gradual orientation control described above is performed so as to make it easy for the player to comprehend the timing of performing the rotation operation and provide the player with a comfortable sense of playing.

Figure 27:
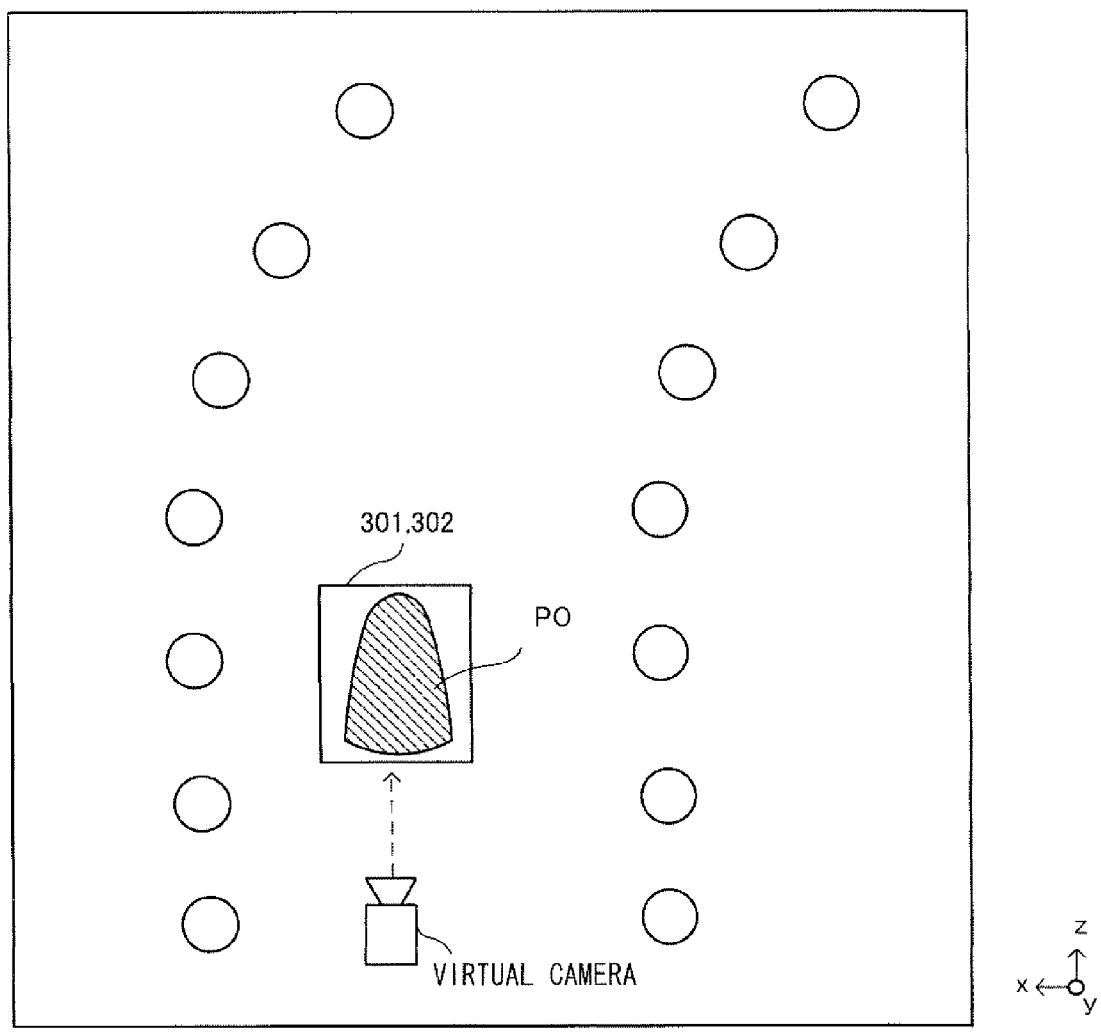
FIG. 27 is a bird's-eye view of the virtual game space when the personal watercraft object is not in a jump state.
Figure 28:
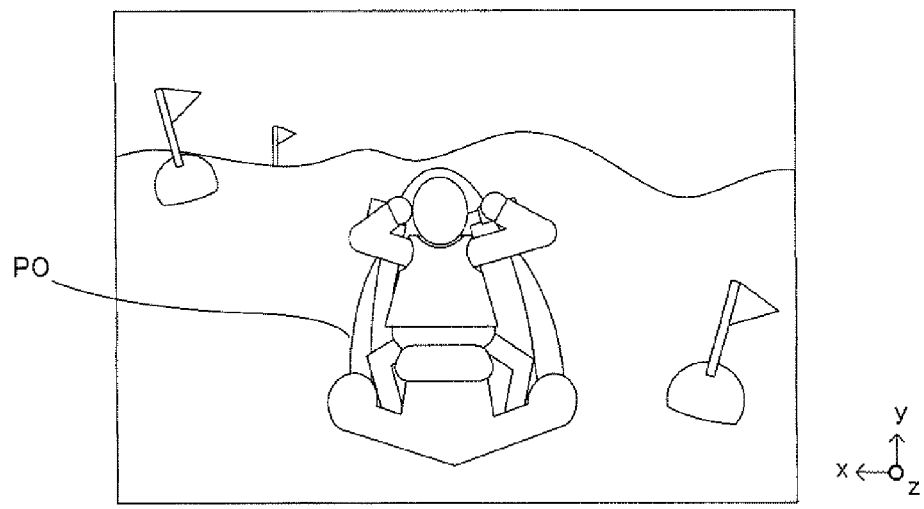
FIG. 28 is an example of a game screen.

FIG. 27 is a bird's eye view of the virtual game space when the personal watercraft PO is not in the jump state. FIG. 28 is a diagram showing an example of the game screen at this time. In this state, the orientations of the first control layer 301 and the second control layer 302 are the same, and as a result, the orientation of the personal watercraft PO directly reflects the orientation of the first control layer 301. The virtual camera is located immediately behind and slightly apart from the first control layer 301. As described above, a movement control of the virtual camera is performed so that the virtual camera follows the first control layer 301 from immediately behind.

Figure 29:
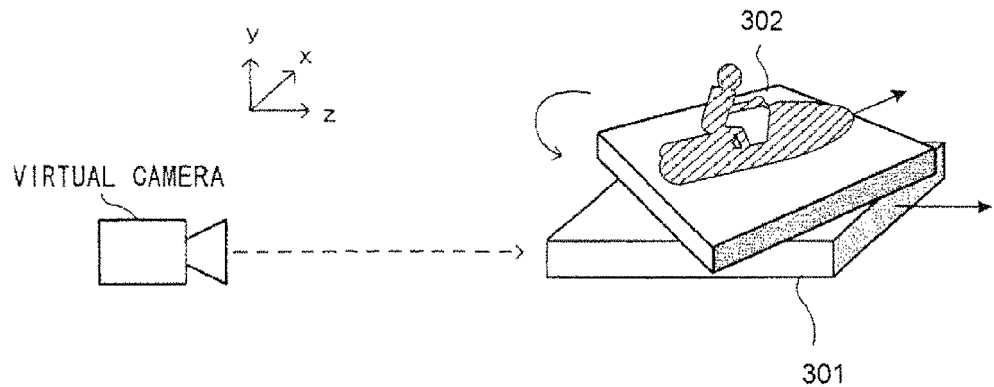
FIG. 29 is a diagram showing the concept of the orientation control in the jump state.
Figure 30:
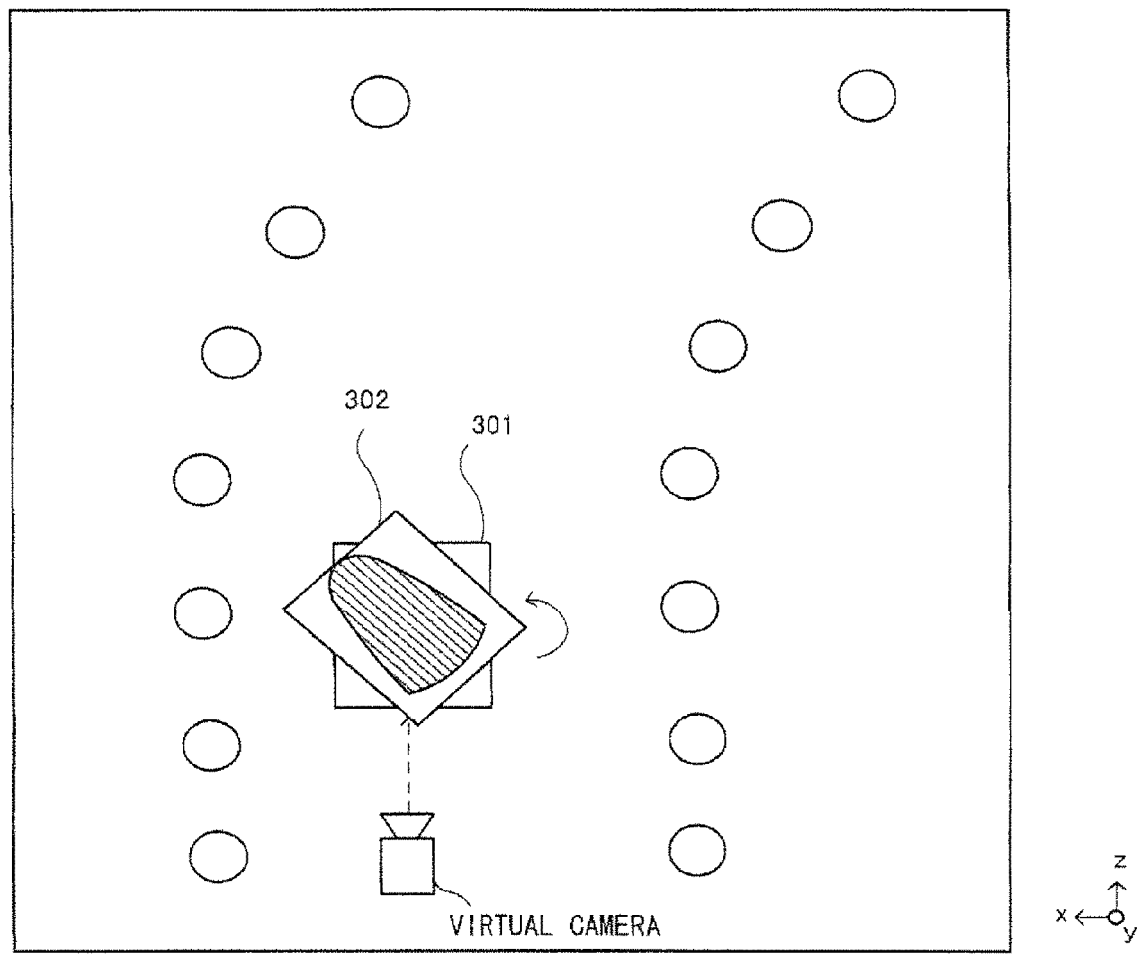
FIG. 30 is a bird's-eye view of the virtual game space when the personal watercraft object is in the jump state.

Next, FIG. 29 is a diagram showing an example of the state of the control layers when the personal watercraft PO is in the jump state. FIG. 30 is a bird's-eye view of the virtual game space when the personal watercraft PO is in the jump state. FIGS. 29 and 30 show that only the second control layer 302 is rotating in the yaw direction. The virtual camera remains behind the first control layer 301 (on the left side of FIG. 29). The orientation of the second control layer 302 as a result of the yaw rotation is reflected in the orientation of the personal watercraft PO. As a result, the personal watercraft PO rotating in the air is displayed in the game screen as shown in FIG. 31.

Figure 32:
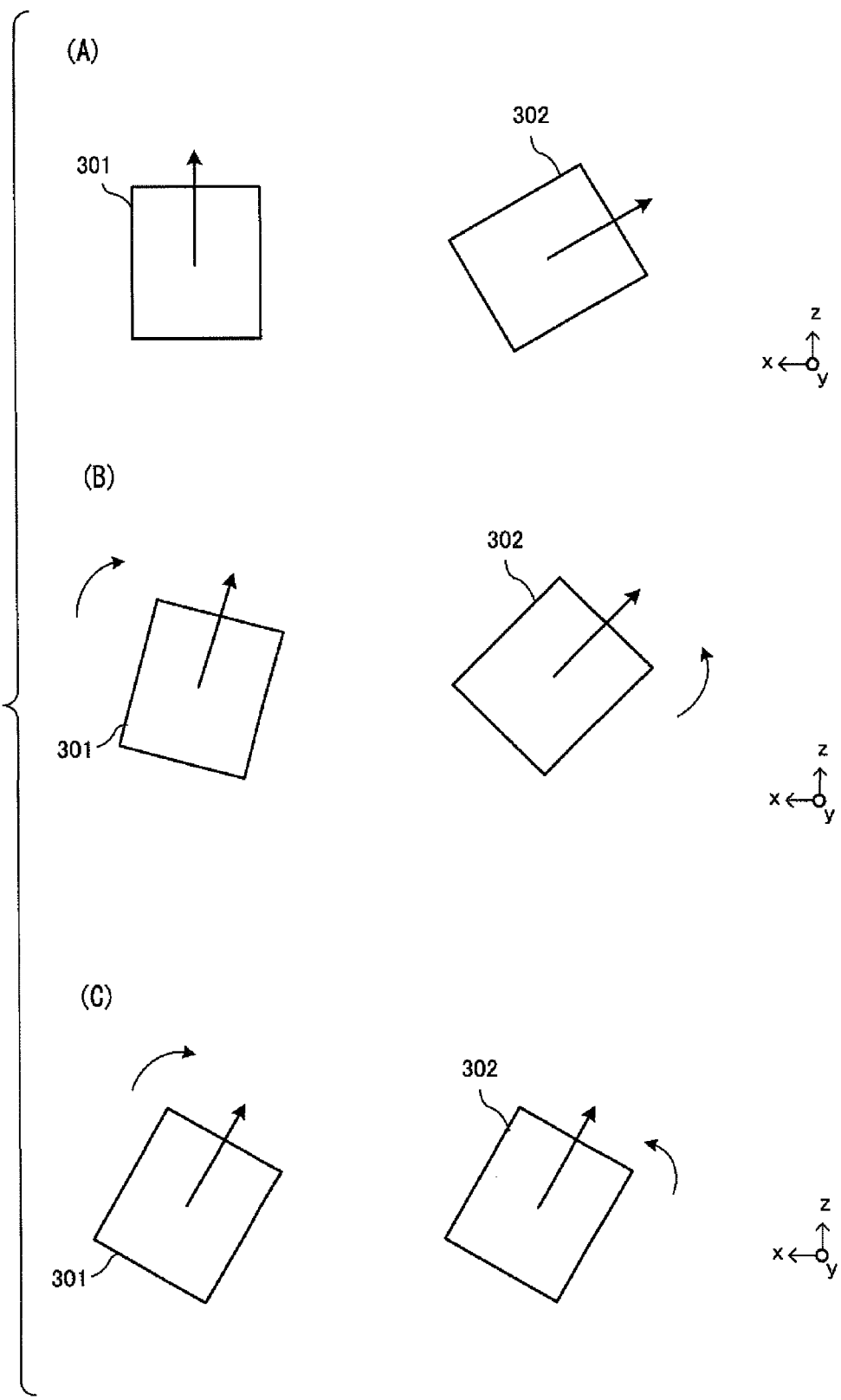
FIG. 32 is a diagram showing an overview of the process performed when the personal watercraft object lands on the water.
Figure 33:
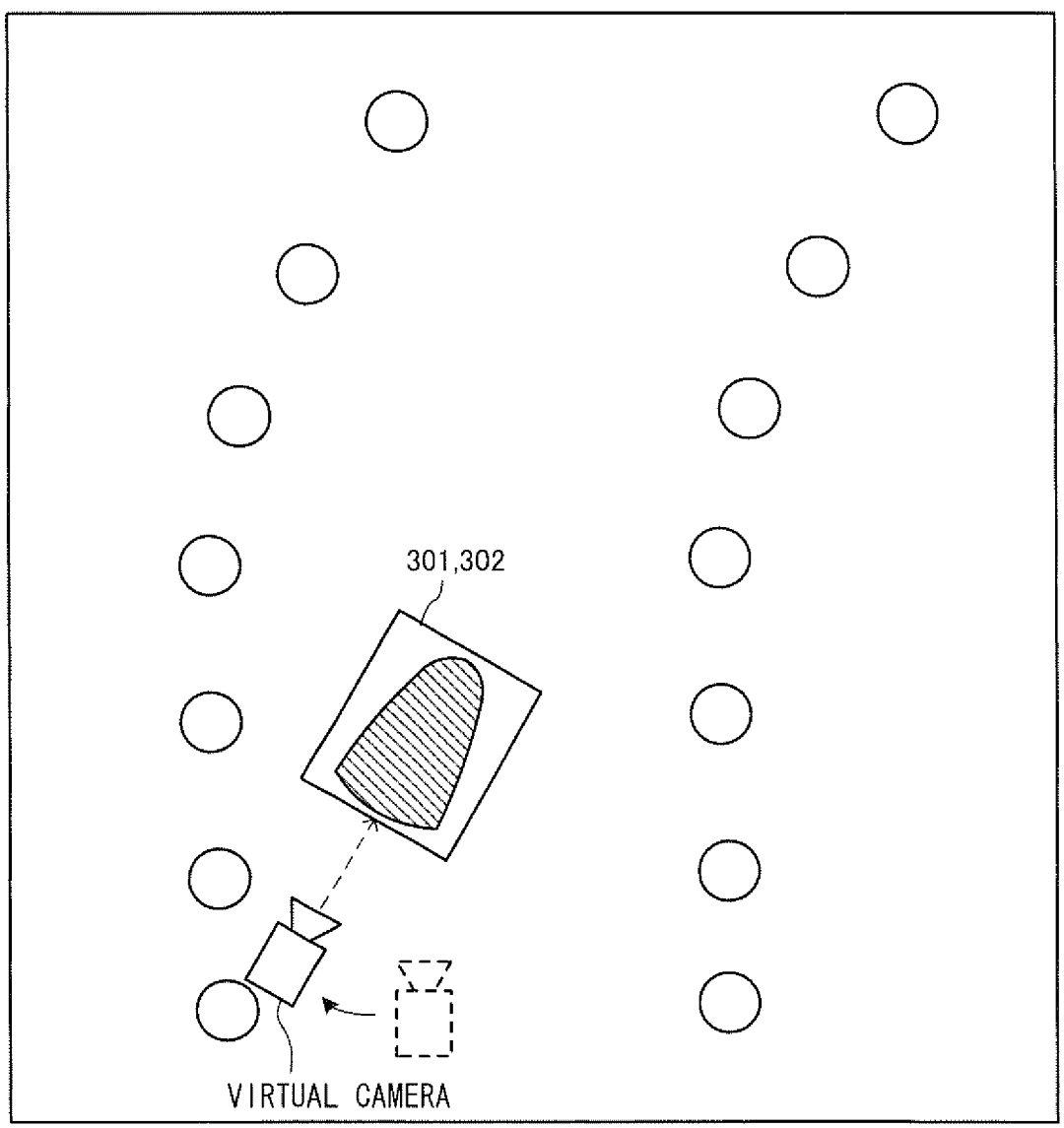
FIG. 33 is a bird's-eye view of the virtual game space after the personal watercraft object lands on the water.

Next, an overview of the process performed when the personal watercraft PO lands on the water after having jumped will be described. When the personal watercraft PO lands on the water after having jumped, the orientations of the first control layer 301 and the second control layer 302 may deviate from each other since the personal watercraft PO has not necessarily rotated exactly 360 degrees. In response, a process of making both orientations the same is performed. FIG. 32 is a diagram showing the overview of the process performed when the personal watercraft PO lands on the water. First, the orientations of the first control layer 301 and the second control layer 302 immediately after landing on the water after having jumped (when the degree of contact D is "1") are the state shown in (a) of FIG. 32. Referring to (a) of FIG. 32, in the first control layer 301, an arrow indicating the z-axis direction is directed upward (which corresponds to the perspective direction of the virtual game space), while in the second control layer 302, an arrow indicating the z-axis direction is directed in a slightly upper right direction. In the present embodiment, after the personal watercraft PO lands on the water, orientation controls of the control layers are performed so that the first control layer 301 and the second control layer 302 gravitate toward each other as shown in (b) of FIG. 32. When the both orientations eventually coincide with each other as shown in (c) of FIG. 32, a process of setting this orientation as a new orientation of the first control layer 301 is performed. As a result, the orientation of the personal watercraft PO when landing on the water after having jumped changes, as shown in FIG. 33, slightly more toward the right than before the jumping (see FIG. 27). The orientations of the control layers are thus brought closer to each other, whereby it is possible to prevent the position of the virtual camera or the orientation of the personal watercraft PO from drastically changing at the time of adjusting the orientations of the control layers after landing on the water, and it is possible to make a natural adjustment. When a jump operation does not necessarily affect a direction control and a jump is to be made simply as a performance, control may be performed so that the first control layer 301 stays the same and the second control layer 302 is gradually brought closer to the first control layer 301. That is, it is only necessary that the orientations of the second control layer 302 and the first control layer 301 are the same after the jump, and the degree of the first control layer 301 coming closer to the second control layer 302 may be changed depending on the purpose of the game.

As described above, in the present embodiment, the orientation control of the personal watercraft PO is performed based on angular velocities in the state where the personal watercraft PO is temporarily floating in the air in the virtual game space. Consequently, the change of the orientation of the first controller 34, which cannot be accurately detected by only an acceleration sensor, can be detected more accurately and reflected in the game processing. Further, the angular velocity data is used to perform the orientation control for a short period of time, as in the jump state, it is possible to reduce the effect caused by the accumulation of errors, and thus the player can perform a comfortable orientation control.

Figure 34:
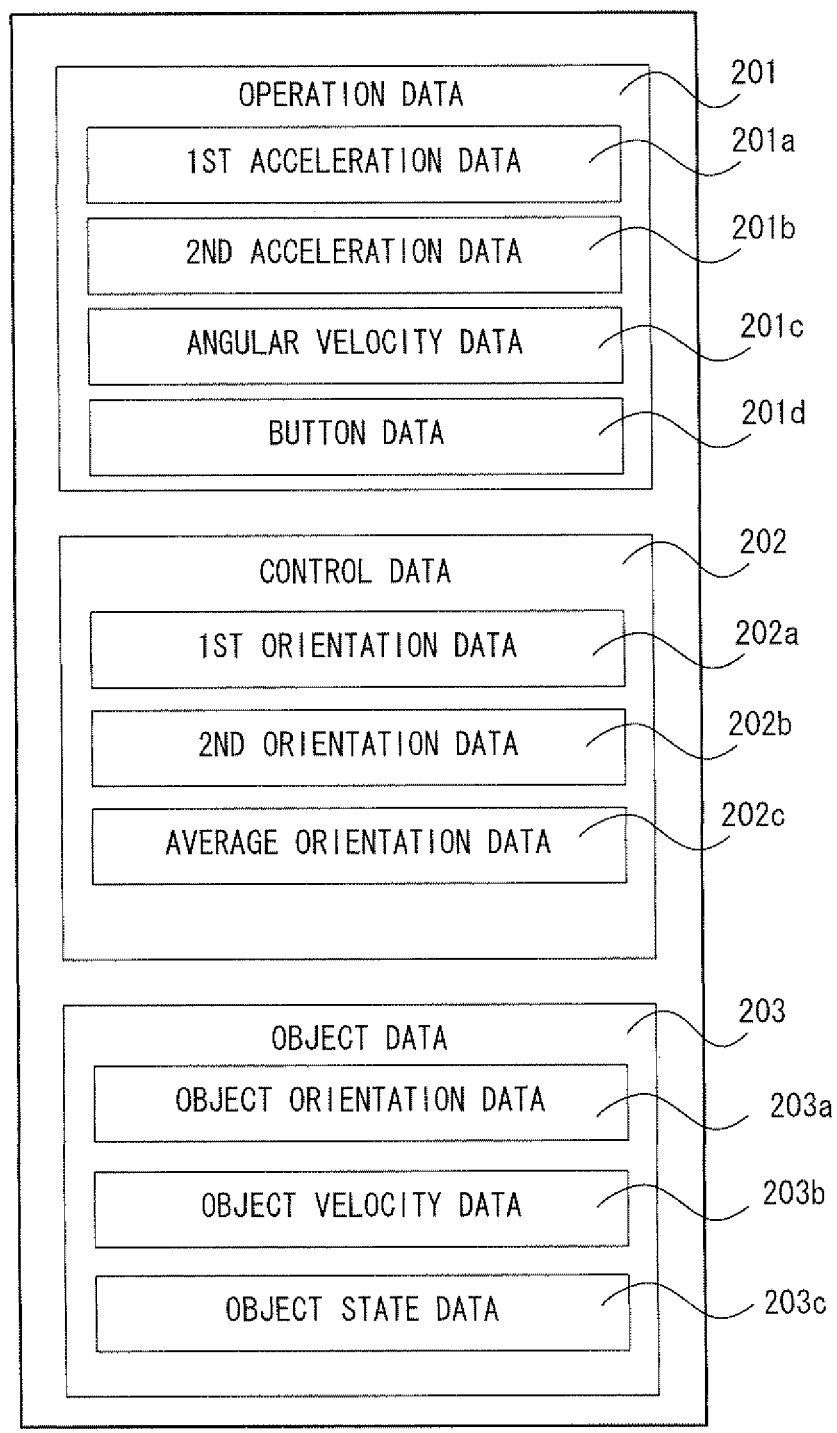
FIG. 34 is a diagram showing a memory map of the data used for the game of the present embodiment.

Next, the game processing executed in the present embodiment will be described in detail below. FIG. 34 is a diagram showing a memory map of the data used to execute the game program of the present embodiment. The data is stored in the internal main memory 62e and the external main memory 66 of the game apparatus 12. Note that the game program is also stored in the internal main memory 62e and the external main memory 66, but is not shown in the diagram.

Operation data 201 is the operation data transmitted from the controller 14. The operation data 201 includes: first acceleration data 201a representing the three-axis accelerations of the first controller 34 based on the output of the acceleration sensor 84; second acceleration data 201b representing the three-axis accelerations of the second controller 36 based on the output of the acceleration sensor 86; angular velocity data 201c representing the three-axis angular velocities of the first controller 34 based on the output of the gyro sensor 104; button data 201d based on the operations of the buttons; and the like.

Control data 202 is data, calculated based on the operation data 201, for controlling a game. The control data 202 includes first orientation data 202a, second orientation data 202b, average orientation data 202c, and the like. The first orientation data 202a represents the orientation of the first controller 34, calculated based on the first acceleration data 201a, and corresponds to M1 of FIGS. 23 and 24. The second orientation data 202b represents the orientation of the second controller 36, calculated based on the second acceleration data 201b, and corresponds to M2 of FIGS. 23 and 24. The average orientation data 202c represents the average orientation of the orientations calculated based on the first orientation data 202a and the second orientation data 202b, and corresponds to Mm of FIGS. 23 and 24. In the present embodiment, these pieces of orientation data are represented by three-dimensional rotation matrices, but may be represented by another form of data so long as the orientations can be specified.

Object data 203 is the data regarding objects in the game and at least includes: object orientation data 203a representing the orientation of the player object (the personal watercraft PO in the present embodiment) in the game space; object velocity data 203b representing the velocity and the direction of movement of the player object in the game space; and object state data 203c representing the state of the player object, such as whether or not it is in the jump state. Note that the object data 203 also includes model data representing the shapes of objects, the data regarding texture images, and the data not regarding the player object, but these pieces of data are not shown in the figure. Note that the data regarding the music and the images that are necessary for the game is also stored appropriately, but is not shown in the figure.

Figure 35:
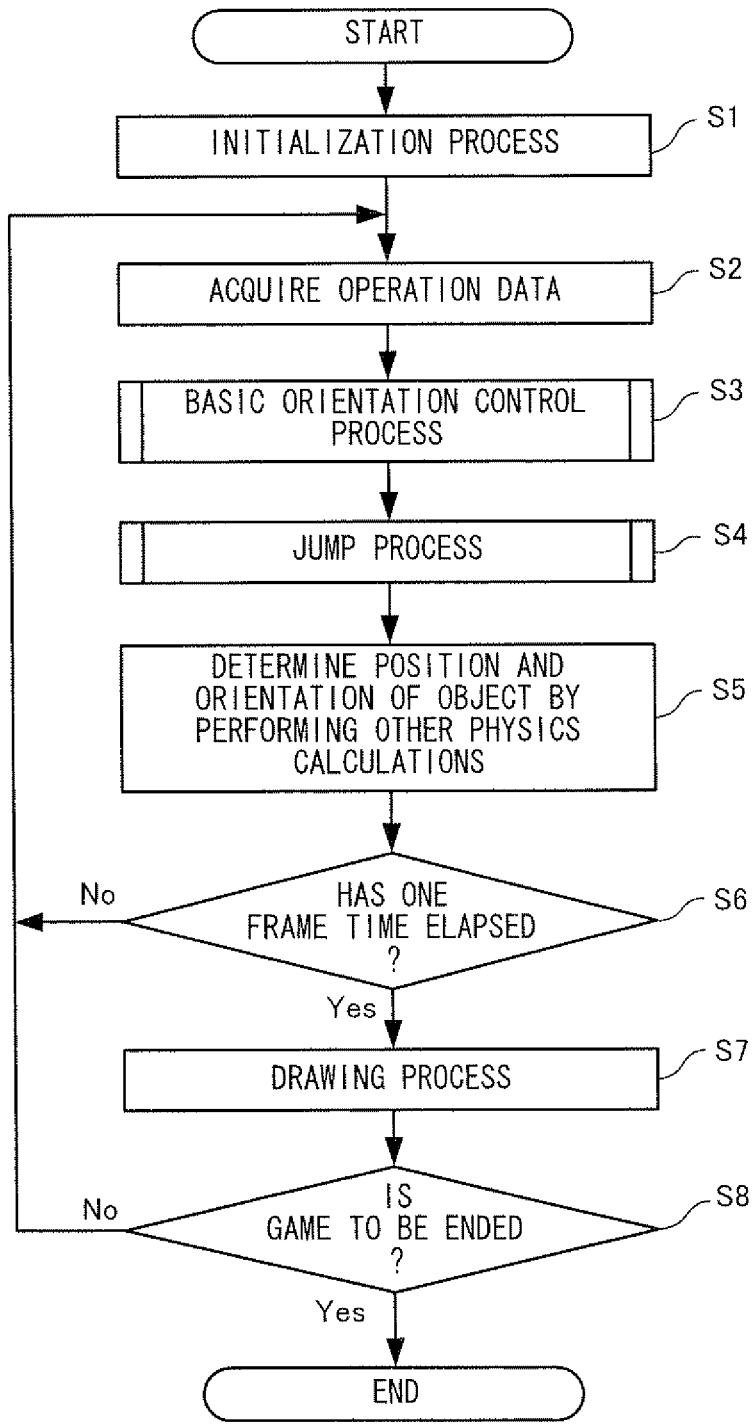
FIG. 35 is a flow chart showing game processing according to the embodiment of the present invention.

Next, with reference to FIGS. 35 through 39, the game processing executed by the game apparatus 12 will be described. When the power to the game apparatus 12 is turned on, the CPU 60 of the game apparatus 12 executes the starting program stored in the ROM/RTC 68, and thus each unit such as the external main memory 66 is initialized. The game program stored in the optical disc 22 is read by the external main memory 66, and the execution of the game program is started by the CPU 60. The flow chart of FIG. 35 is a flow chart showing the game processing executed after the process described above is completed. A process loop of steps S2 through S8, shown in FIG. 35, is performed in each frame in a repeated manner. Note that in the present embodiment, the game processing executed when the orientation control related to the jump state is not performed does not directly concern the present invention, and therefore will not be described in detail.

First, in step S1, an initialization process of the data used for the following game processing is performed. Specifically, in the object state data 203c, the data representing a "normal state" where the personal watercraft PO is in a normal running state (i.e., not in the jump state) is set. Additionally, the various variables used in the game processing are initialized, and a three-dimensional game space where the personal watercraft PO and the like are located is constructed and drawn as a game image in the monitor 26.

Next, in step S2, an acquisition process of the operation data 201, transmitted from the controller 4 and stored in a memory as needed, is performed.

Figure 36:
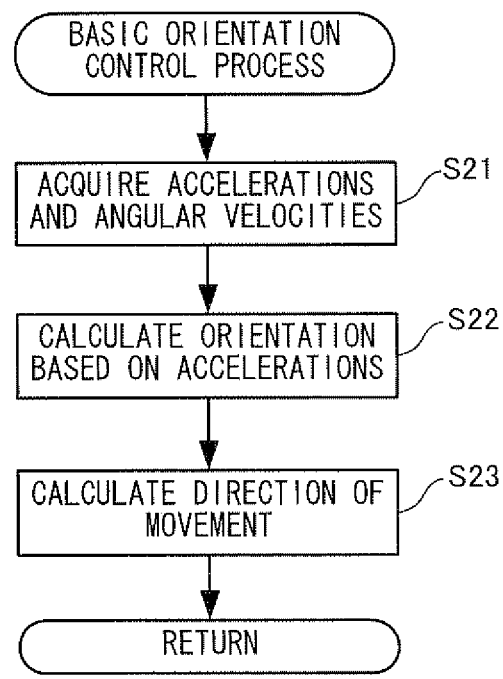
FIG. 36 is a flow chart showing the details of a basic orientation control process in step S3 of FIG. 35.

Next, in step S3, a basic orientation control process is performed. In this process, the process described above for controlling the orientation of the personal watercraft PO in the first control layer 301 is performed. FIG. 36 is a flow chart showing the details of the basic orientation control process of step S3. Referring to FIG. 36, first, in step S21, the first acceleration data 201a, the second acceleration data 201b, and the angular velocity data 201c are acquired from the acquired operation data 201.

Next, in step S22, the orientation of the personal watercraft PO in the first control layer 301 is calculated based on the first acceleration data 201a and the second acceleration data 201b. More specifically, first, the CPU 60 calculates the orientations (as three-dimensional rotation matrices) of the first controller 34 and the second controller 36 based on the first acceleration data 201a and the second acceleration data 201b, and stores the calculated orientations as the first orientation data 202a and the second orientation data 202b, respectively. Further, the CPU 60 calculates a rotation matrix that is the average of the first orientation data 202a and the second orientation data 202b, and the stores the average rotation matrix as the average orientation data 202c. Then, the CPU 60 determines the orientation of the personal watercraft PO in the first control layer 301 based on the average orientation data 202c.

Next, in step S23, the direction of movement and the velocity of movement (the amount of movement per frame) of the personal watercraft PO are set in accordance with the determined orientation of the personal watercraft PO in the first control layer 301. At this time, the position and the angle of view of the virtual camera are also set based on the orientation of the personal watercraft PO in the first control layer 301. Thus, the basic orientation control process ends.

Figure 37:
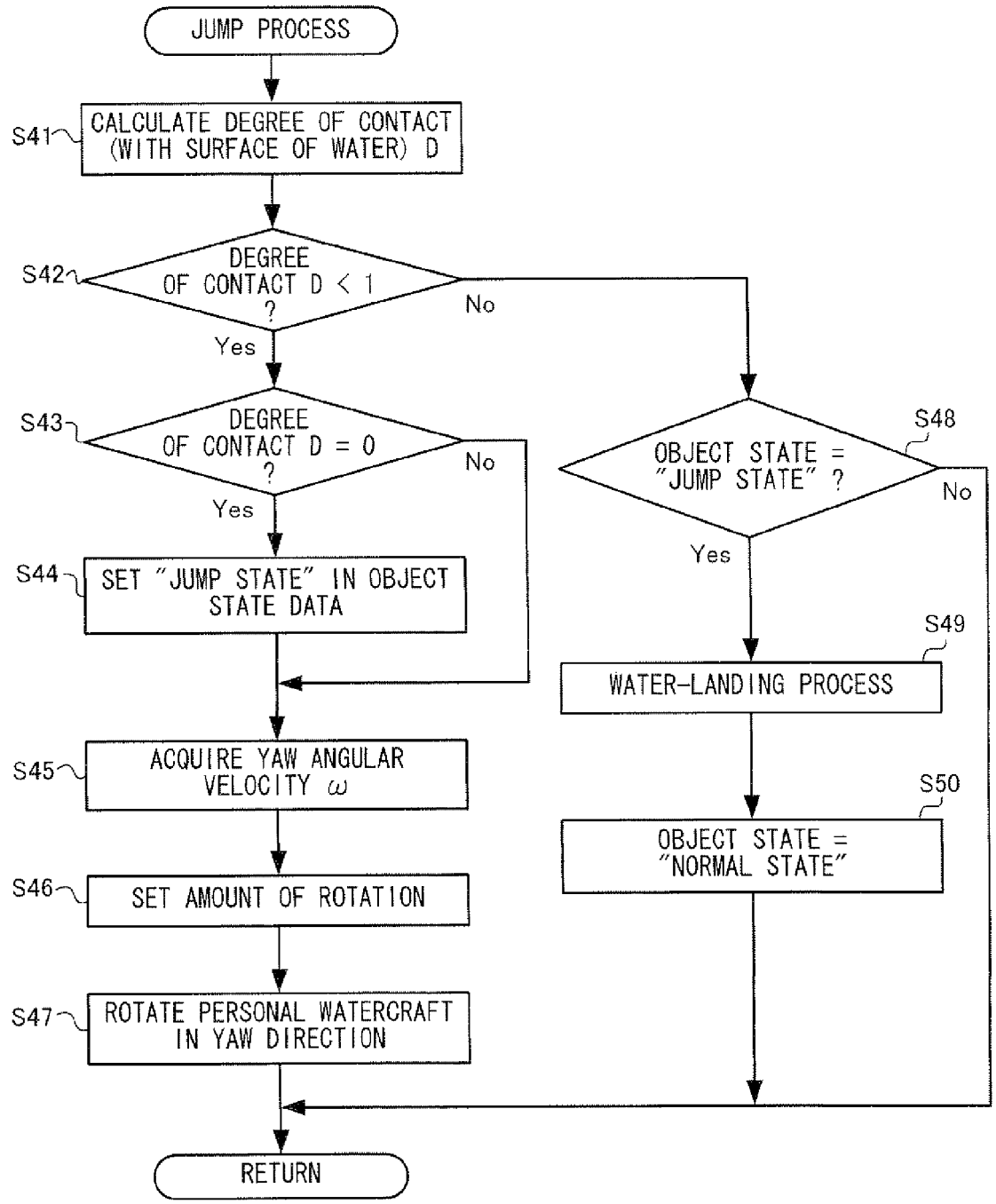
FIG. 37 is a flow chart showing the details of a jump process in step S4 of FIG. 35.
Figures 38, 39:
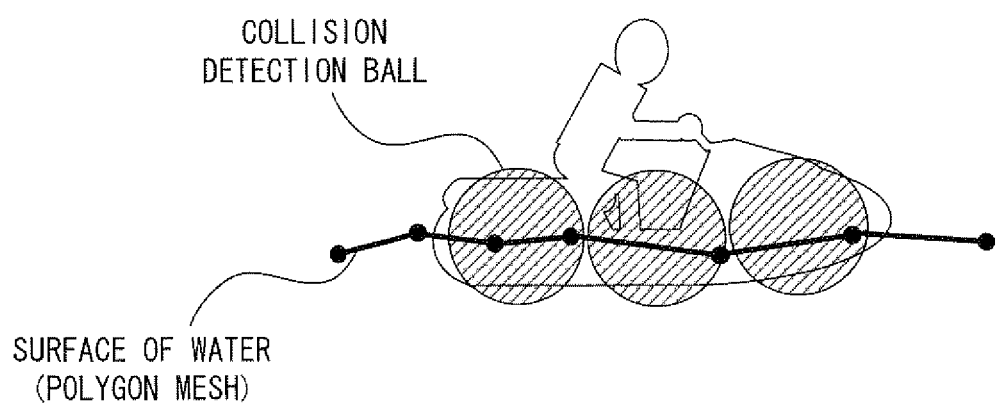
FIG. 38 is an example of a table representing the correspondence between a water-immersed volume and a degree of contact D.
FIG. 39 is a diagram illustrating a method of calculating the water-immersed volume.

Referring back to FIG. 35, next, in step S4, a jump process is performed. In this process, a process of changing the orientation of the personal watercraft PO in the second control layer 302 in accordance with the degree of contact D, as described above, and the like are performed. FIG. 37 is a flow chart showing the details of the jump process of step S4. Referring to FIG. 37, first, in step S41, the degree of contact D between the personal watercraft PO and the surface of water is calculated. The degree of contact D may be calculated by any method. For example, the degree of contact D may be calculated based on the volume (herein after referred to as a "water-immersed volume") of the water-immersed portion of the personal watercraft PO. Specifically, as shown in FIG. 38, a table associating the water-immersed volume with the degree of contact D is defined in advance. The table of FIG. 38 shows, as an example, that in the range of values representing the water-immersed volume from 0 to 100, when the water-immersed volume is higher than 72, the degree of contact D is set to "1", and when the water-immersed volume is 0, the degree of contact D is set to "0". It is also shown that when the water-immersed volume is between 0 and 72, the degree of contact D is gradually set in accordance with the water-immersed volume. Thus, the water-immersed volume may be calculated and then the degree of contact D may be set with reference to this table. As a method of calculating the water-immersed volume, for example, as shown in FIG. 39, hypothetical collision detection balls may be set in the personal watercraft PO so that the volume of the portion of the collision detection balls that sinks in the surface of water, which is a so-called polygon mesh.

Referring back to FIG. 37, next, it is determined in step S42 whether or not the degree of contact D is less than "1", i.e., whether or not the personal watercraft PO is in the jump state. When it is determined that the degree of contact D is "1", i.e., that the personal watercraft PO is completely immersed in the water ("No" in step S42), the process proceeds to step S48. On the other hand, when it is determined that the degree of contact D is less than "1" ("Yes" in step S42), it is determined in step S43 whether or not the degree of contact D is "0", i.e., whether or not the personal watercraft PO is completely separate from the surface of water. When it is determined that the degree of contact D is "0" ("Yes" in step S43), the data representing the "jump state" is set in the object state data 203c in step S44, and the process proceeds to step S45. On the other hand, when it is determined that the degree of contact D is not "0" ("No" in step S43), the process proceeds to step S45, skipping step S44.

Next, in step S45, an angular velocity ω in the yaw direction as viewed from the player is acquired. That is, an angular velocity in the yaw direction (around the y-axis and/or around the x-axis, to be specific) as viewed from the player is acquired from the angular velocity data acquired in step S2.

Next, in step S46, the amount of rotation of the personal watercraft PO is set. Specifically, the amount of rotation is calculated by the following equation.

The amount of rotation=$(1-D) \times \omega$ ("×" represents multiplication by scalars)

The amount of rotation is thus calculated using the degree of contact D, whereby it is possible to make such an analog representation that when the water-immersed volume of the personal watercraft PO is large (although the personal watercraft PO is not "completely" immersed in the water), not 100% but, for example, only 50% of the angular velocity data is reflected in the amount of rotation, that is, the amount of rotation is made smaller than when the personal watercraft PO is completely floating in the air. Note that in the present embodiment, since the manner of the rotation is a predetermined motion, i.e., a spin in the yaw direction in the jump state, control is performed based on the amount of rotation. However, the rotation may be controlled by a degree of freedom of more than two dimensions, e.g., by adding the roll direction. In this case, ω and the amount of rotation are represented by a two-dimensional vector or a three-dimensional vector.

Next, in step S47, the second control layer 302 is rotated in the yaw direction (around the y-axis in the virtual game space). The orientation of the second control layer 302 is reflected in the personal watercraft PO, whereby the personal watercraft PO rotates in the yaw direction. At this time, in view of the adjustment of the difficulty level of the game and the like, the amount of rotation may be adjusted to slightly increase (for example, even when an actual amount of rotation of the first controller 34 corresponds to half a rotation, the personal watercraft PO may be rotated twice as much, i.e., 360 degrees), or inertia may be added to the rotation. That is, an adjustment process for making it easier to rotate the personal watercraft PO may be performed, thereby reducing the difficulty level of the game and making the game more interesting. Thus, the jump process ends.

Next, the process performed when it is determined that the degree of contact D is "1" ("No" in step S42) will be described. In this case, it is determined in step S48 whether or not the object state data 203c represents the "jump state". That is, it is determined whether the object state data 203c represents the state immediately after the personal watercraft PO lands on the water after having jumped or a normal running state. When it is determined that the object state data 203c does not represent the "jump state" ("No" in step S48), the jump process immediately ends.

When it is determined that the object state data 203c represents the "jump state" ("Yes" in step S48), a water-landing process is performed in step S49. In this process, a new orientation of the first control layer 301 is determined by adjusting the deviation between the orientations of the first control layer 301 and the second control layer 302, as described with reference to FIG. 32. For example, an orientation obtained by calculating the orientation vectors of the both control layers and averaging the calculated orientation vectors is set as the new orientation of the first control layer 301. Then, in step S50, the data representing the "normal state" is set in the object state data 203c. Thus, the jump process ends. This averaging process may be performed smoothly over several frames.

Referring back to FIG. 35, next, in step S5, the position and the orientation of the personal watercraft PO are determined by performing other physics calculations, such as calculations for reflecting the effects of a "wind" blowing in the virtual game space, "waves", and the like.

Next, it is determined in step S6 whether or not one frame time has elapsed since the last time drawing has been made. When it is determined that one frame time has not elapsed ("No" in step S6), the game processing is repeated, returning to step S2 (since, in the present embodiment, the operation data is transmitted every ½₀₀ sec., the process loop of steps S2 through S6 is repeated three to four times in one frame, i.e., ⅙₀ sec.). On the other hand, when it is determined that one frame time has elapsed ("Yes" in step S6), a drawing process is performed in step S7. That is, the image of the virtual game space captured by the virtual camera is displayed as a game image in the monitor 26.

After step S7, it is determined in step S8 whether or not the game is to be ended. If "Yes", the game processing is completed, and if "No", the game processing is repeated, returning to step S2. Thus, the game processing according to the present embodiment is completed.

As described above, in the present embodiment, the change of the orientation, in the air, of an object temporarily present in the air in a virtual space by, for example, jumping is controlled by the angular velocity data from the gyro sensor 104. Consequently, it is possible to minimize the effect of detection errors and improve the accuracy of input.

Note that in the embodiment described above, an example of the personal watercraft PO in the jump state is rotated in the yaw direction, but may be rotated in a direction (i.e., the pitch direction) other than the yaw direction.

In the embodiment described above, the game of operating a personal watercraft is taken as an example, and therefore, an example state is "jumping from the surface of water". However, needless to say, the present invention can also be applied to the case of jumping from the ground. The present invention can also be applied to general processes of controlling an object temporarily floating in the air in a virtual space in which a gravity is set, such as in the case where a player object jumps, for example, on the back of a mighty monster, as well as the surface of water and the ground.

Figure 40:
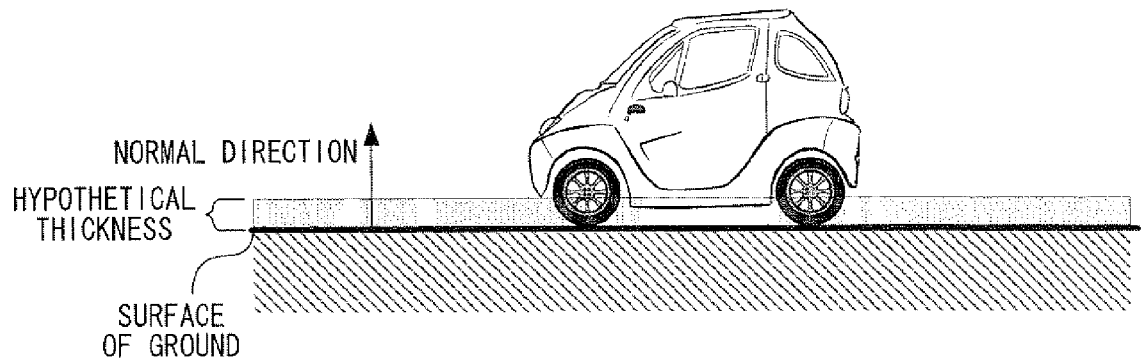
FIG. 40 is a diagram illustrating a method of calculating the degree of contact D in the case of an automobile object.

In the embodiment described above, the game of operating a personal watercraft is taken as an example, but the present invention may also be applied to a game of operating an automobile object instead of the personal watercraft. In this case, the degree of contact D between the ground and the automobile object may be calculated as follows. That is, as shown in FIG. 40, a hypothetical thickness is set in the normal direction of the ground. The degree of contact D may be obtained by calculating the volume of the portion, within the hypothetical thickness, of the automobile object. That is, the degree of contact D may be calculated based on the volume of the portion, included in the space from the surface of the ground to a certain height in the normal direction, of the automobile object.

Figure 41:
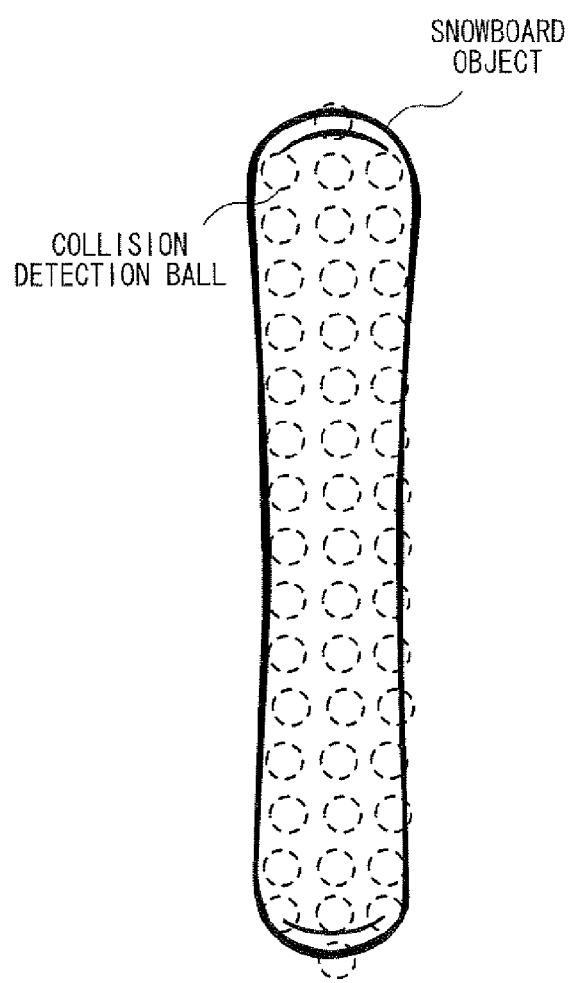
FIG. 41 is a diagram illustrating a method of calculating a ground-contacting area.

The degree of contact D may also be obtained by calculating the area, not the volume, of contact between the ground and the object. For example, in the case of a game of operating a snowboard object, a plurality of collision detection balls are set in the snowboard object, as shown in FIG. 41. The degree of contact D may be obtained by calculating the number of the collision detection balls contacting (sinking in) the ground (the surface of snow, in accordance with the content of the game) as the area of contact.

In the embodiment described above, the angular velocity data from the gyro sensor 104 is used for the orientation control in the jump state, but for example, the velocity of movement of the first controller 34 operated in the jump state described above may be calculated by, for example, performing time integration on acceleration data, and an orientation control of an object in the jump state may be performed using the calculated velocity. For example, control may be performed so that the velocity described above is calculated when the first controller 34 is swung in a lateral direction in the jump state, and the object operated by the player laterally slides when the calculated velocity exceeds a predetermined value. Further, for example, in the case of a racing game, when two courses are arranged parallel to each other (in such a manner that the courses are separated by a lane of a certain height, or there is a difference in height between one course and the other), a motion control may be performed so that when an automobile object operated by the player jumps on its course, if the first controller 34 is swung in a lateral direction, the automobile object laterally slides, whereby the course can be changed to the other. Still further, in the case of an action game or the like, a motion control may be performed so that while a player object is jumping, if the first controller 34 is swung upward at more than a predetermined velocity, the player object makes a so-called two-step jump, and if swung downward at more than a predetermined velocity, the player object plunges down and lands. Furthermore, control may be performed so that if the first controller 34 is moved in the front-rear direction (in the perspective direction) in the jump state, a sudden acceleration is performed or a sudden braking is applied. For example, in the case of a game of operating a robot object, control may be performed so that while the robot object operated by the player is jumping, if an operation of pushing the first controller 34 forward in the perspective direction is performed, the robot object dashes forward, firing boosters, and if an operation of pulling the first controller 34 toward the player is performed, the robot object dashes backward, retro-firing the boosters. Velocities calculated by integrating accelerations are also highly erroneous, and therefore, when a position is calculated based on such velocities, a similar problem to that of the angular velocities as described above may occur. Thus, similarly to the embodiment described above, based on the present invention, it is possible to effectively perform an intuitive operation, reducing errors.

While the invention has been described in detail, the foregoing description is in all aspects illustrative and not restrictive. It is understood that numerous other modifications and variations can be devised without departing from the scope of the invention.

What is claimed is:

1. A game apparatus for causing a player object and a field object that are present in a virtual game space to be displayed in a display device, comprising:
  an operation data acquisition unit for acquiring operation data at least including motion data, which is data representing a motion of a predetermined input device, from the input device;

an amount-of-change calculation unit for calculating an amount of change of the input device in a predetermined period of time, based on the motion data;

a position orientation calculation unit for calculating a position and an orientation of the player object in the virtual game space;

a degree-of-contact calculation unit for calculating a degree of contact, which represents a degree of the player object and the field object contacting each other in the virtual game space; and an orientation change unit for changing the orientation of the player object, based on the amount of change and the degree of contact.

2. The game apparatus according to claim 1,
wherein the input device includes a gyro sensor,
wherein the operation data acquisition unit acquires angular velocity data, outputted from the gyro sensor, as the motion data, and
wherein the amount-of-change calculation unit calculates the amount of change, based on the angular velocity data.

3. The game apparatus of claim 2, wherein the amount-of-change calculation unit calculates the amount of change in orientation based on the amount of change in angular velocity for a period of time that is below a predetermined threshold value.

4. The game apparatus according to claim 1,
wherein the input device includes an acceleration sensor,
wherein the operation data acquisition unit acquires acceleration data, outputted from the acceleration sensor, as the motion data, and
wherein the amount-of-change calculation unit calculates the amount of change, based on the acceleration data.

5. The game apparatus according to claim 4,
wherein the amount-of-change calculation unit calculates a velocity of movement of the motion of the input device in the predetermined period of time by integrating accelerations represented by the acceleration data, and
wherein the orientation change unit changes the orientation of the player object, based on the velocity of movement and the degree of contact.

6. The game apparatus according to claim 1,
wherein the orientation change unit changes the orientation of the player object, based on the amount of change, only when the degree of contact between the player object and the field object is smaller than a predetermined value.

7. The game apparatus according to claim 1,
wherein the orientation change unit changes the orientation of the player object such that the smaller the degree of contact between the player object and the field object, the larger the proportion of reflecting in the change of the orientation of the player object the amount of change.

8. The game apparatus according to claim 1,
wherein the field object is a liquid object,
wherein the game apparatus further comprises a water-immersed volume calculation unit for calculating a volume of a portion, immersed in the field object, of the player object, and
wherein the degree-of-contact calculation unit calculates the degree of contact, based on the volume.

9. The game apparatus according to claim 1,
wherein the field object is an object representing the ground, wherein the game apparatus further comprises a ground-contacting area calculation unit for calculating an area of a portion, contacting the field object, of the player object, and wherein the degree-of-contact calculation unit calculates the degree of contact, based on the area.

10. The game apparatus according to claim 1,
wherein the field object is an object representing the ground,
wherein the game apparatus further comprises an intra-ground-surface-space volume calculation unit for calculating a volume of a portion, included in a space from a surface of the ground of the field object to a certain height in a normal direction, of the player object, and
wherein the degree-of-contact calculation unit calculates the degree of contact, based on the volume.

11. The game apparatus according to claim 1, wherein
the degree of contact represents a geometrical measurement of the degree of the player object and the field object contacting each other in the virtual game space, and
the orientation of the player object is changed based on the amount of change in orientation of the input device in the predetermined period of time and the calculated geometrical degree of contact.

12. The game apparatus according to claim 1, wherein the degree of contact is a numerical value representing the amount of contact between the player object and the field object in the virtual game space.

13. The game apparatus of claim 12, wherein
the numerical value representing the degree of contact is an intermediate value between a maximum value representing complete contact and a minimum value representing no contact, and
the degree of contact between the player object and the field object capable of changing from a first degree to a second degree.

14. A non-transitory computer-readable storage medium having stored therein a game program to be executed by a computer of a game apparatus for causing a player object and a field object that are present in a virtual game space to be displayed in a display device, the game program causing the computer to execute instructions comprising:
acquiring operation data at least including motion data, which is data representing a motion of a predetermined input device, from the input device;
calculating an amount of change of the input device in a predetermined period of time, based on the motion data;
calculating a position and an orientation of the player object in the virtual game space;
calculating a degree of contact, which represents a degree of the player object and the field object contacting each other in the virtual game space; and
changing the orientation of the player object, based on the amount of change and the degree of contact.

15. The non-transitory computer-readable storage medium according to claim 14,
wherein the input device includes a gyro sensor,
wherein angular velocity data, outputted from the gyro sensor, is acquired as the motion data, and
wherein the amount of change is calculated based on the angular velocity data.

16. The non-transitory computer-readable storage medium according to claim 14,
wherein the input device includes an acceleration sensor,
wherein acceleration data, outputted from the acceleration sensor, is acquired as the motion data, and wherein the amount of change is calculated based on the acceleration data.

17. The non-transitory computer-readable storage medium according to claim 16,
wherein a velocity of movement of the motion of the input device in the predetermined period of time is calculated by integrating accelerations represented by the acceleration data, and
wherein the orientation of the player object changes based on the velocity of movement and the degree of contact.

18. The non-transitory computer-readable storage medium according to claim 14,
wherein the orientation of the player object changes based on the amount of change, only when the degree of contact between the player object and the field object is smaller than a predetermined value.

19. The non-transitory computer-readable storage medium according to claim 14,
wherein the orientation of the player object changes such that the smaller the degree of contact between the player object and the field object, the larger the proportion of reflecting in the change of the orientation of the player object the amount of change.

20. The non-transitory computer-readable storage medium according to claim 14,
wherein the field object is a liquid object,
wherein the game program further causes the computer to execute instructions comprising calculating a volume of a portion, immersed in the field object, of the player object, and
wherein the degree of contact is calculated based on the volume.

21. The non-transitory computer-readable storage medium according to claim 14,
wherein the field object is an object representing the ground,
wherein the game program further causes the computer to execute instructions comprising calculating an area of a portion, contacting the field object, of the player object, and
wherein the degree of contact is calculated based on the area.

22. The non-transitory computer-readable storage medium according to claim 14,
wherein the field object is an object representing the ground,
wherein the game program further causes the computer to execute instructions comprising calculating a volume of a portion, included in a space from a surface of the ground of the field object to a certain height in a normal direction, of the player object, and
wherein the degree of contact is calculated based on the volume.

23. The non-transitory computer-readable storage medium according to claim 14, wherein
the degree of contact represents a geometrical measurement of the degree of the player object and the field object contacting each other in the virtual game space, and
the orientation of the player object is changed based on the amount of change in orientation of the input device in the predetermined period of time and the calculated geometrical degree of contact.

24. The non-transitory computer-readable storage medium according to claim 14, wherein the degree of contact is a numerical value representing the amount of contact between the player object and the field object in the virtual game space.

25. A game system, comprising:
a display device configured to display image data; and
a game apparatus for causing a player object and a field object that are present in a virtual game space to be displayed on the display device, the game apparatus comprising:
an operation data acquisition unit for acquiring operation data at least including motion data, which is data representing a motion of a predetermined input device, from the input device,
an amount-of-change calculation unit for calculating an amount of change of the input device in a predetermined period of time, based on the motion data,
a position orientation calculation unit for calculating a position and an orientation of the player object in the virtual game space,
a degree-of-contact calculation unit for calculating a degree of contact, which represents a degree of the player object and the field object contacting each other in the virtual game space, and
an orientation change unit for changing the orientation of the player object, based on the amount of change and the degree of contact.

26. The game system according to claim 25, wherein the degree of contact is a numerical value representing the amount of contact between the player object and the field object in the virtual game space.

27. A method implemented in a computer having one or more processors and for causing a player object and a field object that are present in a virtual game space to be displayed in a display device, the method comprising:
acquiring operation data at least including motion data, which is data representing a motion of a predetermined input device, from the input device;
calculating an amount of change of the input device in a predetermined period of time, based on the motion data;
calculating a position and an orientation of the player object in the virtual game space;
calculating, via the one or more processors, a degree of contact, which represents a degree of the player object and the field object contacting each other in the virtual game space; and
changing the orientation of the player object, based on the amount of change and the degree of contact.

28. The method according to claim 27, wherein the degree of contact is a numerical value representing the amount of contact between the player object and the field object in the virtual game space.

* * * * *